(12) United States Patent
Paczonay

(10) Patent No.: US 7,931,253 B1
(45) Date of Patent: Apr. 26, 2011

(54) QUICK COUPLING AND UNCOUPLING TUBE ASSEMBLY

(75) Inventor: Joseph Robert Paczonay, Navato, CA (US)

(73) Assignee: Checkwater LLC, Campbell, CA (US)

( * ) Notice: Subject to any disclaimer, the term of this patent is extended or adjusted under 35 U.S.C. 154(b) by 536 days.

(21) Appl. No.: 11/528,954

(22) Filed: Sep. 27, 2006

Related U.S. Application Data

(60) Provisional application No. 60/720,978, filed on Sep. 27, 2005.

(51) Int. Cl.
*F16K 31/00* (2006.01)

(52) U.S. Cl. .................. 251/343; 251/149.1; 251/149.7; 220/714

(58) Field of Classification Search .................. 251/341, 251/342, 343, 149, 149.1, 149.3, 149.6, 149.7; 222/175; 220/714; 224/148.2
See application file for complete search history.

(56) References Cited

U.S. PATENT DOCUMENTS

| | | | | |
|---|---|---|---|---|
| 4,387,879 A | * | 6/1983 | Tauschinski | 251/149.1 |
| 5,242,393 A | * | 9/1993 | Brimhall et al. | 604/86 |
| 5,363,877 A | * | 11/1994 | Frentzel et al. | 137/526 |
| 5,715,863 A | * | 2/1998 | Paczonay | 137/512 |
| 5,743,884 A | * | 4/1998 | Hasson et al. | 604/167.02 |
| 5,957,898 A | * | 9/1999 | Jepson et al. | 604/256 |

* cited by examiner

*Primary Examiner* — John K Fristoe, Jr.

(57) ABSTRACT

A coupling assembly for joining two fluid conduits together, consisting of a female component and a male component. Female component integrally construction of resilient material has a portion for snugly mating with a male component on one end, another portion for attaching a conduit on the opposing end, and internal valve means. Male component, that snugly press fits into the female component, has a mating portion with internal valve means and a conduit attachment portion. Valve means of assembly permits fluid flow when both components are fully engaged and terminates fluid flow when they are disengaged. Both components can be effortlessly couple together with a relatively low compressive force and automatically separate with a relatively low tensile force.

67 Claims, 29 Drawing Sheets

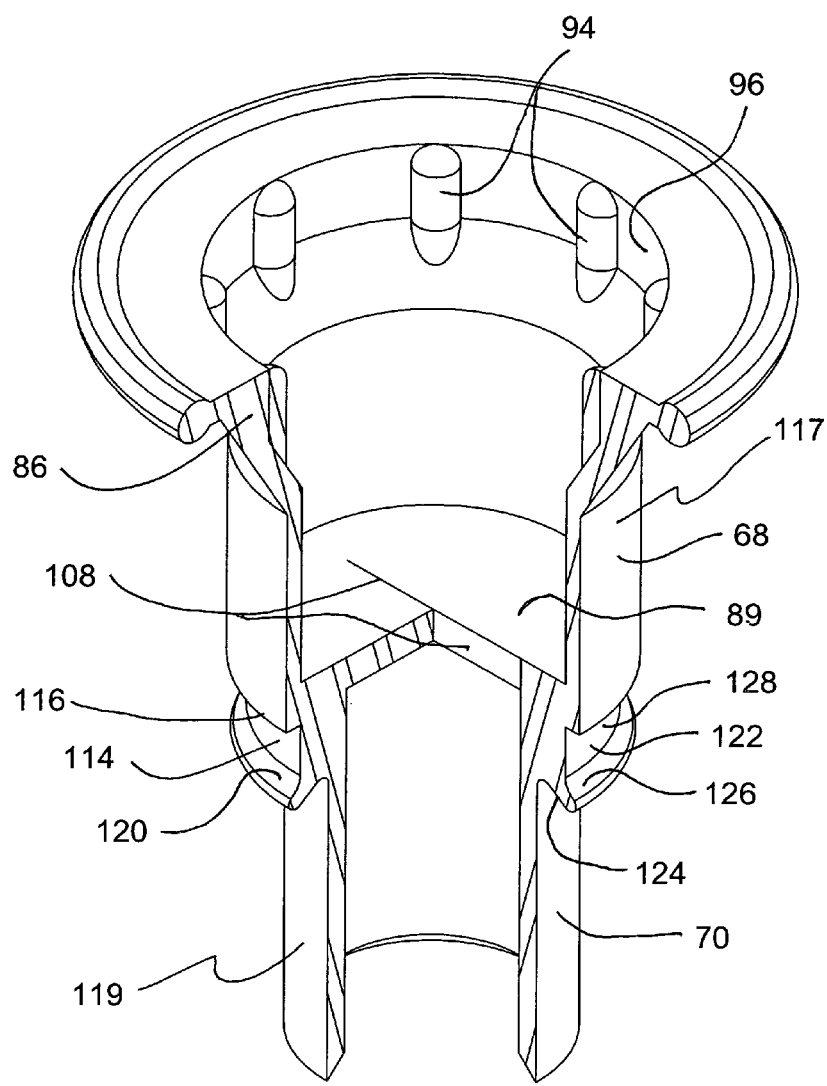
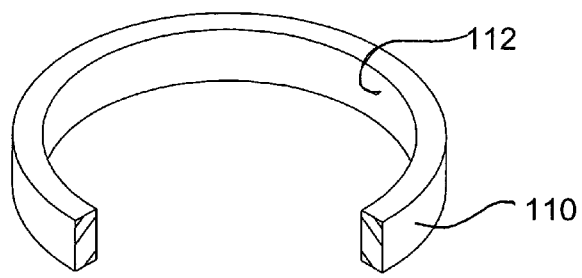
Fig. 4A

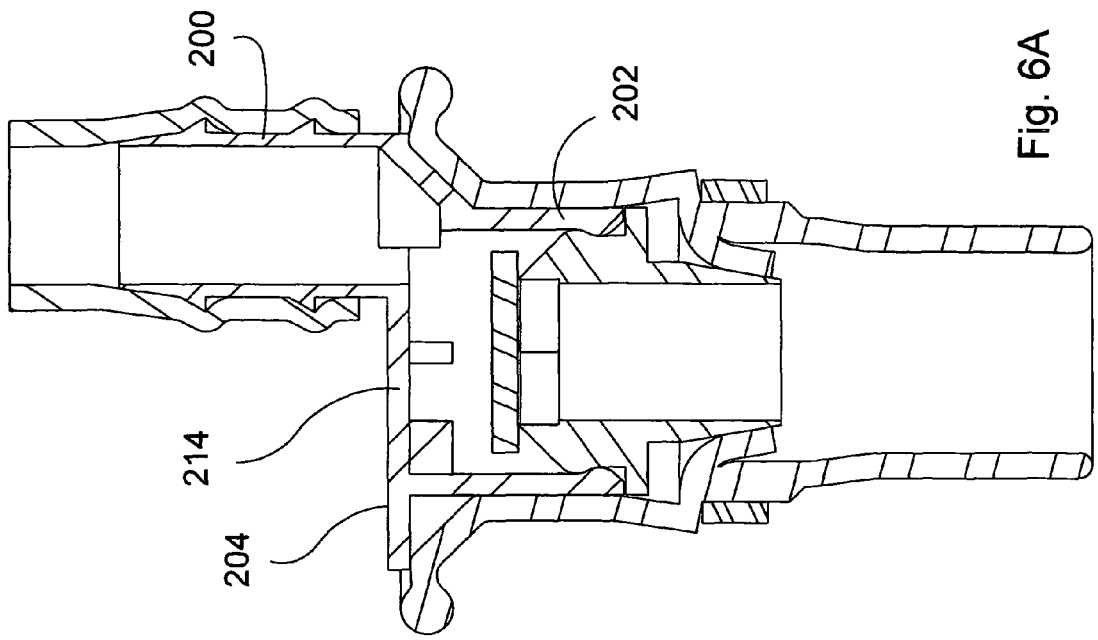
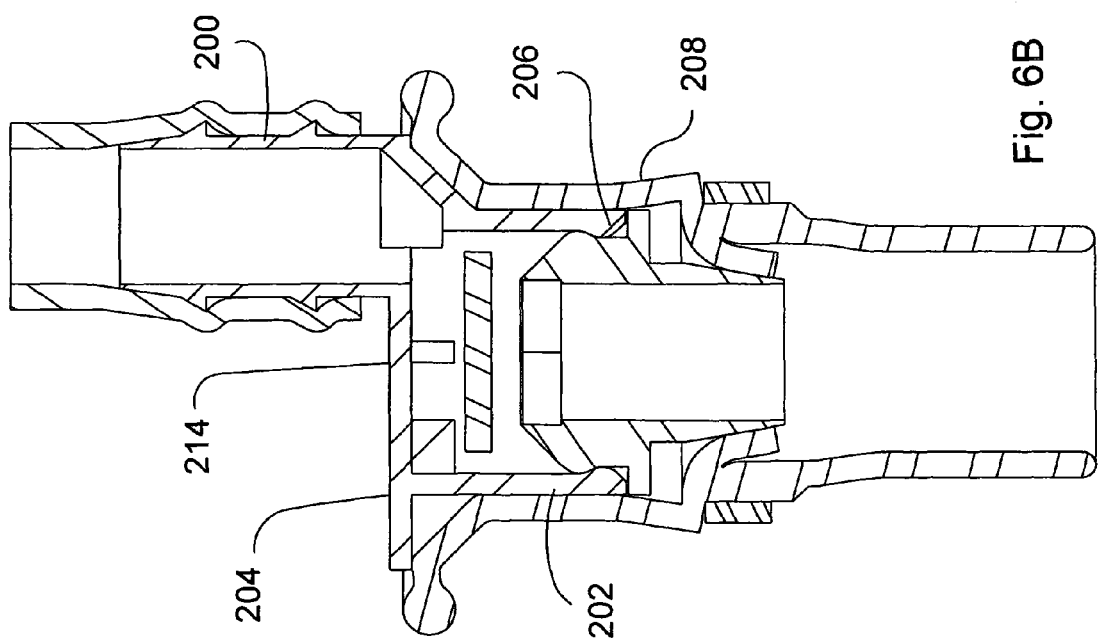

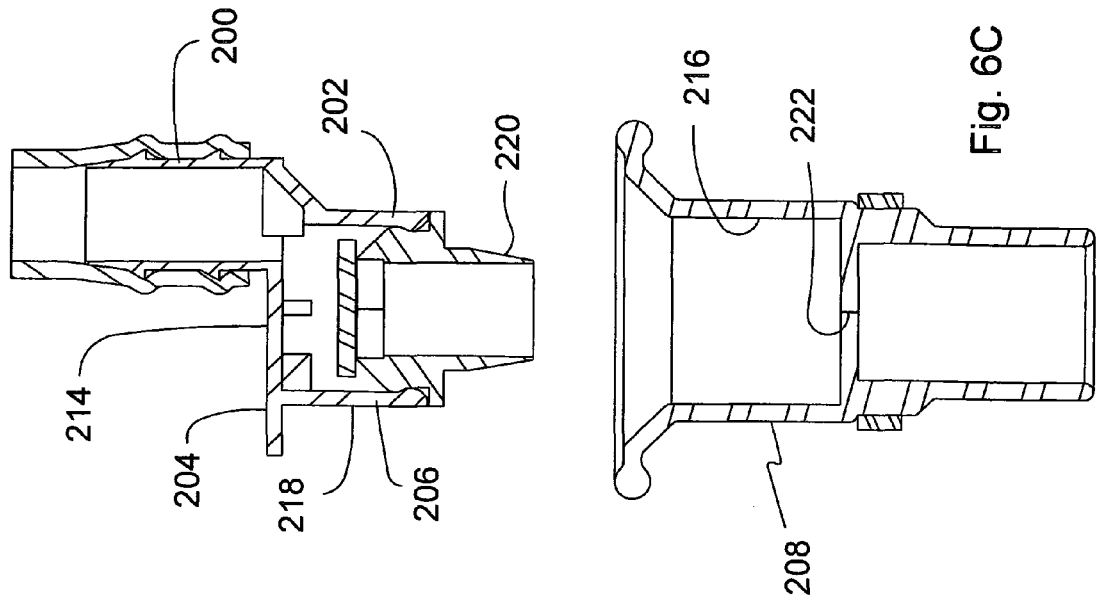
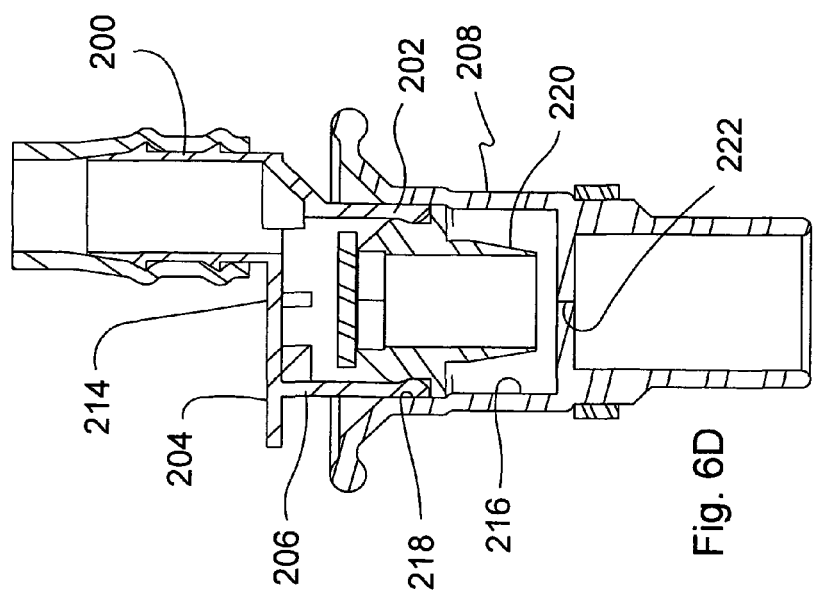
Fig. 6C
Fig. 6D

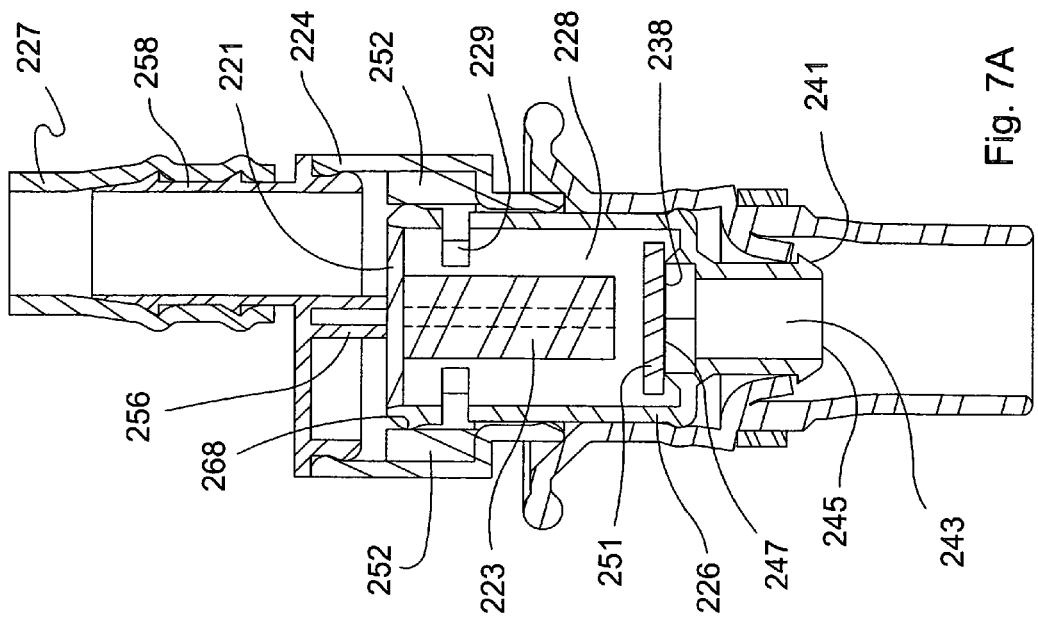
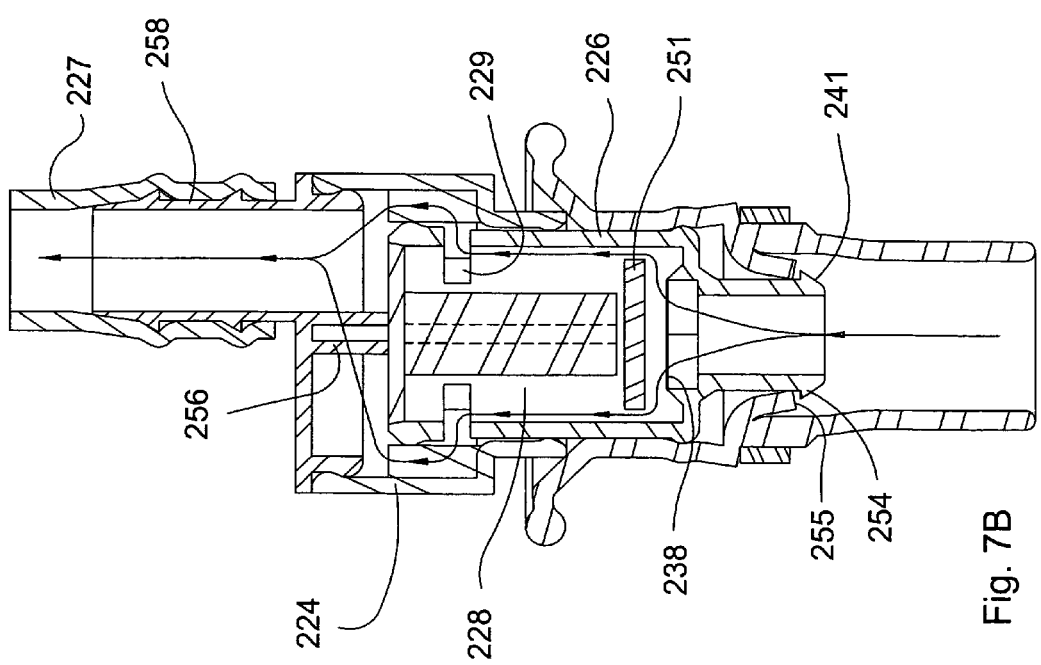

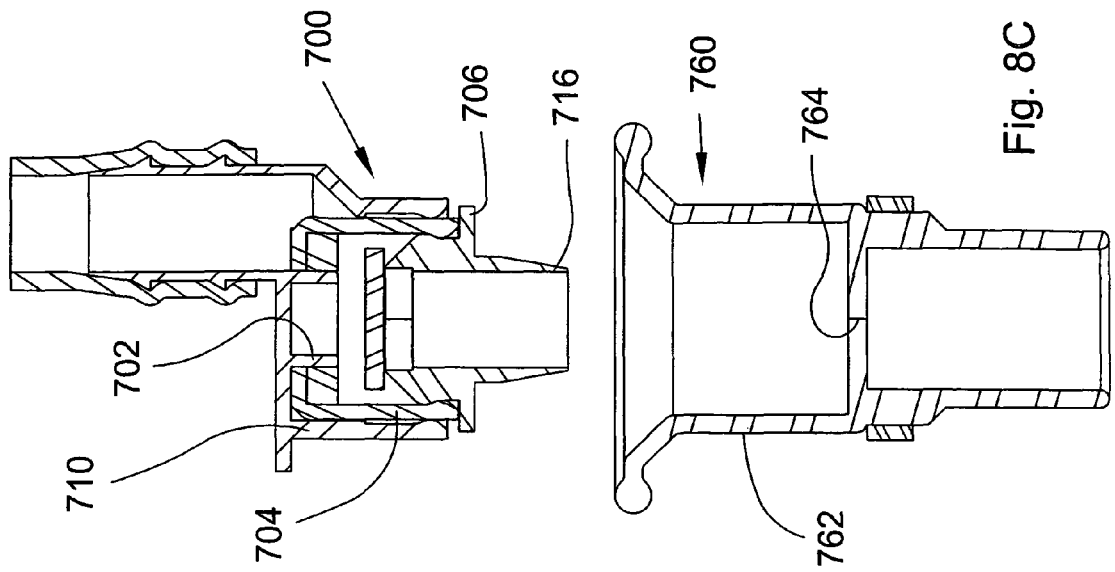
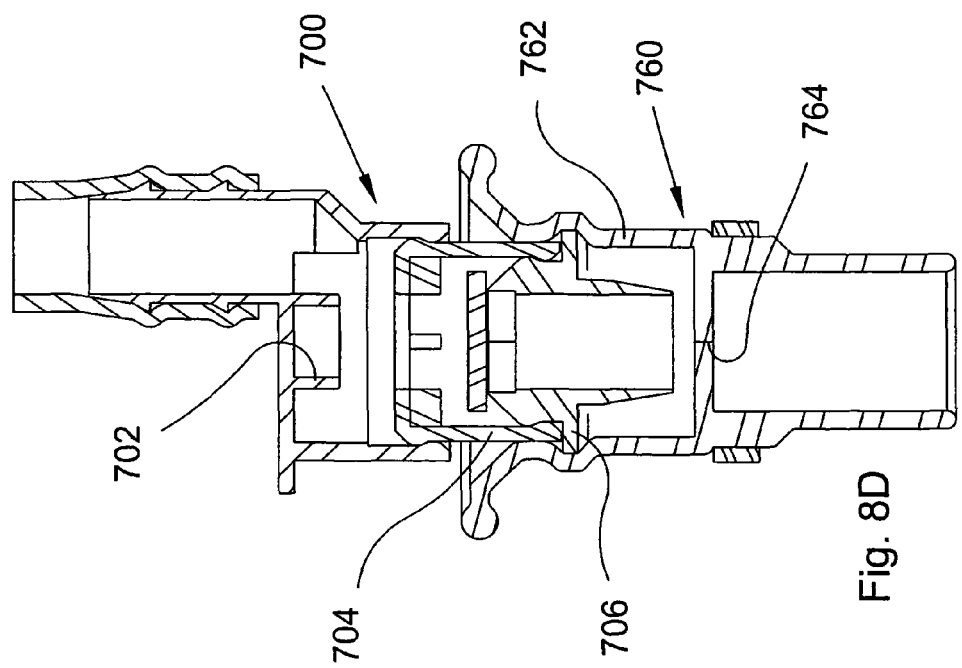

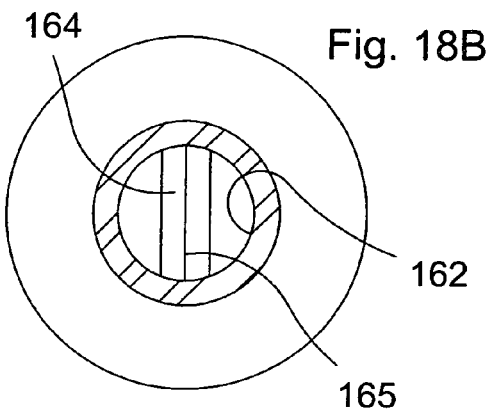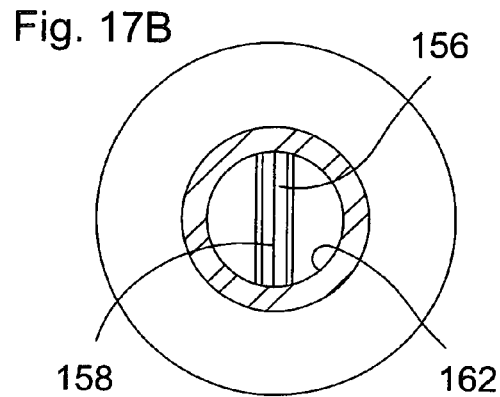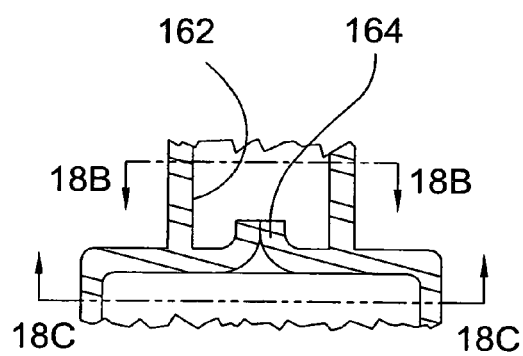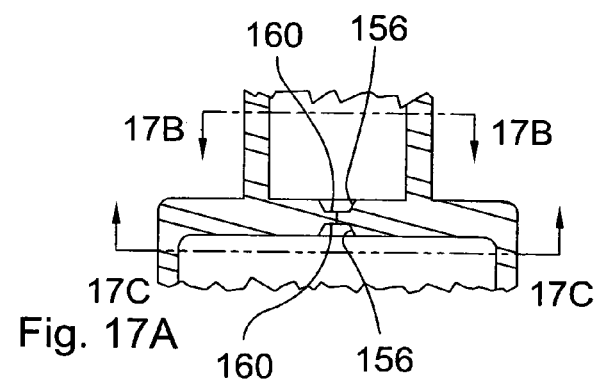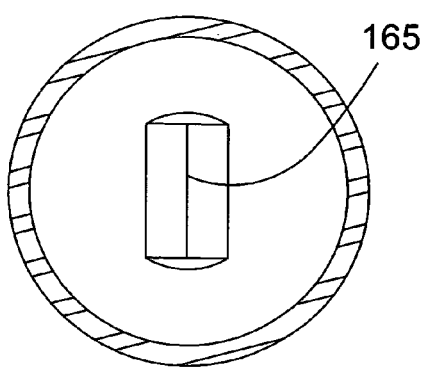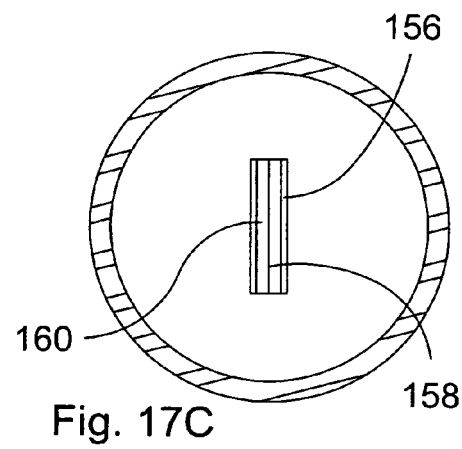

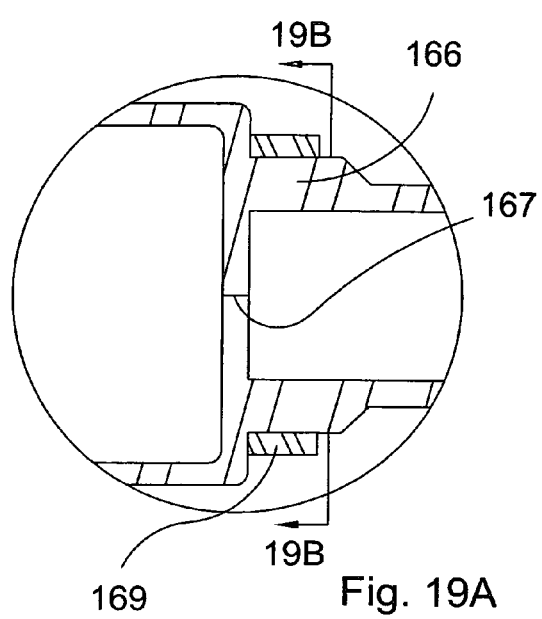
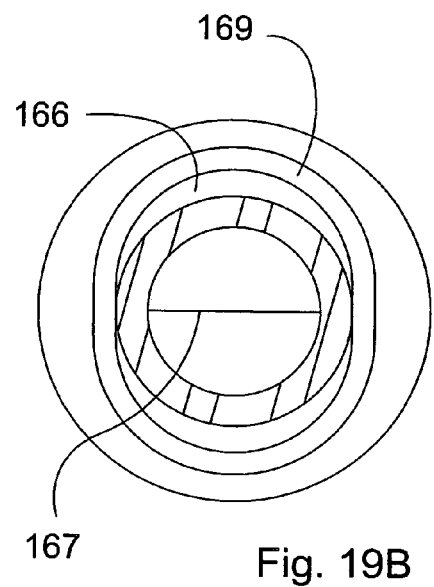
Fig. 19A
Fig. 19B
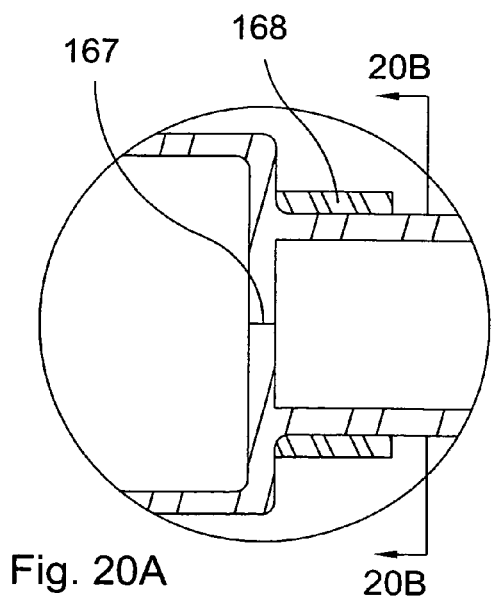
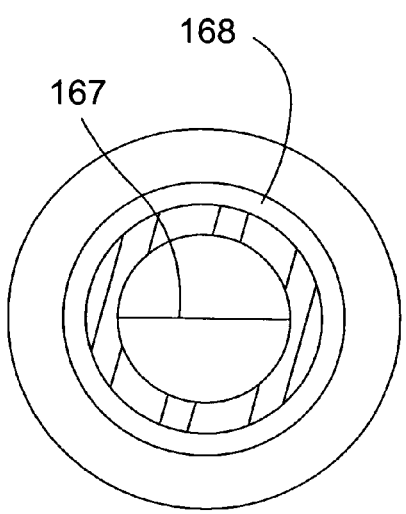
Fig. 20A
Fig. 20B

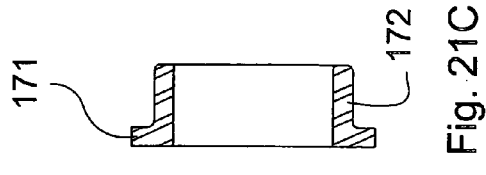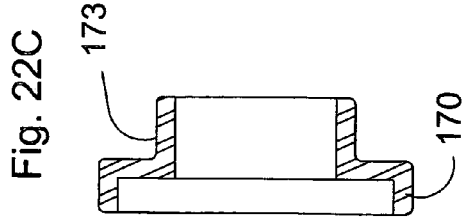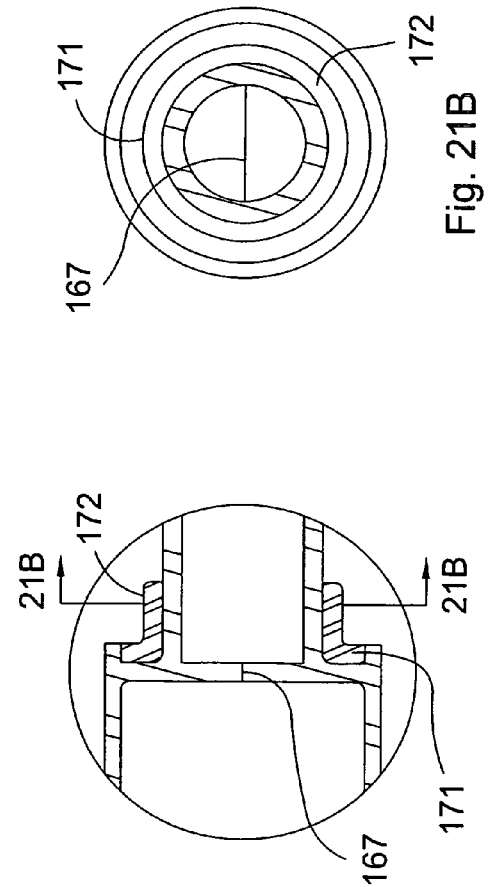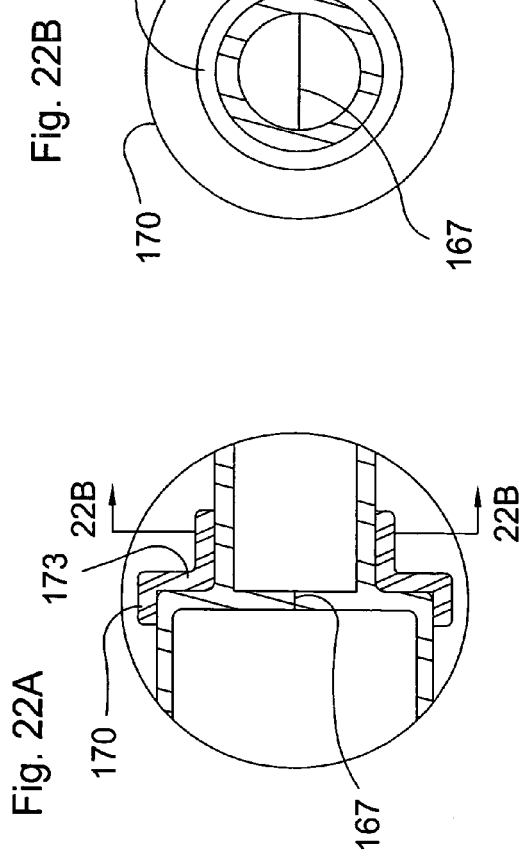

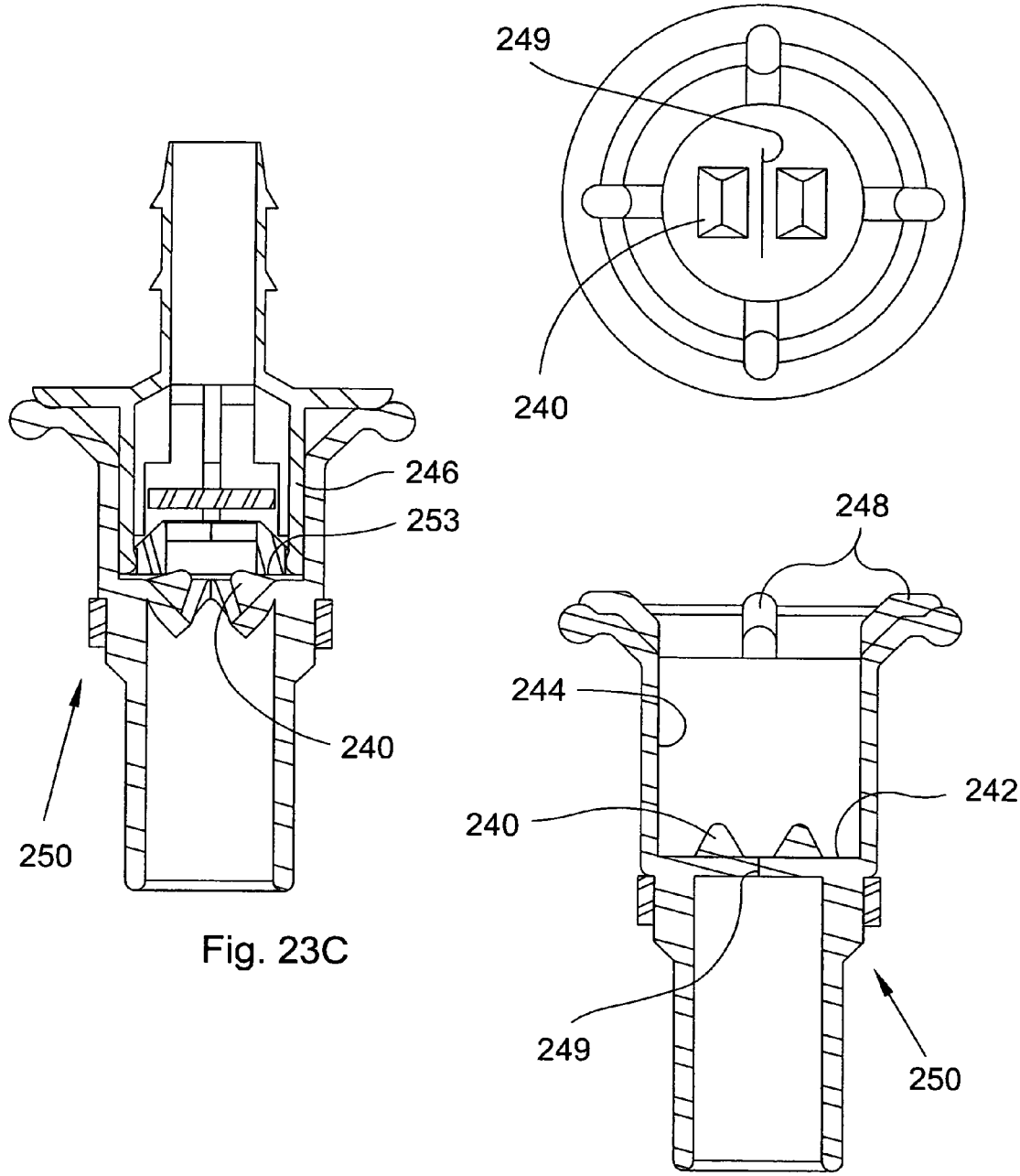

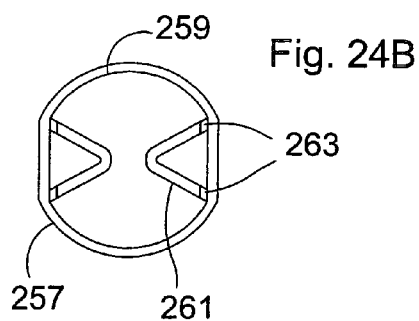
Fig. 24B
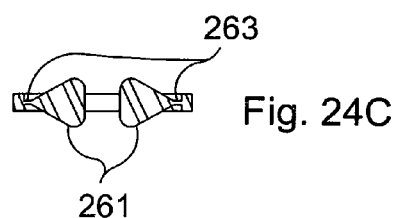
Fig. 24C
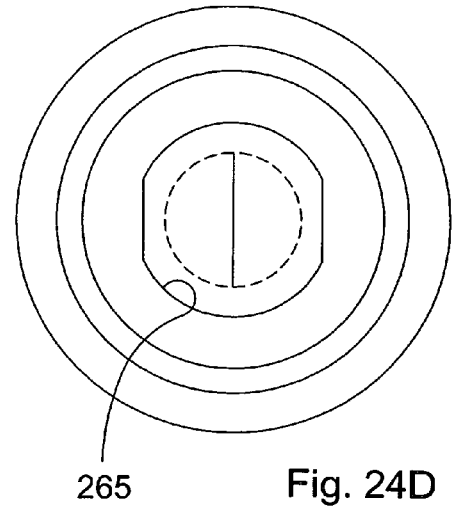
Fig. 24D
Fig. 24A
Fig. 24E
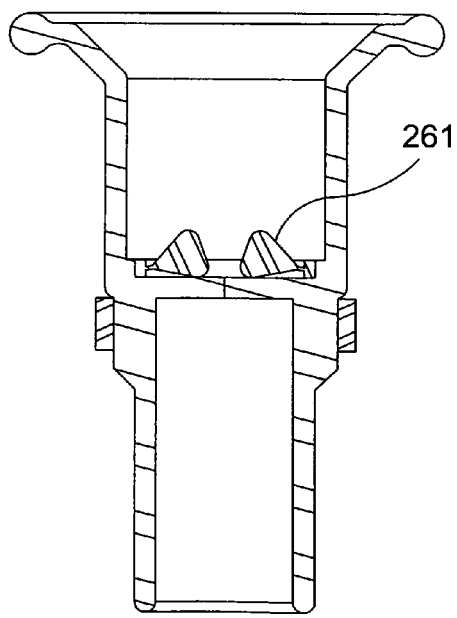
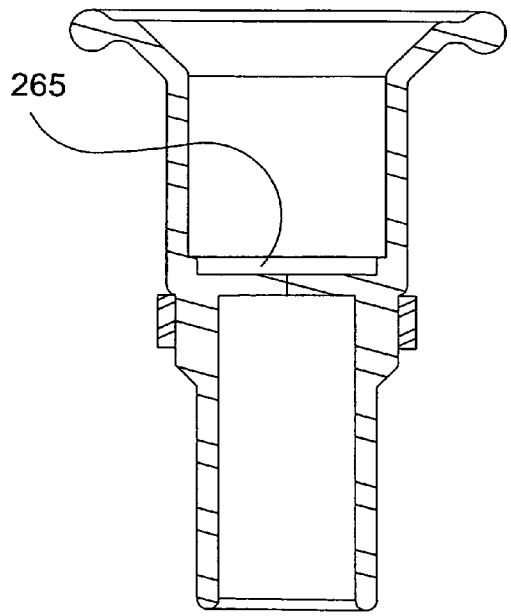

QUICK COUPLING AND UNCOUPLING TUBE ASSEMBLY

CROSS-REFERENCE TO RELATED APPLICATIONS

This application claims the benefit of provisional patent application Ser. No. 60/720,978 file 2005 Sep. 27 by the present inventor.

TECHNICAL FIELD

This invention pertains to conduit connectors for fluid delivery. In particular, this invention relates to a fluid delivery assembly for easily coupling and automatically uncoupling fluid conduits or for easily coupling and automatically uncoupling a fluid container to a fluid conduit all the while having minimal fluid leakage when the assembly components are engaged or disengaged.

BACKGROUND ART

My U.S. Pat. No. 5,927,565 issued Jul. 27, 1999, discloses vented valve assembly for liquid containers with a resilient boot that connects the valve assembly to a liquid delivery tube. This resilient boot has a built-in check valve for preventing fluid leakage from the delivery tube when disengaged from the valve assembly. The boot check valve is a gravity check valve, which only seals when the boot is properly positioned relative the pull of gravity. Lastly, the boot is comprised of at least four separate parts.

My U.S. Pat. No. 5,715,863 issued Feb. 10, 1998, tube quick disconnector for tubing or conduits. This patent shows multiple pieced assemblies with an internal resilient female component, which is cumbersome to assemble and relatively expensive to manufacture. Also the valve means provided in the female component are gravity check valves that function in limited orientations and are impractical to manufacture.

It is desirable for a tube connector or coupling assembly that can be easily joined together and will automatically disconnect when a predetermined tension is applied to the adjoining tubing. Further, the male and female components of this tube connector must form a leak tight seal when they are coupled and prevent liquid leakage when they are uncoupled. Lastly, all these components must be inexpensive to manufacture.

As shown below, to meet these objectives, the female component of this coupling assembly is of an integral construction from resilient material with internal valve means and a leak tight connection to a tube and a male connector component. The valve means in many embodiments is a slit or multitude of slits formed into an internal closure or diaphragm. One end of the female component receives the male component and the opposite end receives a conduit or tube. The female component or boot is easily manufactured in an injection mold of resilient material. A secondary operation is required to cut at least one slit through the diaphragm.

Additionally shown below, the male component or nozzle contains valve means to prevent liquid leakage when the component parts are uncoupled and will make a leak tight seal when coupled with the boot. Nozzle embodiments are described that connect the nozzle with tubing or with container closures. The nozzles shown below are easily manufactured with plastic injection molds and contain a limited number of parts.

All the features of my coupling assembly components meet the objectives listed above. Other features, advantages, and objects of the present invention will become apparent with reference to the following description and accompanying drawings.

BRIEF DESCRIPTION OF THE DRAWINGS

FIG. 4A is an exploded cross-sectioned isometric view of the boot with an external band retaining structure;

FIGS. 6A thru 6D are operational views of another embodiment of the present invention;

FIGS. 7A thru 7C are operational views of present invention with a nozzle embodiment showing automatic fluid termination;

FIGS. 8A thru 8D are operational views of present invention with a nozzle embodiment with fluid termination;

FIG. 17A is an isolated cross-sectional of the boot closure with slitted self-sealing trench structure on both sides of the boot closure;

FIG. 17B is a cross-sectional view taken along the line 17B-17B of FIG. 17A;

FIG. 17C is a cross-sectional view taken along the line 17C-17C of FIG. 17A;

FIG. 18A is an isolated cross-sectional of the boot closure with a built-in duck-bill check valve;

FIG. 18B is a cross-sectional view taken along the line 18B-18B of FIG. 18A;

FIG. 18C is a cross-sectional view taken along the line 18C-18C of FIG. 18A;

FIG. 19A is an isolated cross-sectional of the boot closure with an oval or oblong external self-sealing structure for receiving a compression band and focusing compression forces orthogonal to the slit;

FIG. 19B is a cross-sectional view taken along the line 19B-19B of FIG. 19A;

FIG. 20A is an isolated cross-sectional of the boot closure with a tubular external self-sealing structure for receiving a compression band;

FIG. 20B is a cross-sectional view taken along the line 20B-20B of FIG. 20A;

FIG. 21A is an isolated cross-sectional of the boot closure with external structure for retaining a compression band;

FIG. 21B is a cross-sectional view taken along the line 21B-21B of FIG. 21A;

FIG. 21C is a cross-sectional view of the compression band of FIG. 21A;

FIG. 22A is an isolated cross-sectional of the boot closure with an external compression band that longitudinally encompasses a region wider than the internal diaphragm;

FIG. 22B is a cross-sectional view taken along the line 22B-22B of FIG. 22A;

FIG. 22C is a cross-sectional view of the compression band of FIG. 22A;

FIG. 23A is a cross-sectional view of a boot embodiment with protrusions that facilitate opening of the internal slit;

FIG. 23B is the top view of FIG. 23A;

FIG. 23C is an operational view of the embodiment shown in FIGS. 23A and 23B;

FIG. 24A is an assembled cross-sectional view of a two part variant of the embodiment shown is FIGS. 23A thru 23C;

FIG. 24B is the top view of protrusion housing of the embodiment shown in FIG. 24A;

FIG. 24C is a side cross-sectional view of protrusion housing of FIG. 24A;

FIG. 24D is the top view of the boot shown in FIG. 24A;

FIG. 24E is a side cross-sectional view of the boot shown in FIG. 24A;

DETAILED DESCRIPTION

Figure 1:
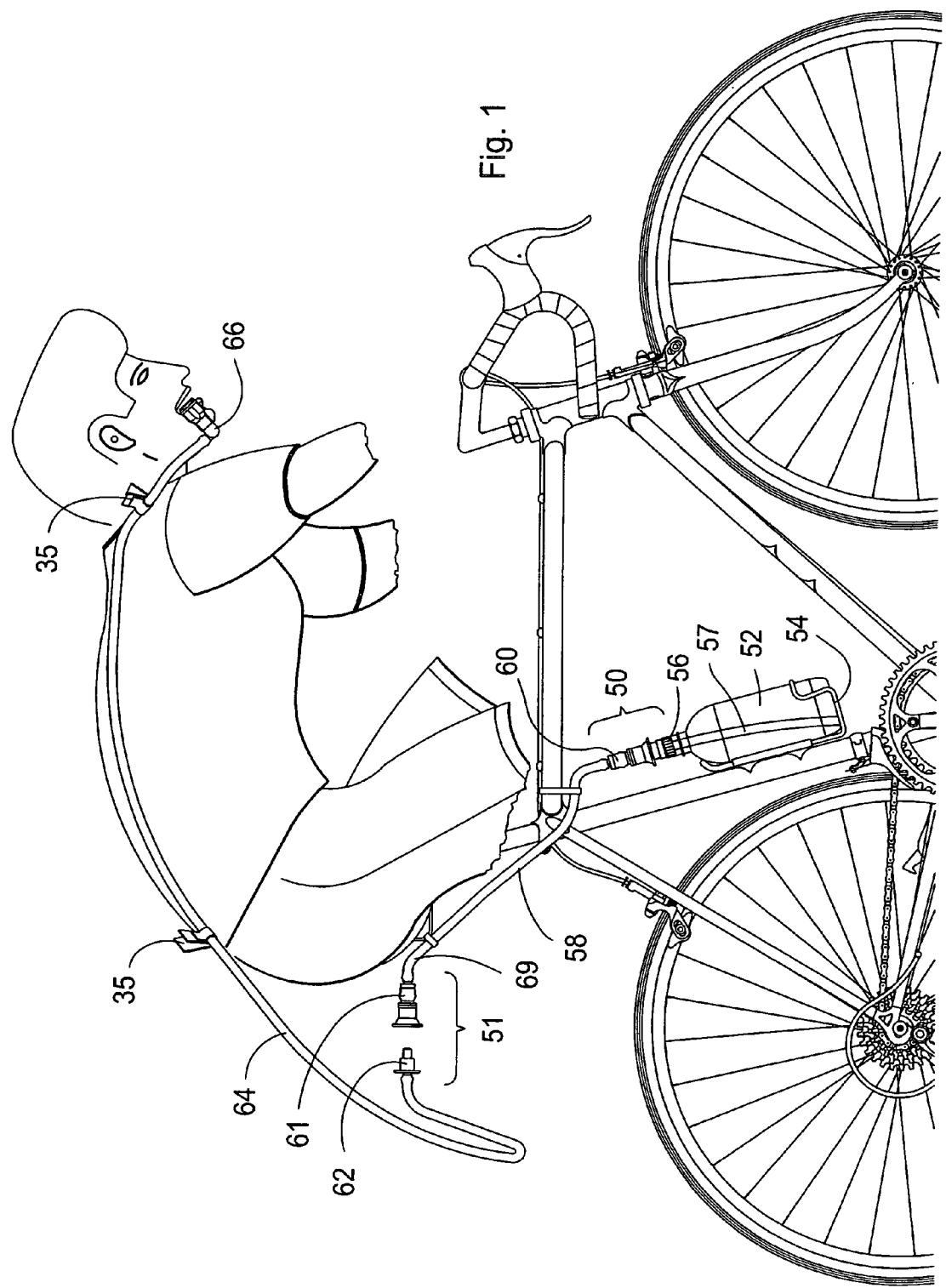
FIG. 1 is a side view of a cyclist utilizing two embodiments of coupling assembly constructed in accordance with the teachings of the present invention.

FIG. 1 illustrates two embodiments of coupling assembly 50, 51 constructed in accordance with the teachings of the present invention being utilized by the rider of a bicycle. In one embodiment, a liquid container 52 is carried in a container cage 54 on the bicycle. A container closure 56 is mounted onto the mouth of the container 52. From the underside of the closure 56 a draw tube 57 projects into the container 52. Form fitted over the closure nozzle of the closure 56 is the female component or resilient boot 60 forming the first coupling assembly 50. The first delivery tube 58 routes along the bicycle frame to fasten on the rear of the bicycle seat as shown. A relatively short length of tubing 69 hangs off the bicycle seat. In another embodiment of the current invention, a second resilient boot 61 attaches to the end of tube that is fastened to the seat. Pressed into the second resilient boot 61 is a male connector or tube nozzle 62 (shown uncoupled) forming a second coupling assembly 51. A second delivery tube 64 is clipped onto the bicyclist's back with at least one clip 35 and tube 64 extends up to the cyclist's mouth as shown. When tube nozzle or closure nozzle are each pressed into a boot, the walls of each boot mating portion deform to receive the nozzle making a fluid-tight seal between boot interior surface and nozzle exterior surface. When the associated components of both coupling assemblies are mated, fluid can flow from the container up to the user's mouth. Attached to the end to the second tube 64 remote from the container 52 is an orally activated valve or mouthpiece 66, which is employed to selectively alternately terminate or allow flow of liquid into the cyclist's mouth. If the cyclist dismounts, the tube nozzle 62 of the coupling assemble 51 that is mounted on the bicycle seat will automatically pull out of the associated boot 61.

Figure 2:
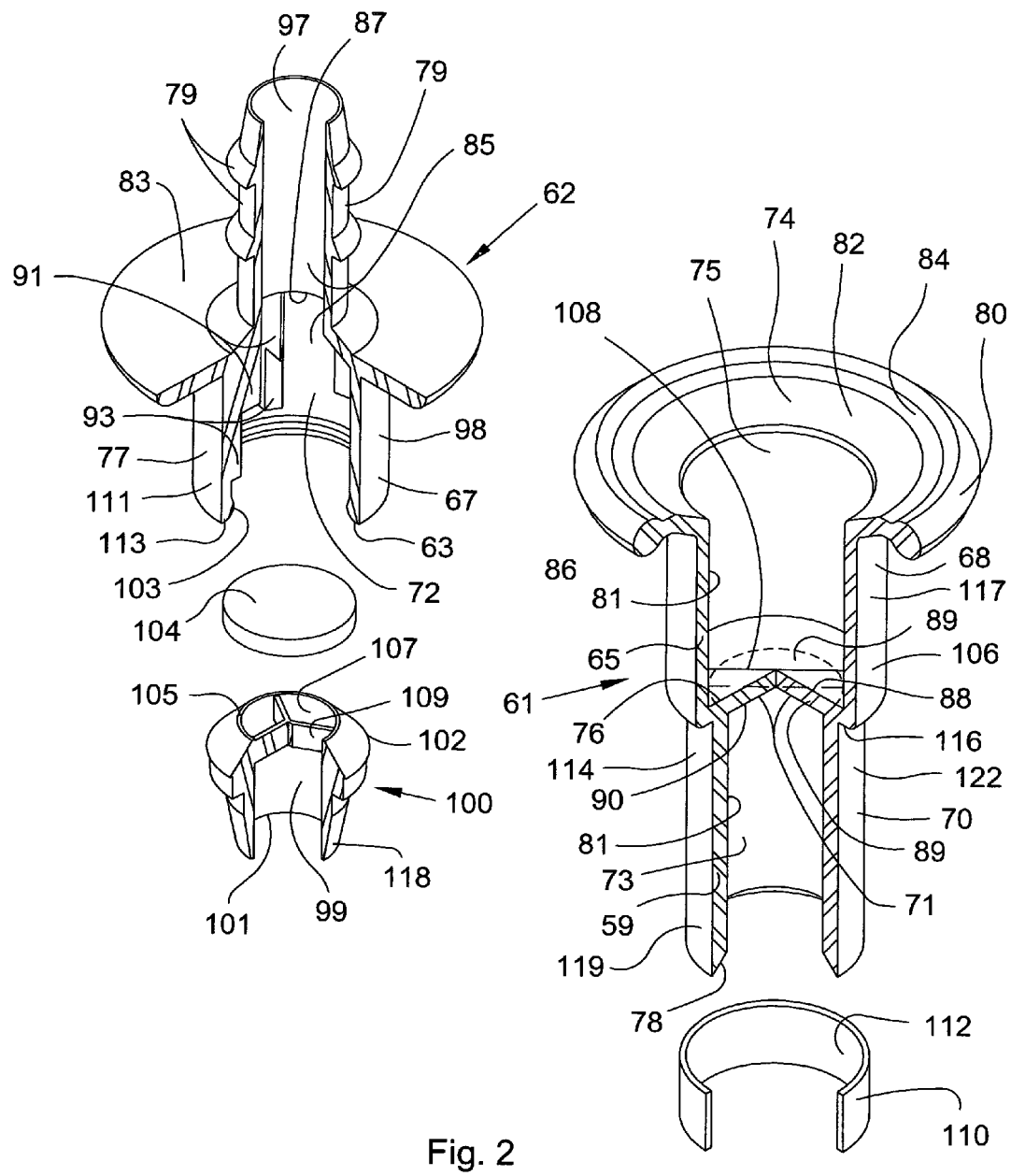
FIG. 2 is an exploded cross-sectioned isometric view of one form of the coupling assembly utilized for connecting two fluid conduits.

Referring to FIG. 2, the female connector or boot 61 and the male connector or nozzle 62 of coupling assembly are shown separated in cross-sectional explode views. Boot 61 is formed of resilient flexible material such as rubber, silicone, or resilient thermally engineered plastics (in particular, kraton or dynaflex). In the preferred embodiment, boot 61 is of integral construction during a molding process from a single piece of material.

Boot 61 includes an internal hollow body defining an interior 81 for accommodating fluid from a delivery tube or conduit through valve means into a tube nozzle 62. Boot interior 81 is divided into a mating or coupling portion 68 and a conduit or fitting portion 70 with valve means positioned between said portions 68, 70. Hollow mating portion 68 includes a flared opening 74 communicating with the interior 75 for receiving tube nozzle 62 with end wall 71 and corresponding closure surface 88. Fitting portion 70 includes an opening 78 communicating with the interior 73 for receiving a conduit, tube, or a depending fitting with end wall 71 and corresponding closure surface 90. As shown, fitting portion opening 78 is spaced from coupling portion opening 74. The fitting portion 70 having a wall 59 defined by the interior boot surface 81 and the exterior boot surface 119, the fitting portion wall 59 extending the longitudinal length of the fitting portion 70 from the fitting opening 78 to the valve means. Further, the mating portion 68 having a wall 65 defined by the interior boot surface 81 and the exterior boot surface 106, the mating portion wall 65 extending the longitudinal length of the mating portion 68 from the flared opening 74 to the valve means. Since the boot is resilient the fitting portion wall and mating portion wall are both deformable.

The flared inlet opening 74 of boot mating portion 68 is surrounded by a bead 80 which joins to the truncated conical opening 82 with a flange 84. In the preferred boot embodiment said bead 80 is annular. These inlet features stiffen the inlet structure which in turn aids in mating the boot 61 with the nozzle 62.

Figure 3:
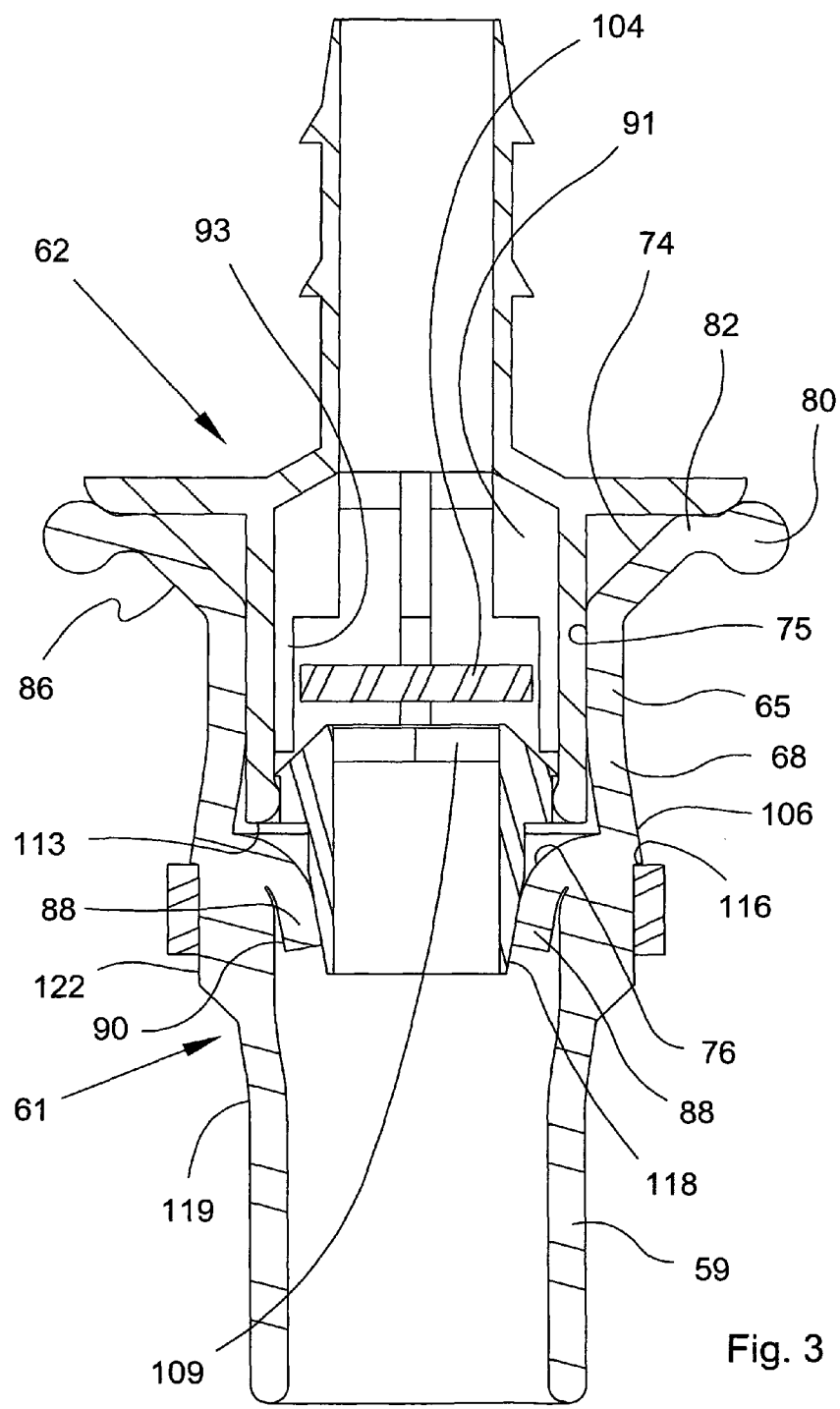
FIG. 3 is an operational view of the embodiment in FIG. 2.

Hollow tube nozzle 62 of FIGS. 2 & 3 consists of a valve housing 77 at one end and a barbed fitting 79 on the other end both with a common axis and both intersecting at a common flange 83. Tube nozzle 62 has a hollow interior 85 for accommodating fluid from the valve to the fitting. The barbed fitting 79 will press fit into a tube or fluid conduit. Instead of a barbed fitting, other prior art fittings can be employed.

At the inlet end 67 exists valve means in the form of a gravity check valve are shown in the tube nozzle embodiment of FIG. 2. As shown, tube nozzle 62 consists of a valve housing 77 with a cylindrical interior 72, an opening 63 for receiving valve seat insert 100 and an outlet opening 87 for egress of liquid. Radially extending from housing outlet opening 87 is at least one vane 91. A longitudinal rib 93 extends from vane 91 along the valve housing interior wall 72 terminating near the inlet opening 63. Valve seat insert 100 presses into the inlet opening 63 and is prevent from moving longitudinally by opposing annular ribs 102, 103 and end of longitudinal ribs 93. Within the resulting void sits at least one disc or valve element 104. On the face of insert is the sealing seat 105 of the check valve and at least one radial vane 91 act as a porous seat preventing valve element from plugging outlet opening 87. Lastly, longitudinally extending from check valve outlet 87 is a fitting section consisting of a tube 97 with exterior barbed fitting 79.

Nozzle housing 77 and insert 100 can be made of rigid material such a plastic or metal. Valve element 104 can be made of rigid or resilient material.

Insert has a tip 118 at one end with an inlet opening 101 that is in communication with an interior passageway 99 connected to the sealing seat opening 107. Radially extending across sealing seat opening 107 is at least one web 109.

Nozzle 62 can be mated with boot 61 by guiding nozzle end 111 into flared boot opening 74. As nozzle 62 is pressed into mating portion 68, the mating portion wall of resilient boot 61 deforms to receive nozzle 62. In turn, nozzle exterior surface 98 of valve housing 77 makes a leak tight friction fit with boot interior surface 75. Perimeter of nozzle exterior surface 98 is slightly larger than the corresponding perimeter of boot interior surface 75. This mismatch in dimensions along with the resilient nature of boot 61 facilitates a snug friction fit that is leak tight. As nozzle 62 is further pressed into mating portion 68, nozzle tip 118 penetrates the at least one slit 108 in resilient boot closure 89. In the penetration process, boot closure and slit deforms as shown in FIG. 3

As shown in FIG. 3 nozzle 62 can be pressed into boot 61 until nozzle end section 113 presses up against internal closure wall 76 of boot. In addition, nozzle flange 83 presses against boot flange 84 also preventing nozzle 62 from being presses any further. Once tip 118 punctures slit 108, liquid can flow from boot 61 through nozzle 62 out into the conduit (not shown) connected to the fitting 79.

Valve means in the nozzle 62 allows liquid flow and terminates liquid flow depending upon the liquid pressure. When the liquid pressure on the downstream side exceeds the pressure on the upstream side, valve element 104 will seal against sealing seat 105 terminating liquid flow. If the upstream pressure is too great, sealing seat webbing 109 prevents the disc 104 from blowing through the internal insert opening 107. When the upstream pressure exceeds the downstream pressure, disc 104 is pressed against at least one radial vane 91 and liquid can flow around disc 104 and egress the outlet opening.

Figure 4B:
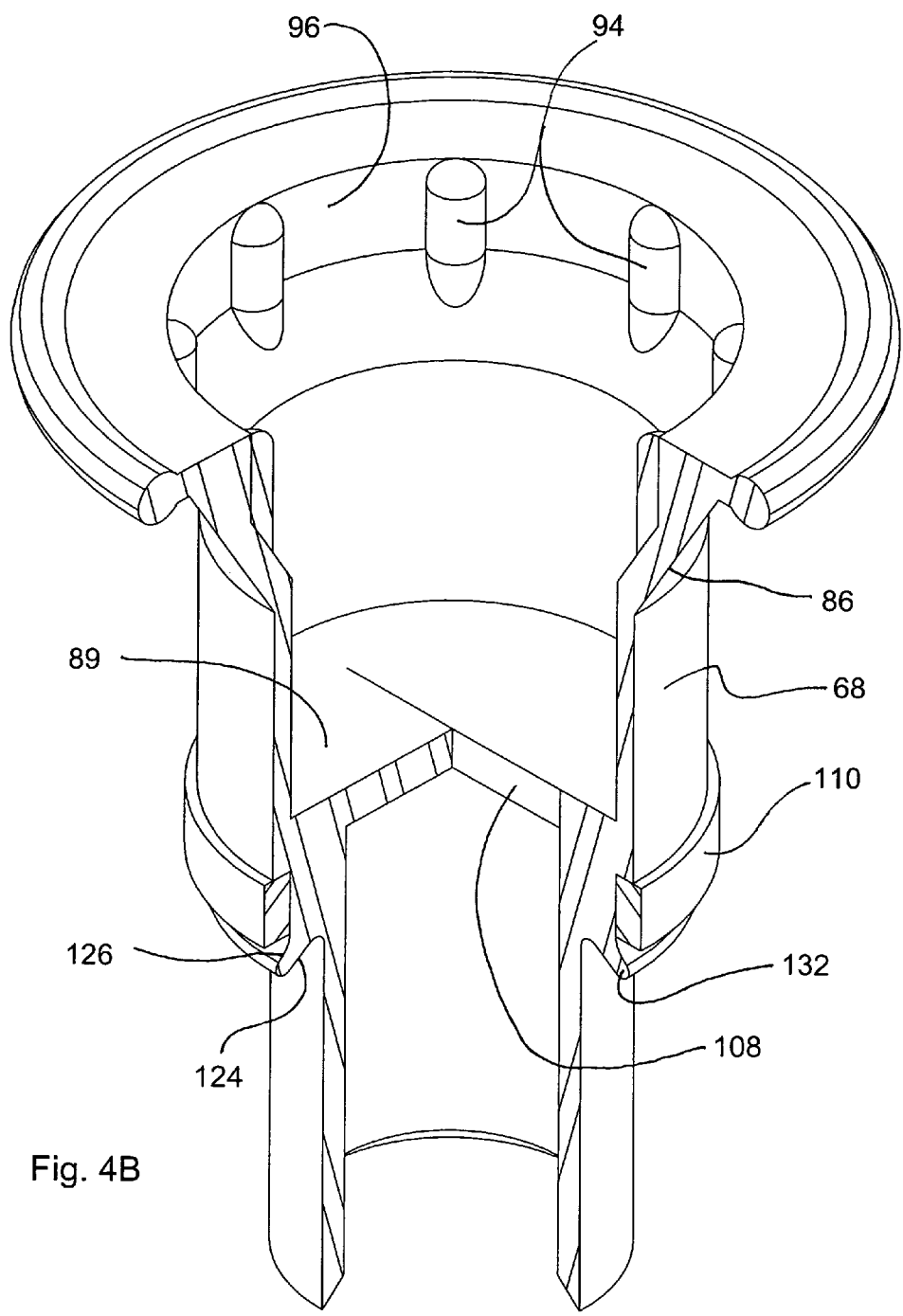
FIG. 4B is an assembled cross-sectioned isometric view of the embodiment in FIG. 4A.

With a mated assembly, if a sufficient tensional force is applied to the tubing connected to either the boot 61 or the nozzle 62, the conduit nozzle 62 will be pulled out of the mating portion 68. When this occurs, said at least one slit 108 will seal closed (as shown in FIG. 4B) and conduit nozzle valve will close preventing liquid leakage from either conduit. Also if the liquid pressure inside the conduit or connector assembly exceeds a predetermined pressure, boot 61 and nozzle 62 will separate. The required disconnection force is dependent upon the relative mismatch in perimeter dimensions of the internal surface 75 of the mating portion 68 and the external surface 98 of the nozzle housing 77 along with the resilient properties of the boot material. In turn, my invention is ideally intended for liquid delivery systems where the pressure of the fluid is relatively low and the connecting/disconnecting force is relatively low.

Figure 4C:
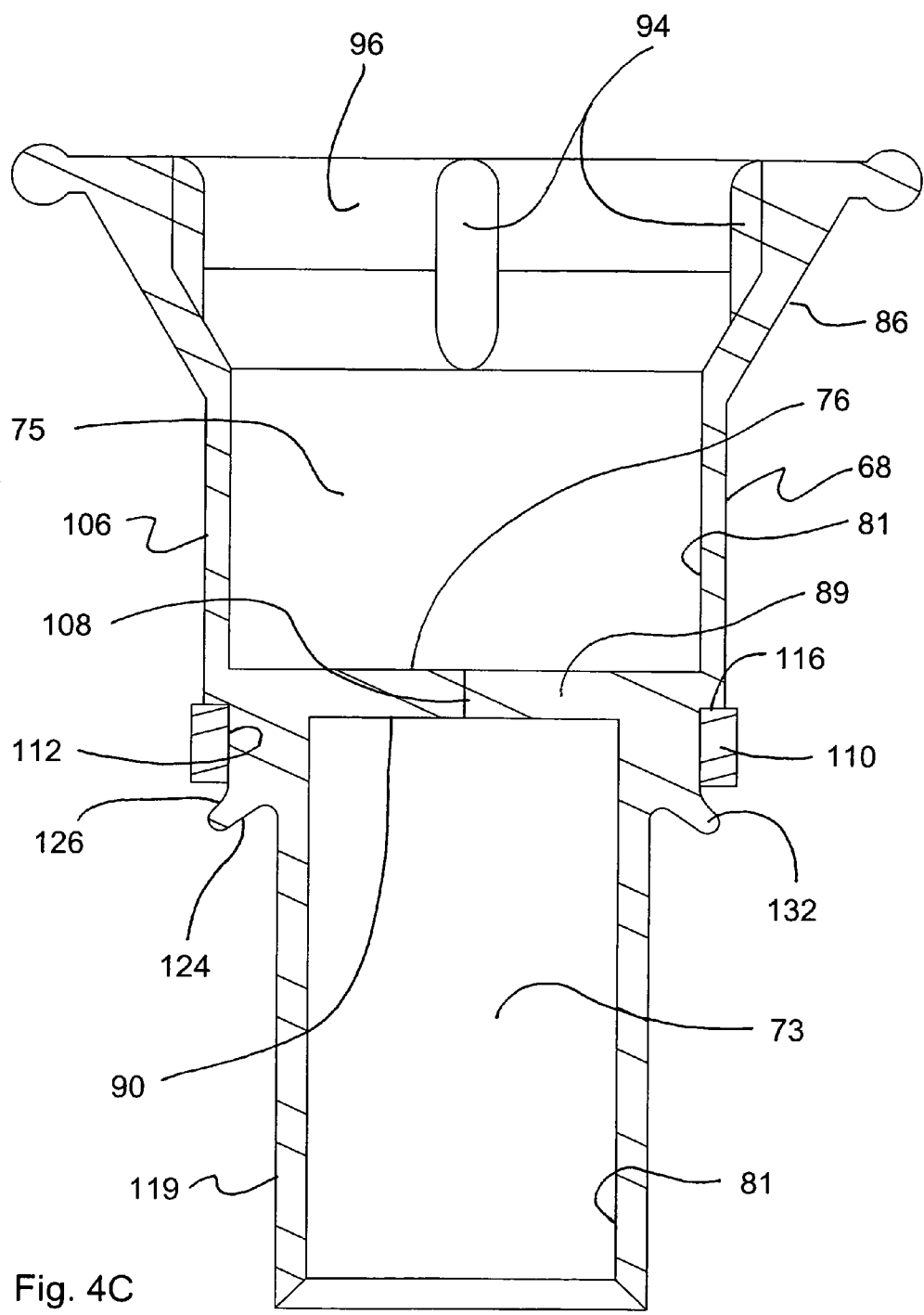
FIG. 4C is a cross-sectioned view of the boot of the embodiment in FIG. 4A.

In the embodiments of FIGS. 4A thru 4C the exterior wall 86 drafts from the cylindrical exterior surface 117 of the mating portion to flange 84. This added material further stiffens the inlet structure.

Also shown in other boot embodiments of FIGS. 4A, 4B, 4C, and 5 is at least one vent rib 94 that act to evenly space the inlet boot surfaces 96 away from the exterior surface of the container closer and associated nozzle. Vent ribs 94 combined with the interior inlet surface 96 of the boot act as a debris guard allowing air into the vent slots of a container closure, shown in FIG. 10, but preventing dust and debris from entering these slots.

Referring again to FIGS. 2 thru 3, communicating with flared inlet 74 is the mating or coupling portion 68 of the boot 61. Mating portion 68 is tubular in shape with an exterior surface 117 and an interior surface 75 spaced from the exterior surface 117. As mentioned above, the inside perimeter of boot interior surface 75 is smaller than the corresponding perimeter of the nozzle exterior surface 98 resulting in a perimeter mismatch. For a given perimeter mismatch, the boot wall thickness in conjunction with the resilient material properties of the boot 61 will determine the required tensional force needed for separation of boot 61 and nozzle 62.

In the preferred boot embodiment, fitting portion 70 is cylindrical with a drafted outlet opening 78 to aid in connecting boot 61 to a delivery tube or depending fitting. Fitting portion 70 has an exterior surface 119 and an interior surface 73 spaced from the exterior surface 119. The interior surface 73 perimeter, boot wall thickness, and the material properties of the boot 61 will determine how firmly the boot 61 is held onto the delivery tube. The union binding force of the boot 61 on the tube must be much greater then that of the boot on the nozzle 62 otherwise when the boot is being pulled from the nozzle, the tube and boot might separate before the nozzle and boot.

Valve means in the embodiment of FIGS. 2 thru 8D is a closure or diaphragm 89 with at least one slit 108 formed there in where slit 108 extending between the end walls 76, 90. Deformable diaphragm 89 is integrally connected to the internal hollow body and extending across the interior wall 81, which normally assumes the configuration shown in FIGS. 2, 4A, 4B, 4C, and 5. End walls 76, 90 of hollow portions form the exterior walls of diaphragm 89. In the present embodiment generally parallel end walls 76, 90 bracket diaphragm 89. Both end walls 76, 90 are equally spaced. Other embodiments given below include various configurations of wall and valve structures. Although not shown in any figures, said end walls 76, 90 can be curved convexly or concavely.

Slit sealing means are provided. In the embodiment of FIGS. 2 thru 4C, a band 110 provides a compressive force on the internal diaphragm 89. The inside perimeter dimension 112 of band 110 is smaller than the outside perimeter dimension of band retention section 122. Band 110 is positioned as shown in FIGS. 4B in the mid-section of boot 61 adjacent to external ledge 116 and generally coincidental with internal diaphragm 89. When the nozzle tip 118 is removed from slit 108, band 110 will close slit 108 by applying compressive forces against the external wall 114 of resilient boot. It should be understood that means are available to seal slit 108 without a band, however, band acts as a redundant means for sealing the at least one slit. With that said all boot embodiments of the present invention could be absent a compressive band. Other slit sealing means could include a co-injected compressive member that performs a similar function as that of the band described above.

In another embodiment, shown in FIGS. 4A thru 4C, band 110 is retained in place with an external generally flared structure 120. Integrally molded into the exterior mid-section of the boot and coincident with the internal diaphragm 89 and extending outwardly away from the coupling end of the boot 61 is flared structure 120. Flared structure 120 has a generally truncated cone shaped flared member with a juxtaposed band retention section 122. Flared member 132 has an inner member wall 124 and an outer member wall 126, said member walls converging in the direction of tube retention portion 70. That is, the inner member wall 124 flares outwardly from the longitudinal axis of the boot at an angle greater than the angle at which outer member wall 126 flares outwardly from the longitudinal axis of the boot 61.

External flared structure 120 can be positioned a predetermined axial distance along the length of boot either upstream or downstream from diaphragm 89.

This construction allows the boot to be easily ejected from an injection mold. When boot is being ejected from the mold, interior core pin (not shown) of fitting portion end 70 is first pulled out of the cavity in the mold, followed by the flared member 132 and other boot exterior surfaces, boot 61 being force off cored pin (not shown) by a stripped plate and possibly pressurized gas. With flared angle of the outer member wall 126, boot 61 will not shear at the intersection between the flared member 132 and the juxtapose band retention section 122. During ejection from the mold, as the boot mold cavity moves away from the boot 61, the band retention section 122 will be able to flex into the void provided by the absent fitting portions core pin. All other external features of the boot will always be leaving a smaller cavity volume for a larger cavity volume. Member 132 is pushed off (and possibly blown off) the associated core pin as the last step in the molding ejection sequence.

Flared structure 120, consisting of flared member 132 and juxtapose band retention section 122, is easily molded as shown above. Band retention section 122 securely positions a band 110 concentrically around the at least one slit 108 in the interior diaphragm 89. Flared member 132 will deform for installation of the band 110 albeit made of resilient material or rigid material. The flared member 132 and an external ledge 116 both flank band retention section 122. Once band 110 is position in the band retention section 122, flared member 132 on one side and ledge 116 on the other side prevent band 110 from moving longitudinally along the boot axis.

Band 110 is made of resilient material such as rubber, silicone, or resilient thermally engineered plastics (in particular, kraton or dynaflex). Band 110 can also be made of rigid material such as plastic or metal.

Band 110 serves at least two purposes insofar as the function of the boot 61 is concerned. First, if band 110 is made rigid material, band acts as deformation suppression means preventing fluid leakage from the boot caused by inadvertent deformation. Second, the internal perimeter 112 of band 110 is smaller then the external perimeter 128 of band retention section 122. So independent of band construction material, band 110 applies a constant compressive force on diaphragm 89 thus forcing the at least one slit 108 in diaphragm 89 to remain closed when nozzle tip 118 or male component 62 is disengaged from the diaphragm 89.

When both coupling assembly components 61, 62 are coupled and a tensional force is applied to the attached delivery tubes (not shown), the compressive forces from the internal wall 75 of resilient boot 61 onto the exterior surface 98 of nozzle housing 77 are easily surmounted and the coupled assembly will separate. In most cases both components of the coupling assembly will be joined to flexible tubing, in which case, if a shearing force is applied to the coupled components, this force will be translated into a tensile force and the coupled components will effortlessly pull apart. In the case of the tube nozzle 62 joined to the boot 61, valve means in both components will prevent fluid leakage there from.

Figure 5:
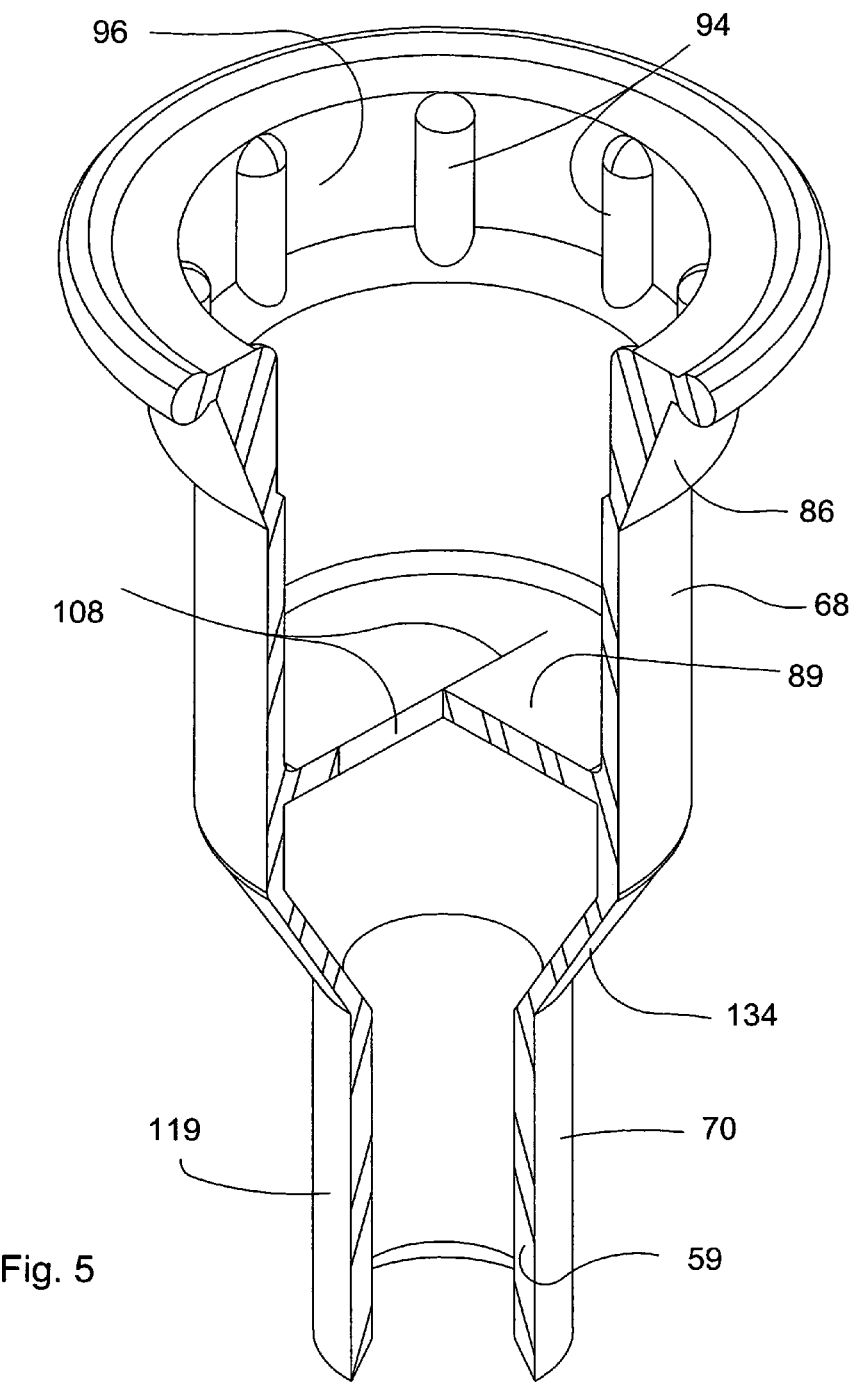
FIG. 5 is a cross-sectioned isometric view of the boot with a drafted conduit retention portion.

FIG. 5 shows a boot embodiment in which the inside perimeter of tube retention portion 70 is substantially smaller then the same feature of the boot embodiments in FIGS. 2 thru 4C. The tube retention portion wall diameter transition with a flared or drafted section 134 from a small diameter for retaining a tube up to a large diameter providing a large diaphragm 89 and corresponding large slit 108. The slit 108 length determines the maximum diameter of nozzle tip 118. Thus for high liquid flow rates a larger slit will allow a larger nozzle tip 118.

Tube nozzle of FIGS. 6A thru 6D, as opposed to the embodiment in FIGS. 2 thru 3, has a barbed fitting 200 with an axis that is radially removed from the axis of valve housing 202 but still intersecting at a common flange 204. With this arrangement, the flange center 214 is unobstructed by fitting 200. When the user presses tube nozzle 206 into boot 208, the user's thumb (not shown) pushes on the flange center 214 making for a less cumbersome mating then with centrally located fitting of FIGS. 2 thru 3.

For all nozzles, the exterior surface friction fits into the corresponding interior mating surface of the boot.

As with previous embodiments, nozzle components mate with the boot and in the process deforming boot structures making a generally leak tight seal between the two components. The perimeter of nozzle exterior surface 218 is larger than the corresponding perimeter of boot mating portion 216. The resilient nature of boot permits a snug leak tight fit between the mating surfaces 216, 218. In the preferred embodiment, nozzle mating surface 218 makes intimate contact with corresponding boot mating surface 216 followed by the nozzle tip 220 puncturing diaphragm slit 222. In this fashion leakage is minimized. Inherent in the union of nozzle tip 220 and slit 222 there is at least one leakage channel along the perimeter. When nozzle tip 220 punctures a slit 222, at the slit termination point in the diaphragm there exist an inherent channel for liquid flow by nozzle tip. Thus upstream from the union between nozzle and slit there must be a leak tight seal. With this embodiment, a leak tight seal is provided by the union of the mating portion of the boot with the mating portion of the nozzle any time the nozzle tip punctures the slit. Both nozzle housing and boot mating portion longitudinal dimension can be predetermined lengths.

Figure 7C:
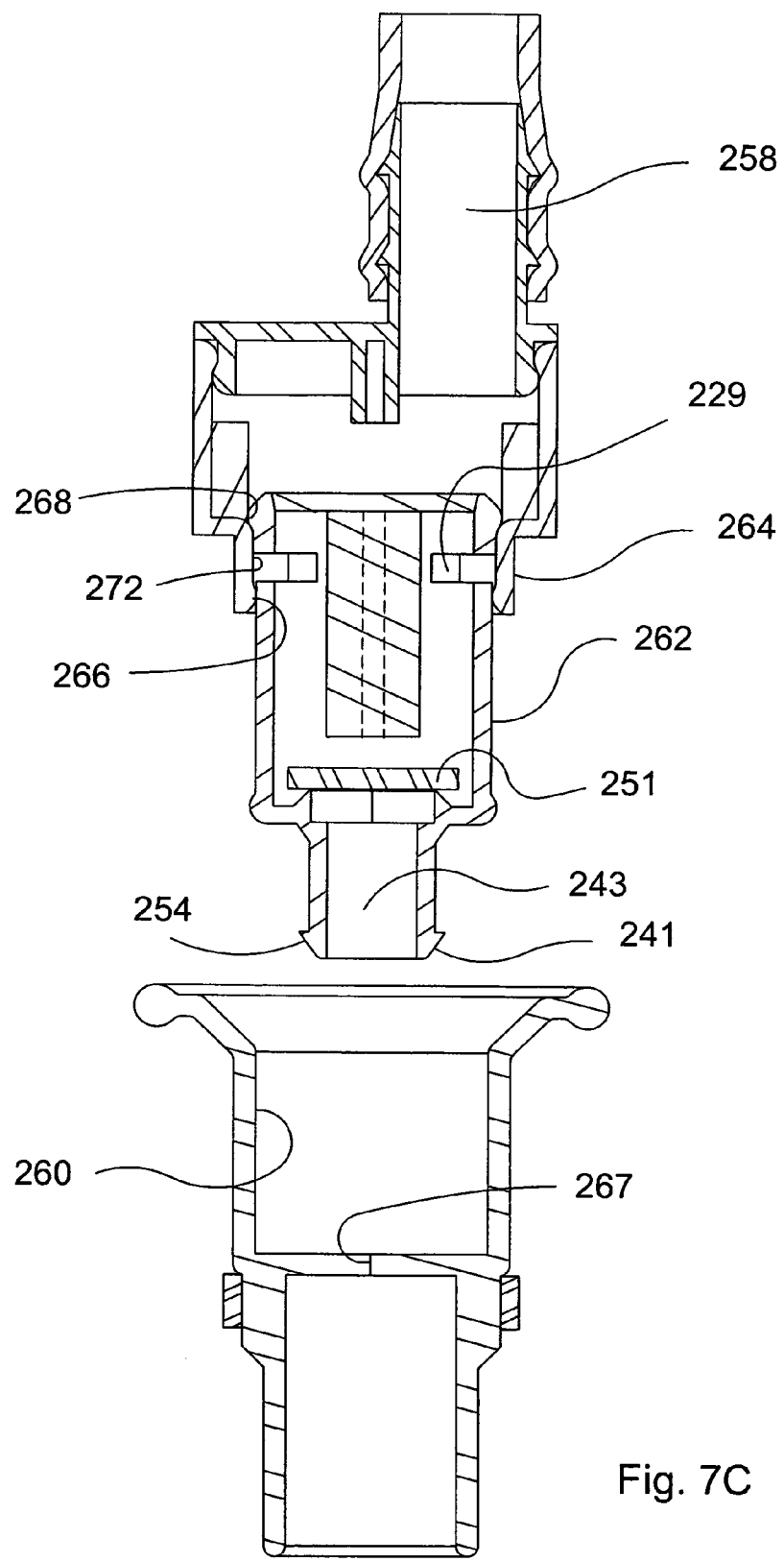

FIGS. 7A thru 7C show an embodiment where means are provided for automatic termination of fluid flow from both tube nozzle and boot.

Slidably disposed within the nozzle housing 224 is valve housing 226 movable between an open position wherein communication is established between valve interior 228 and the liquid delivery tube 227 through the passageway 229 and a closed position wherein communication between valve interior 228 and the liquid delivery tube 227 is terminated. As may best be seen with reference to FIGS. 7A thru 7C, valve housing 226 is of generally tubular shape having a closure plug 221 with a cross post 223 at one end. The ingress end of the valve housing has a check valve sealing seat 238 with at least one radial web 239 extending across the inner opening. Tip 241 extends from external opening into valve housing to sealing seat. Tip has an internal conduit 243 allowing communication from the outer opening 245 to valve seat opening 247. At least one valve element 251 in the form of a disc sits within valve housing.

When tube nozzle is pressed into boot as shown in FIGS. 7A thru 7B, valve housing slides within nozzle housing and is center guided by at least one guide rib 252 against annular rib 268. Slide action is terminated by post 256 in nozzle housing 224. Since passageway 229 communicates with nozzle housing interior 228, fluid can flow from the boot out though the nozzle fitting 258. If the pressure in the nozzle fitting 258 is lower than that in the nozzle tip 241, disc 251 will move away from sealing seat, jam into cross post 223, and fluid will flow as shown if FIG. 7B. However, if the pressure in the nozzle fitting is higher than that in the nozzle tip, disc will seal against sealing seat 238 and no fluid will flow as shown in FIG. 7A.

When tube nozzle is pulled out of boot as shown in FIG. 7C, the combination of tip barb 254 will jam into slit end walls 255 and the compressive force caused by the mating portion interior surface 260 on exterior surface 262 of valve housing 226 produces drag on housing. In turn valve housing 226 moves to the position shown in FIG. 7C and passageway 229 is sealed within the narrow portion 264 of nozzle housing. Fluid leakage around the perimeter of valve housing 226 is prevented by intimate contact between annual ribs 266, 268 and surface 272. Opposing annular ribs 266, 268 additionally prevents valve housing from being pulled out of nozzle housing 224. When tube nozzle is removed from boot, fluid inside tube housing presses disc 251 against sealing seat 238 also preventing leakage. As nozzle tip 241 is pull from boot, slit 267 closes preventing fluid leakage from the conduit connected to boot.

Another tube nozzle embodiment with positive shut-off features is shown in FIGS. 8A thru 8D. Tube nozzle 700 consists of a fitting housing and a valve housing. Slidably disposed in fitting housing is valve housing movable between an open position wherein communication is established between valve interior and the liquid delivery tube through the egress opening and a closed position wherein communication between valve interior and the liquid delivery tube is terminated. As may best be seen with reference to FIGS. 8A thru 8D, valve housing is of generally tubular shape having an egress opening with a porous seat at one end. The ingress end of the valve housing has a check valve sealing seat with at least one radial web extending across the inner opening. Tip extends from external opening into valve housing to sealing seat. Tip has an internal conduit allowing communication from the outer opening to valve seat opening. At least one valve element in the form of a disc sits within valve housing.

Valve housing has similar features and functions as other tube nozzle embodiment described above.

Figure 8B:
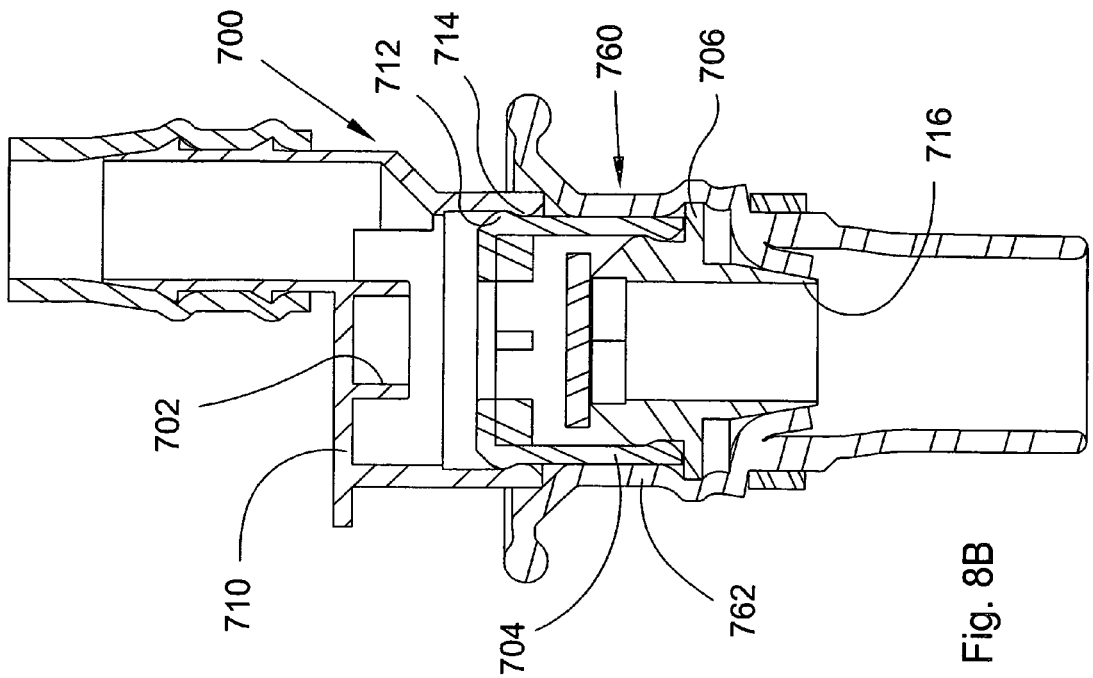
Figure 8A:
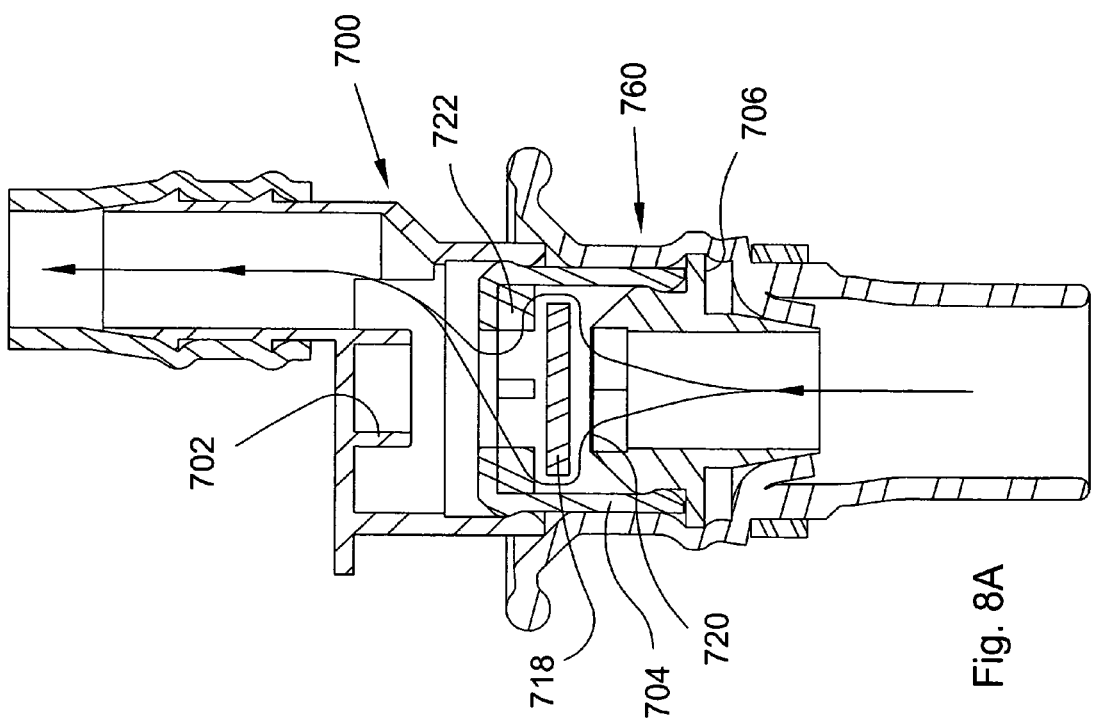

Before pressing tube nozzle 700 into boot 760 as shown in FIG. 8D, valve housing 704 is placed in the closed position where opening is filled with plug 702. When tube nozzle is pressed into boot, nozzle is in the closed position. As shown in FIG. 8C, once insert flange 706 of nozzle is pressed into mating portion 762 of boot, nozzle can be placed in the open position by clamping on the exterior of mating portion 762. Valve housing 704 slides within fitting housing 710. Slide action terminates when annular bumps 712, 714 make contact. Nozzle is then pressed into boot until tip 716 punctures slit 764. Since opening communicates with the interior of fitting housing and boot fitting portion communicates with valve seat, fluid can flow from the boot out though the nozzle fitting. If the pressure in the nozzle fitting is lower than that in the nozzle tip, disc 718 will move away from sealing seat 720, jam into radial vanes 722, and fluid will flow as shown if FIG. 8A. However, if fluid pressure in the nozzle fitting is higher than that in the nozzle tip, disc will seal against sealing seat 720 and no fluid will flow as shown in FIG. 8B. The slide action between valve housing and fitting housing can be replaced with a thread arrangement on the exterior of the valve housing and on the interior surface of the fitting housing.

When tube nozzle is pulled out of boot valve housing will remain in the open position relative to fitting housing until valve housing is pressed into fitting house. If a thread arrangement is employed them the two portions must be twisted into the closed position. Fluid leakage around the perimeter of valve housing is prevented by intimate contact between annual ribs and surfaces. Opposing annular ribs additionally prevents valve housing from being pulled out of nozzle housing. When tube nozzle is removed from boot, fluid inside tube, housing presses disc against sealing seal also preventing leakage. As nozzle tip is pull from boot, slit closes preventing fluid leakage from the conduit connected to boot.

Figure 9:
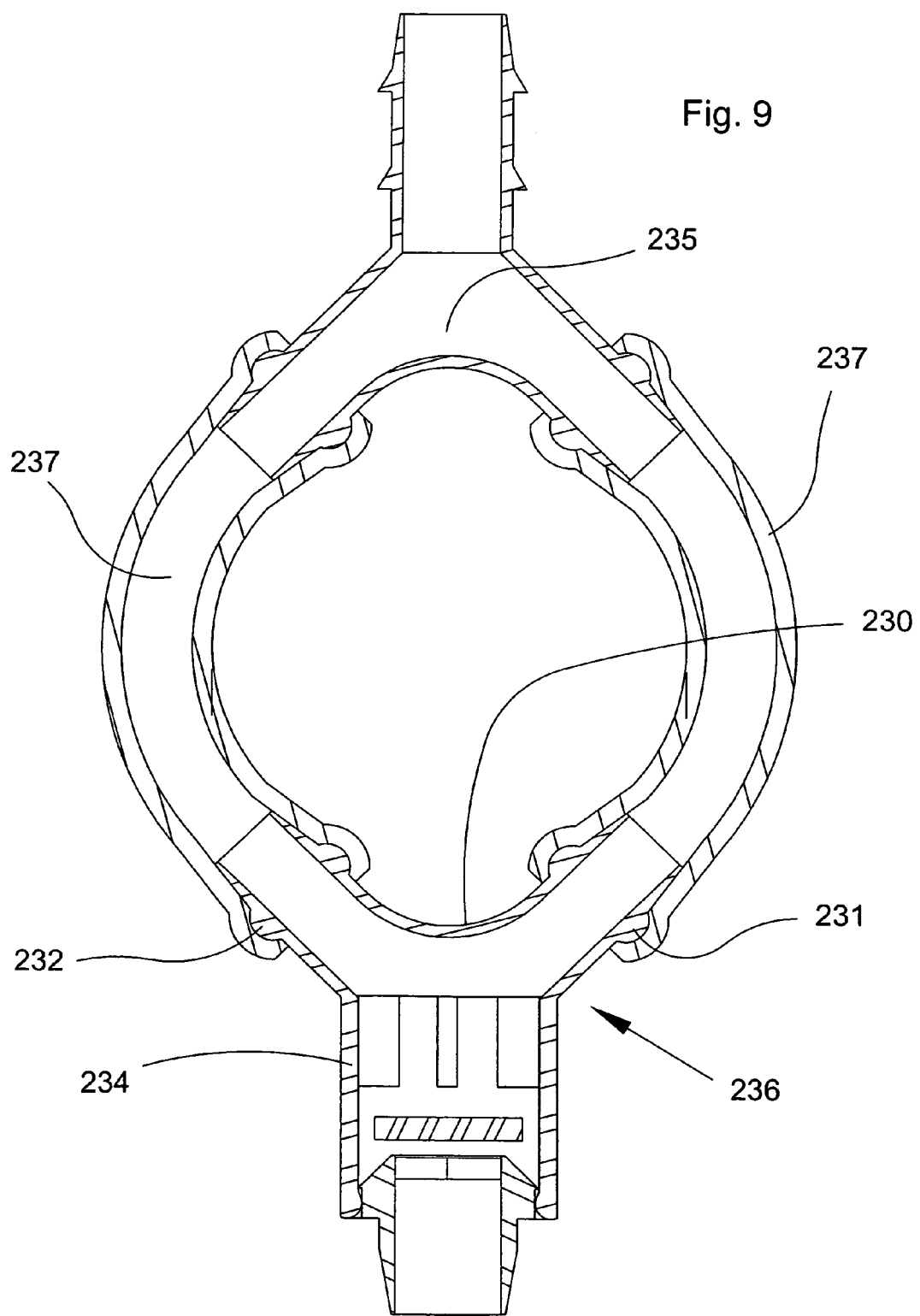
FIG. 9 shows a nozzle with "Y" delivery tube connection.

FIG. 9 shows "Y" nozzle, another embodiment of tube nozzle, in which the outlet consists of a "Y" barbed fitting 230 involving two barbed fittings 231, 232 instead of a single fitting that is shown in FIGS. 6A thru 8D "Y" fitting on nozzle serves an identical purpose to the offset outlet fitting of FIGS. 6A thru 8D. When the user presses tube nozzle 234 into boot, the user's thumb (not shown) pushes on the saddle of the "Y" making a less cumbersome mating as compared with centrally located fitting of FIG. 2. Further upstream of "Y" nozzle is another "Y" union fitting 235 to route the fluid from two tubes into one delivery tube. "Y" nozzle 236 and "Y" union 235 fittings generally lie in the same plane. The fittings of "Y" nozzle 236 are joined to the fittings of the "Y" union 235 with short lengths of tubing 237. In this way the user's thumb will fit in the resulting loop consisting of the "Y" fittings and adjoining tubing. All other features of the "Y" nozzle in this embodiment are identical in function to those designated with the same numeral shown in previous embodiments.

Figure 10A:
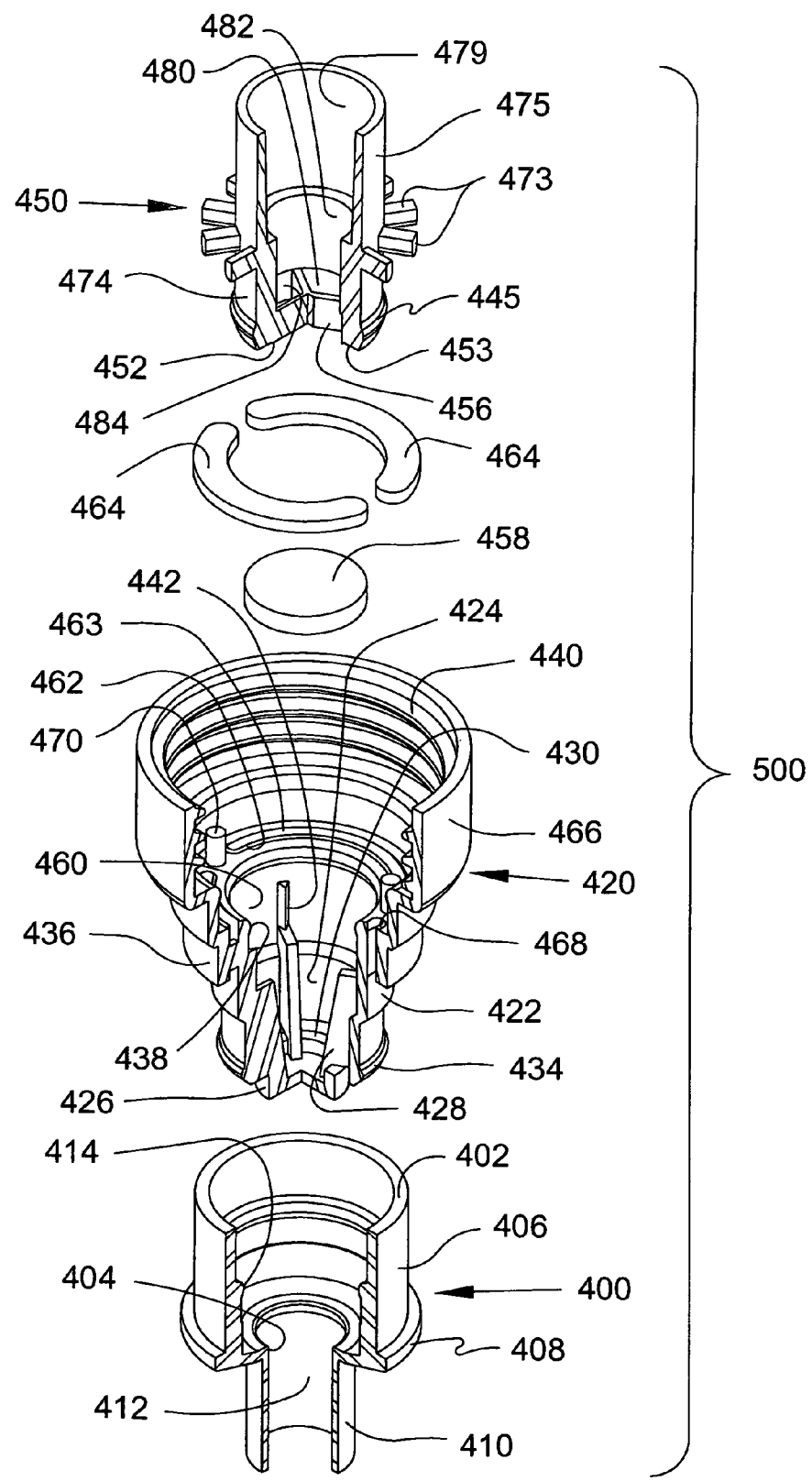
FIG. 10A is an exploded cross-sectional isometric view of a container closure nozzle for mating with a boot of the current invention.
Figure 10B:
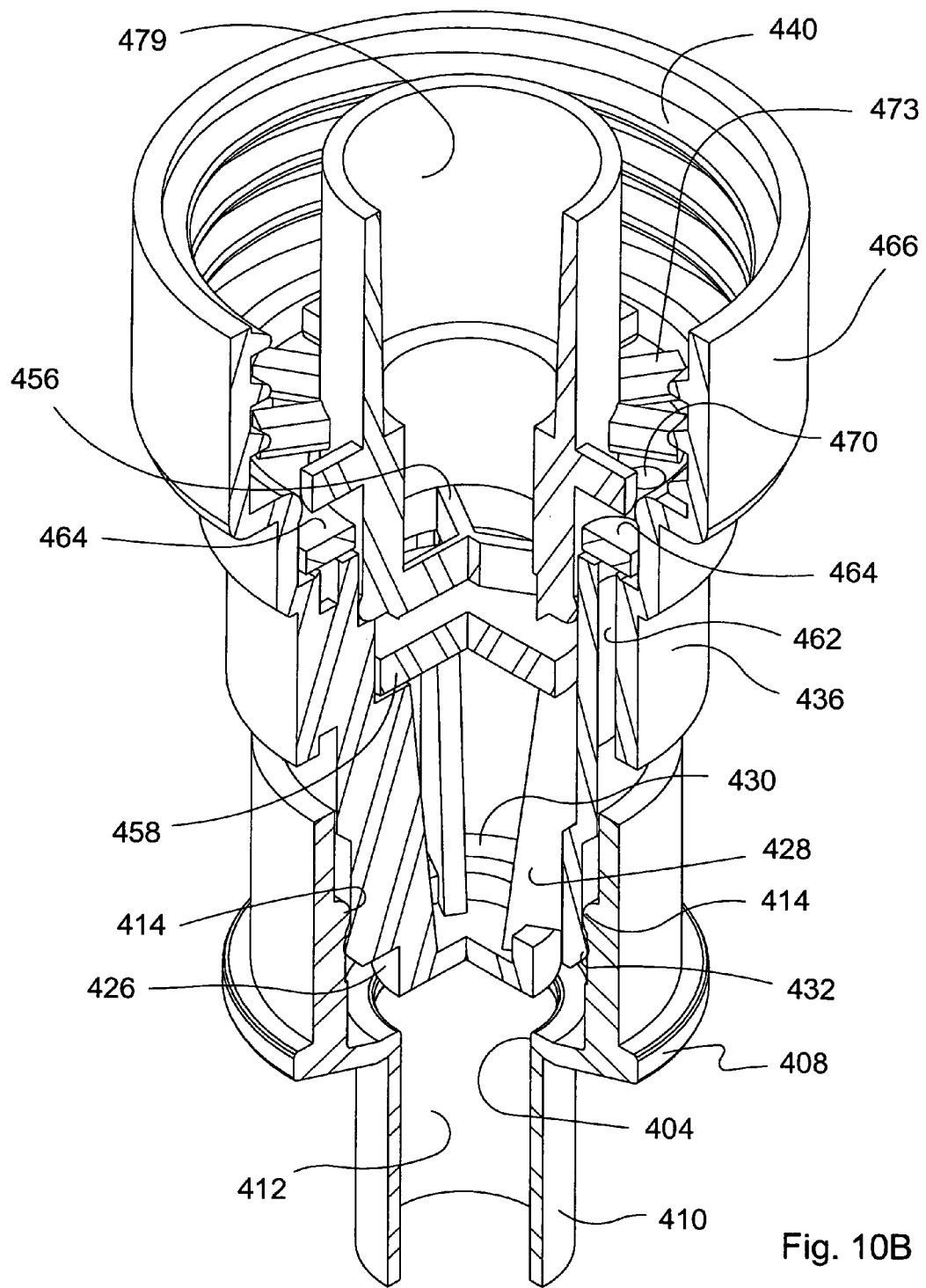
FIG. 10B is an assembled isometric view of a container closure nozzle shown is FIG. 10A.

In the drawings of FIGS. 10A thru 10B, the invention is illustrated in connection with a push-pull dispensing valve having a valve member in the form of a nozzle 400 slidably mounted on a base portion 420 for movement between open and closed positions.

In the embodiment of FIG. 10A, nozzle 400 has a generally annular end wall 402 with a central opening 404 and a cylindrical side wall or skirt 406. A radially extending flange 408 at the outer end of the nozzle 400 facilitates gripping of the cap for movement between the open and closed positions.

The base portion 420 of the push-pull dispensing valve 500 includes a housing 420 which has a cylindrical side wall 422 with an outer section of decreasing diameter and an extending passageway 424 formed therein. A plug 426 is mounted on radially extending vanes 428 at the outer end of the passageway 424, with openings 430 between the vanes 428. When the nozzle 400 is in the closed position, plug 426 is received in opening 404, with the side wall 412 of the nozzle 400. When the nozzle 400 is in the open position, the opening 404 of the nozzle 400 is space away from the plug 426, and liquid can flow out of the container through openings 404 and 430. Outward movement of the nozzle 400 is limited by a pair of radially projecting flanges 414, 432 on the nozzle 400 and housing 420.

The base portion of vented valve assembly or container closure also includes liquid egress check valve means in the form of a cylindrical side wall 434 and an annular end wall 466 at the base of the container closure 500. The container closure 500 is mounted on the mouth of the container with threads 440 that interlock and glide over corresponding threads on the container.

On interior side wall 460 of valve housing 436 of container closure 500 is at least one centering rib 442 that longitudinally extend from vanes 428 towards the threads stopping a predetermined distance from the interior radially projecting flange 438. Centering ribs 442 project radially to a lesser extent than vanes 428.

Pressed into the underside of container closure 500 is a tube connector 450 which includes a seating surface 452 on one end, a tubular portion 475 on the opposing end and a radially extending spokes 473 at the exterior mid-section. Seating surface 452 has a raised annular rim 453 that surrounds an opening 480 which communicates with the interior bore 482. At least one radial web 456 extends from the opening interior side wall 484 to the opening center. Structural means are provided to prevent tube connector movement into the container closure interior; when tube connector is pressed into container closure, sloping sidewall 486 surrounding the seating surface 452 jams into the end of centering ribs 442. Within the void provided between seating face 452, valve housing interior and at least one plug vane 428, is place at least one resilient valve element or disc 458. Longitudinal movement of the tube connector 450 inside the base portion 420 is prevented by the combination of radial projecting flanges 438, 445 on the housing 420 and tube connector 450, on the first end and the longitudinal ribs 442, on the other end.

In the embodiment of FIGS. 10A and 10B only one valve element or resilient disc 458 is shown. Two discs stacked along the central axis can also be used. With one disc, the material is denser than the liquid in the container. With two discs, the disc adjacent to the sealing seat 452 is denser than the liquid in the container and the other disc is less dense than the liquid in the container. The disc sits in the void of the valve housing.

Figure 26A:
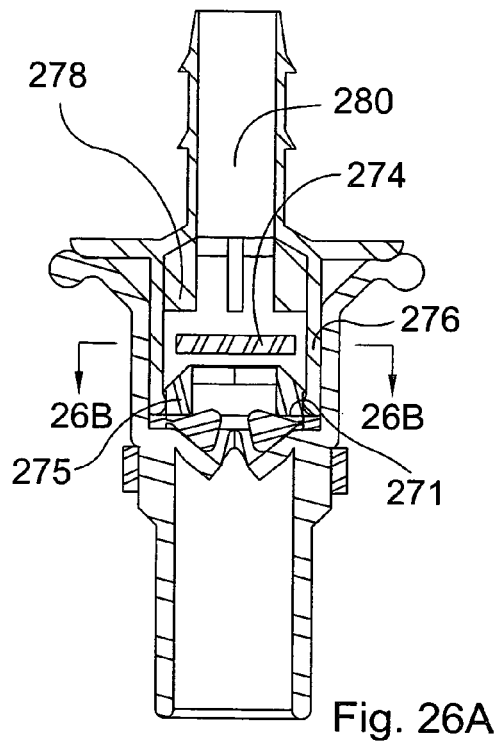
FIG. 26A is an operational view of the embodiment shown is FIG. 21A where a tube nozzle mates with the boot.
Figure 26B:
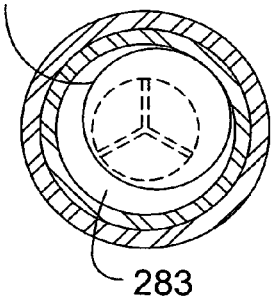
FIG. 26B is a cross-sectional of FIG. 26A taken along the line 26B-26B.
Figure 27B:
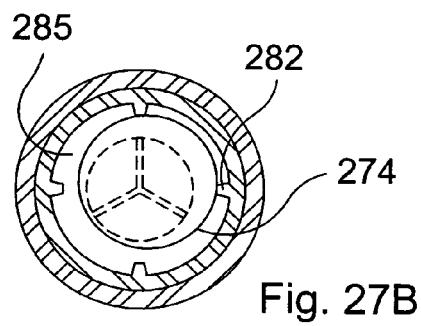
FIG. 27B is a cross-sectional of FIG. 27A taken along the line 27B-27B.

As shown in embodiments for tube nozzle of FIGS. 26B and 27B, for a sealing seat, the annular area between disc and valve housing side walls is greater when centering ribs 442 are used as compared to a valve housing that is absent centering ribs.

When nozzle 400 is coupled to boot with nozzle tip 410 penetrating boot slit and suction pressure is applied to nozzle opening. Liquid is drawn through the valve housing 436. The disc 458 will move up against plug vanes 428 allowing liquid flow in the process. Disc 458 will move radially from side to side within the valve housing 436 but is prevented from contact with side walls 460 by centering ribs 442. When the valve housing 436 is sitting with the nozzle 400 above the valve seat 452 and when suction pressure is removed from nozzle opening 404, the liquid will push the single disc 458 against the sealing seat surface 452. If the two disc are use, as described above, and suction pressure is removed from the nozzle opening 404, the liquid on the upstream side of sealing seat 452 will press the disc 458 against the sealing seat 452 whether the container is upright with the nozzle 400 above the valve seat 452 or whether the container is inverted with the nozzle 400 below the valve seat 436. In the preferred embodiment, the two discs as described above are utilized.

The at least one plug vane 428 acts as a porous seat for the check valve. Vane 428 prevents disc 458 from clogging the egress end of closure base 420.

The at least one longitudinal rib 442 centers disc in the valve housing 436 preventing disc 458 from contacting interior side walls 460 of closure base 420.

If sufficient liquid pressure is applied to the upstream side of resilient disc 458, disc 458 can be blown through or pushed through the sealing seat opening 480. At least one radial web 456 in tube connector 450 act to prevent resilient disc 458 from being pushed through opening 480.

In conjunction with liquid exiting the container, means is provided for permitting air to enter the container through vent slots 463 and for preventing liquid from leaking out through them. That means consists of at least one sealing member 464 which is mounted in the container valve housing 420. Sealing member 464 is a resiliently deformable relatively flat arc shaped structure. The flat surface of arced member seats against raised seat 462 of a vent slot 463. Vent slot 463 is a smaller arc shape than arced member 464. For proper sealing, arced member must overlap vent slot on all sides. The raised seat 452 acts to focus any liquid pressure on arced member around the perimeter of the air inlet vent slots 463. Spaced from vent slot 463 and integrally connected to housing are posts 470. Posts 470 prevent arced members 464 from rotating around the housing axis. Arced member 464 is bracketed or held in place by outside wall 474 of tube connector 450 on the interior arc of arced member, by inside wall of the thread housing on the exterior arc or arced member, by posts 470 on the rounded ends of arced member, by sealing seal on the air ingress side of arced member and by radial spokes 473 on the container side of arced member 464.

When a vacuum or negative pressure differential exist inside the container relative to the ambient pressure outside the container, the sealing member will momentarily move from a first sealing position, in which it is engaged with the sealing seat surface, to a second position venting position, where it is disengaged from the sealing seat surface, allowing air into the container.

To additionally prevent fluid leakage from the container out through the vent slot, radial spokes can have a structure (not shown) that contacts the resilient sealing member in the area corresponding to the slot void and forces sealing member to be in contact with the raised seat of the slot. When a vacuum or negative pressure differential exist inside the container relative to the ambient pressure outside the container the edge of the resilient sealing member will momentarily fold up away from the sealing seat allowing air into the container. Again resilient sealing member has two positions a first sealing position and a second venting position.

A single arced sealing member over a given slot can be replaced with two arced sealing members stacked one on top of the other. With the later arrangement the arced member adjacent to vent slot is fabricated of resilient material of greater density than the liquid in the container, and the material of the arced member adjacent to radial spokes is fabricated of resilient material of lesser density than the liquid in the container. The arced member adjacent to vent slot will be called the sealing member and the arced member adjacent to radial spokes will be called the buoyant member. With this arrangement, when the container is in an upright position and the level of liquid is high enough to spill out the vent slot, the buoyancy of the buoyant member holds the sealing member in sealing engagement with the seat of vent slot to prevent liquid from exiting the slot. When the container is in an inverted position, buoyant member pushed against sealing member which engages the seat of vent slot and prevents liquid form leaking out through vent slot. As liquid is withdrawn through the nozzle opening and pressure inside the container starts to drop, sealing member unseats from seat, allowing air to enter the container through the at least one vent slot and thereby prevent the formation of a vacuum within the container.

The advantage of two or more vent slots, each slot covered with by a corresponding sealing members, over a single washer sealing member covering these slots is a savings in material. When comparing manufacture of arc members to washer members and using the same area of sheet material, three times as many arc members can be made versus washer sealing members. The center hole area of the die cut washer is wasted as compared with an arced sealing member the arcs can be cut in an array pattern that consumes the area on the concaved side of the arc.

Tube connector allows liquid to dispense from a container place in an upright orientation where the container opening is above the container. Fitting portion 475 is cylindrical in shape with interior wall 479 drafted from a larger diameter at the opening to a smaller diameter in the mid-section of the tube connector. As a tube (not shown) is pressed into fitting portion interior, the exterior surface of the tube is compressed and snug fluid-tight seal is made between tube connector interior wall and the tubing exterior wall. In this way tubes with variable outside diameters will snuggly press into the tube connector.

Valve housing 420, tube connector 450 and nozzle 400 are injection molded of plastic material such as polypropylene or polyethylene. Resilient disc 458 and resilient curve sealing member 464 are die cut from a sheet of silicone or similar resilient material.

Figure 11A:
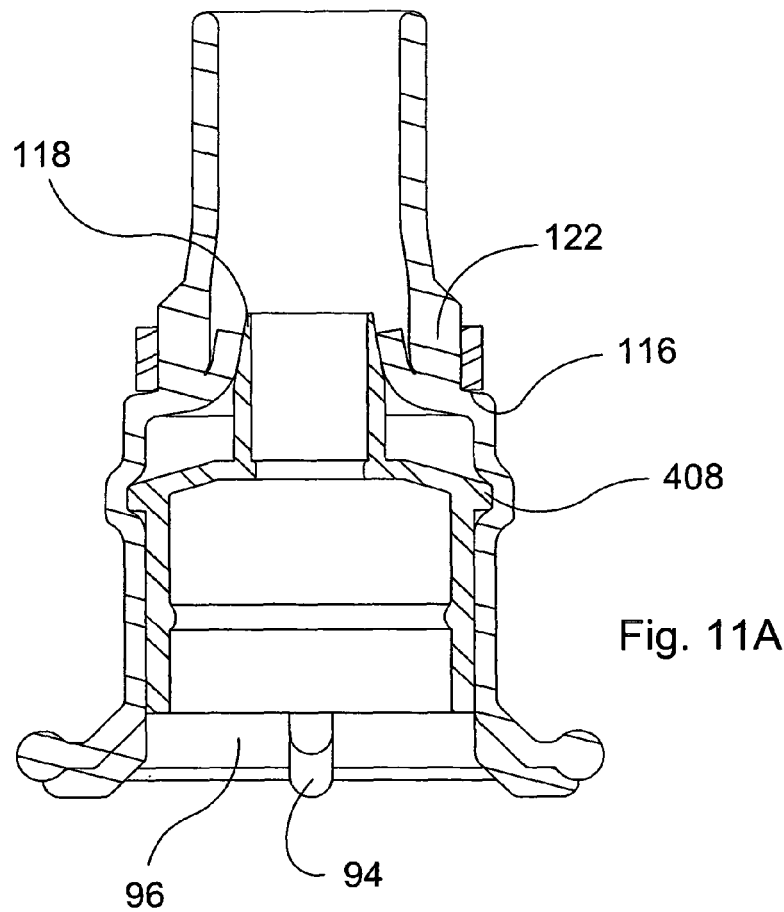
FIG. 11A is an operational view of an embodiment incorporating the bottle closure nose from FIG. 11B.

FIG. 11A shows the container closure nozzle of FIGS. 10A and 10B mated with boot 60 from FIG. 1; for simplicity only the nozzle of the container closure is shown without the closure valve housing. The nozzle tip penetrates the boot slit providing a fluid path or communication from the container interior to the boot fitting. As the boot is pressed onto the nozzle, the wall of the boot mating portion deforms to receive the exterior diameter of the closure nozzle. The nozzle flange further deforms the wall of the boot mating portion. The interior surface of deformed boot mating portion makes a fluid tight seal around the external surface of the closure nozzle and flange. In this configuration, fluid can flow from the container up the draw tube through the bottle closure check valve out the nozzle tip into the tube that joins to the boot fitting portion.

Figure 11B:
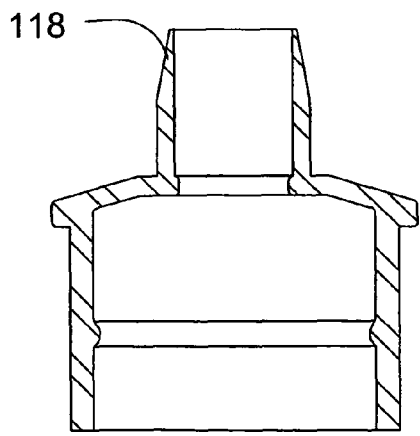
FIG. 11B is a cross-sectional view of the bottle closure nose of FIG. 11A.
Figure 11C:
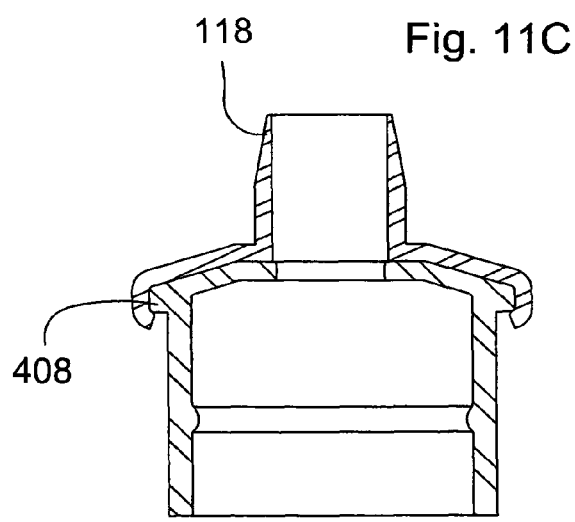
FIG. 11C is a cross-sectional view of second bottle closure nose with a snap-on tip.

FIGS. 11B and 11C show two closure nozzle versions both with a tip capable of penetrating the boot slit. The closure nozzle in FIG. 11B has the tip built onto the nozzle. Whereas, the closure nozzle shown in FIG. 11C has a tip on a flange that snaps over the face of a standard push-pull nozzle, flange has a cup that snaps over the rim of a standard push-pull nozzle making a leak tight fit between the nozzle face and the snap-on flange. In this way an off the shelf push-pull nozzle can effectively mate with my boot invention allowing for fluid flow from the container to a tube that joins with the boot.

FIGS. 12A thru 18C show various versions of value means for the closure diaphragm of boot. All other features of boot are identical in functions to those of other embodiments designated with the same numeral shown in this patent.

Figure 12B:
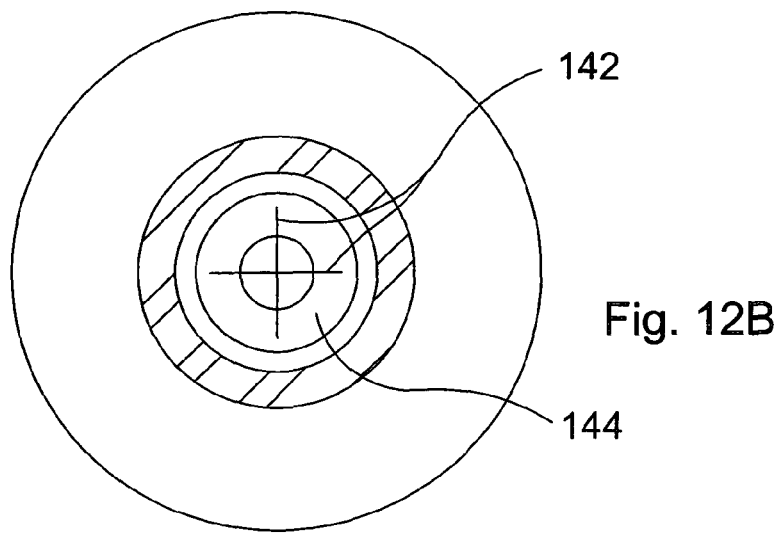
FIG. 12B is a cross-sectional view taken along the line 12B-12B of FIG. 12A.
Figure 12A:
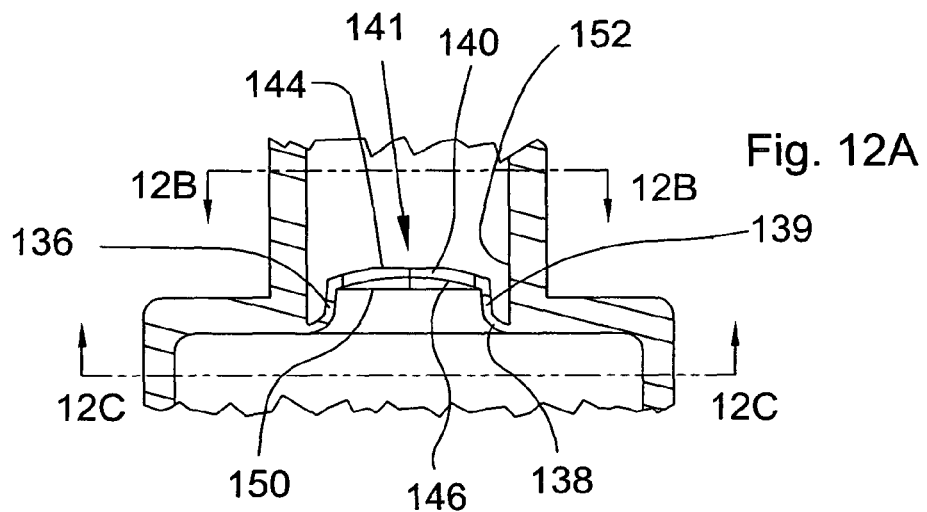
FIG. 12A is an isolated cross-sectional of the boot closure with self-sealing cross slitted hinged tubular walled structure built into the boot closure.
Figure 12C:
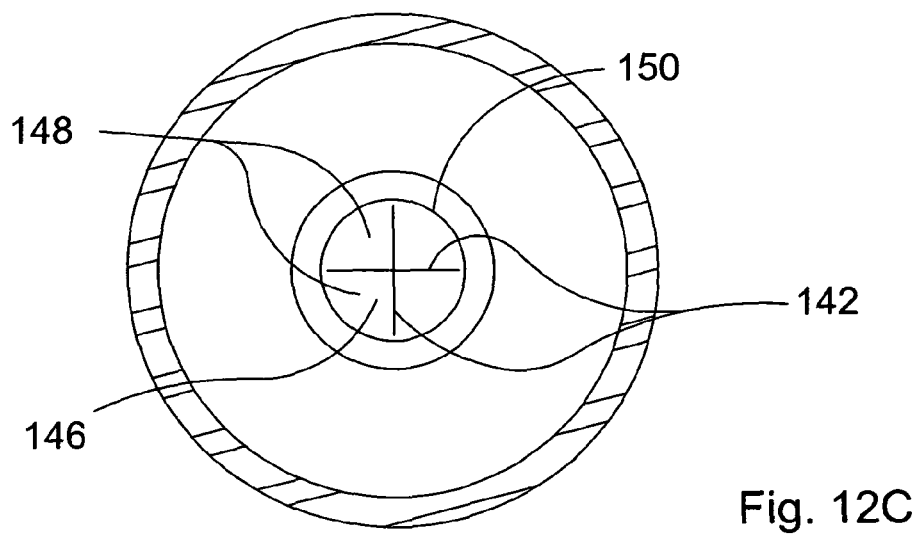
FIG. 12C is a cross-sectional view taken along the line 12C-12C of FIG. 12A.
Figure 13B:
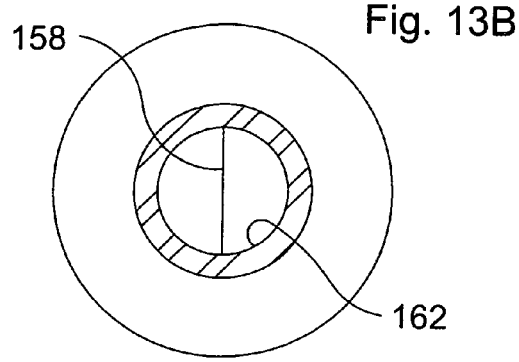
FIG. 13B is a cross-sectional view taken along the line 13B-13B of FIG. 13A.
Figure 14B:
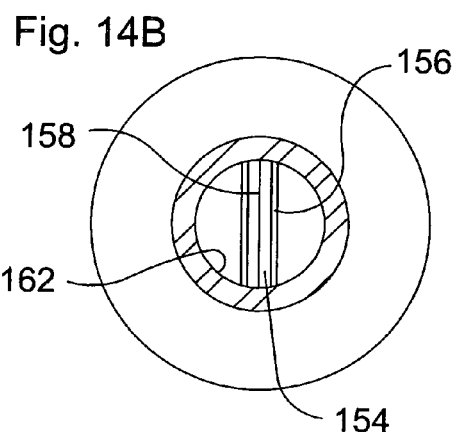
FIG. 14B is a cross-sectional view taken along the line 14B-14B of FIG. 14A.
Figure 13A:
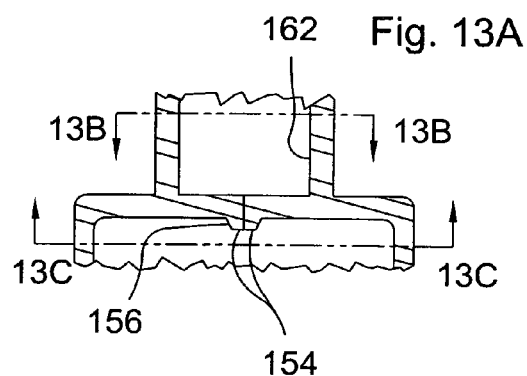
FIG. 13A is an isolated cross-sectional of the boot diaphragm with slitted self-sealing elevated dual lip structure on the mating side of the boot closure.
Figure 14A:
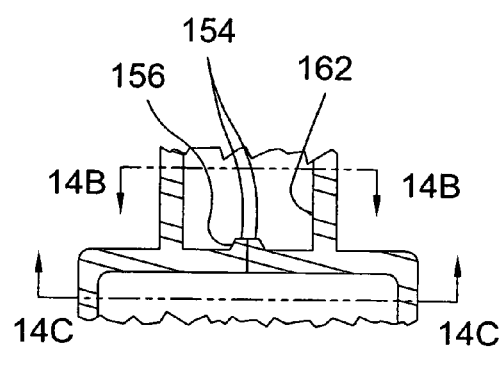
FIG. 14A is an isolated cross-sectional of the boot closure with slitted self-sealing elevated dual lip structure on the conduit side of the boot closure.
Figure 13C:
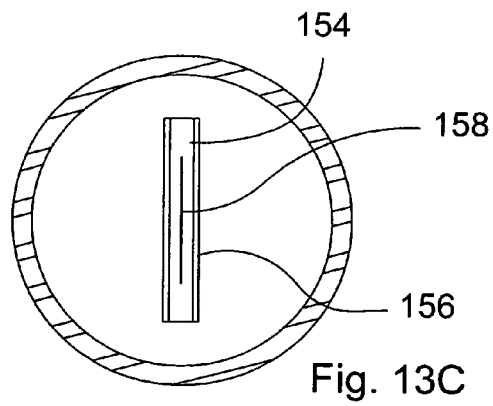
FIG. 13C is a cross-sectional view taken along the line 13C-13C of FIG. 13A.
Figure 14C:
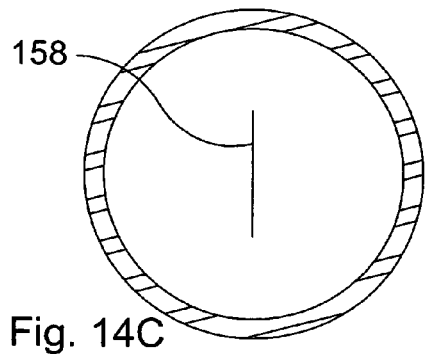
FIG. 14C is a cross-sectional view taken along the line 14C-14C of FIG. 14A.
Figure 15B:
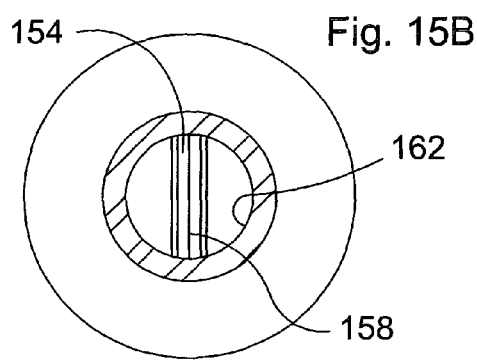
FIG. 15B is a cross-sectional view taken along the line 15B-15B of FIG. 15A.
Figure 16B:
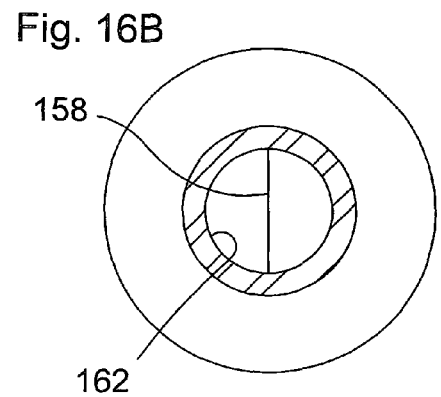
FIG. 16B is a cross-sectional view taken along the line 16B-16B of FIG. 16A.
Figure 15A:
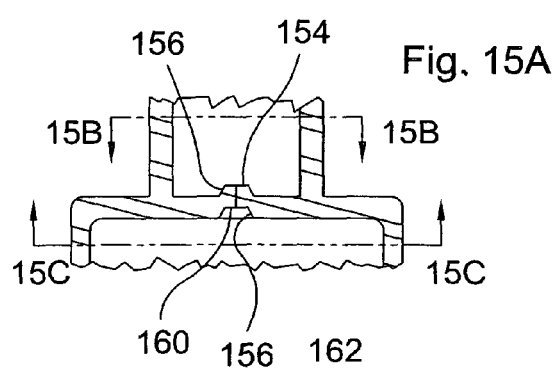
FIG. 15A is an isolated cross-sectional of the boot closure with slitted self-sealing an elevated dual lip structure on the conduit side of the boot closure in conjunction with trench structure on the mating side of the boot closure.
Figure 16A:
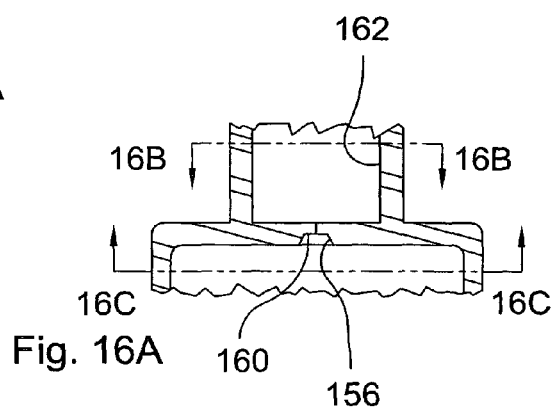
FIG. 16A is an isolated cross-sectional of the boot closure with slitted self-sealing trench structure on the mating side of the boot closure.
Figure 15C:
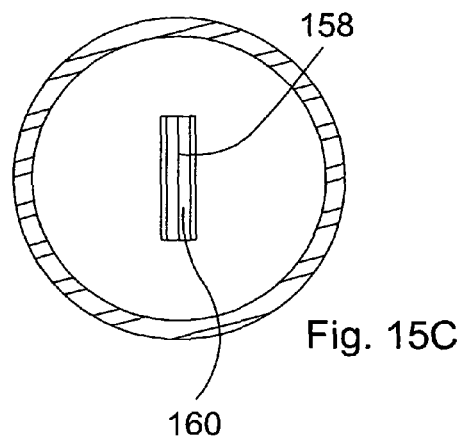
FIG. 15C is a cross-sectional view taken along the line 15C-15C of FIG. 15A.
Figure 16C:
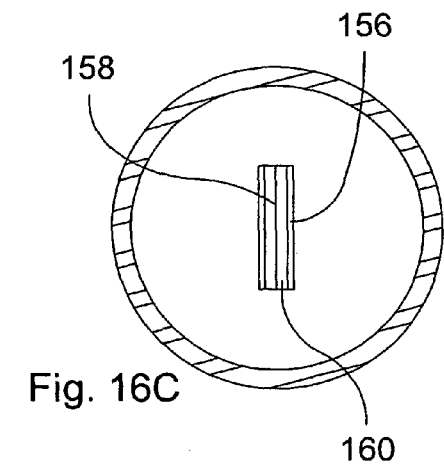
FIG. 16C is a cross-sectional view taken along the line 16C-16C of FIG. 16A.

As shown in FIG. 12A thru 12C boot has sealing means in the form of a central structure 141 integrally attached to internal wall 152 of boot with an annular hinge 138 extending into sidewalls 136, 139 with an end wall or diaphragm 140. At least two intersecting slits 142 are formed in the diaphragm 140, the slits 142 extending between the interior closure surface 146 and the exterior closure surface 144. Intersecting slits 142 formed into diaphragm 140 form pie-shaped segments 148 in the area adjacent to slits. Length of slits terminates at or within the perimeter of internal portion 150. In the current embodiment said central structure 141 is tubular but can also be square, rectangular, or triangular in shape with no need to flex at hinge 138. When nozzle tip penetrates the diaphragm 140, tip deforms the segments 148 providing an opening within the diaphragm. With an opening fluid can flow between the nozzle and the boot. When the nozzle tip is removed from the diaphragm 140, segments 148 return to closed position terminating fluid flow.

Embodiments of FIGS. 13A thru 17C show various diaphragm sealing means or structures. All these structures provide increased surface area of diaphragm exterior walls relative to the internal cross-section area of diaphragm taken through the slit. With the surface area of the external surface being greater than the internal cross-sectional area, a higher surface tension exists on the external surface relative to the internal cross-sectional area. This produces a self-sealing slit. All the diaphragms shown in FIGS. 13 thru 17 have external diaphragm surfaces with greater surface area than the internal cross-sectional area taken through the slit. The various structures show protruding pairs of pairs of lips 154 divided by slit 158 bracketed by sloping side walls 156. Also shown are recessed pairs of trenches 160 divided by a slit 158 bracketed by sloping side walls 156. It should be noted that in the preferred embodiment the lip 154, and trench 160 side walls 156 are slope at a predetermined angle but in other embodiments these side walls can be curved. Combinations of these structures on either or both sides of diaphragm are shown in FIGS. 13A thru 17C. For all these embodiments the length of slit terminates at or within the internal perimeter of tube retention portion 162.

Embodiment of FIGS. 18A thru 18C employs a variant of the principal given above with slit 165 formed between a pair of curved lips 164 protruding into the tube retention portion 162 of boot. Each said curved lip defining a side wall of the slit. Again the external surface area of the structures of the surface of diaphragm is greater than the internal cross-sectional area, producing a self-sealing slit with nozzle tip removed from slit. The length of slit terminates at or within the internal perimeter of tube retention portion.

The boot embodiments shown in FIGS. 13A thru 18C function similar to previously mentioned boot embodiments interacting with a nozzle having a penetrating tip.

Another method to produce at least one self-sealing slit in diaphragm is by adding compressive force means around the unstressed diaphragm. Even better is to have compressive force means directed orthogonal to slit. Previously mentioned embodiments incorporated a compressive band contacting external surface of boot coincident with the general longitudinal position of diaphragm. Other versions that meet the principal given above are shown in FIGS. 19A thru 20B in which a band compresses the boot surface in the region of diaphragm. FIG. 19B shows an oval or oblong external structure 166 of boot that produces a focused orthogonal compressive force provided by band 169 on diaphragm slit 167. FIGS. 20A and 20B shows a compressive band 168 that encircles a generally circular cross-sectional boot that results in uniform radial compressive forces applied to diaphragm slit 167. Bands 168, 169 in FIGS. 19A thru 20B can be made of resilient or rigid material and can partially encircle the boot.

FIGS. 21A thru 22C show other version of rigid bands 172, 173 that not only apply compressive forces against diaphragm slit 167 but also provide a rigid over-structure portion 170, 171 that prevents external crush forces from inadvertently opening slit 167. In this way if boot is crushed, slit 167 will remain relatively leak tight. These bands 172, 173 contact the external surface of boot in at least two locations, ideally the joining line between these at least two locations is orthogonal to said internal slit 167.

Another coupling assembly version in teachings with the current invention is shown in FIGS. 23A thru 23C. All features and functions are similar to those of previous disclosed embodiments with the exception of the radial vent ribs at the opening of the coupling portion of boot as well as at least one elongated protrusion 240 is provided juxtaposed to the at least one slit on the end wall 242 of the boot mating portion 244. In other words, at least one protrusion is provided on the surface of the mating portion side of the closure and juxtaposed to the at least one slit. Correspondingly, nozzle 246 is absent a penetrating tip. Current nozzle is a tube nozzle but it can also be a closure nozzle. At least one vent rib 248 is provided for use with a vented container closure nozzle similar to that shown in U.S. Pat. No. 5,927,565. In the preferred embodiment, boot 250 is of integral, unitary or single piece construction with said vent rib 248 and said diaphragm protrusion 240 being form when boot is molded.

As shown in FIG. 23C, when nozzle 246 is fully coupled with boot 250, nozzle face 253 presses against diaphragm protrusion 240 thus opening slit 249 and providing a liquid flow path through assembly. When nozzle 246 is removed from boot 250, slit 249 reseals preventing liquid leakage.

Protrusion housing 257 of the embodiment shown in FIGS. 24A thru 24E is manufactured separately from boot. Protrusion housing 257 is preferably constructed of rigid material such as plastic or metal. Housing 257 consisting of a rim 259 with at least one protruding strut 261 both joined at a hinge 263. In the preferred embodiment said hinge 263 is bi-directional. Strut 261 has a rounded triangular shape. Correspondingly, a recess tub 265 is formed in the boot for receiving protrusion housing 257. Protrusion rim 259 fitted into tub 265 of boot is shown in FIG. 24A. All other elements are similar to those of previously described embodiments with like reference numerals.

Operational views of boot interacting with various versions of nozzles are shown in FIGS. 25 thru 27B. All nozzles are absent a penetrating tip.

Figure 25:
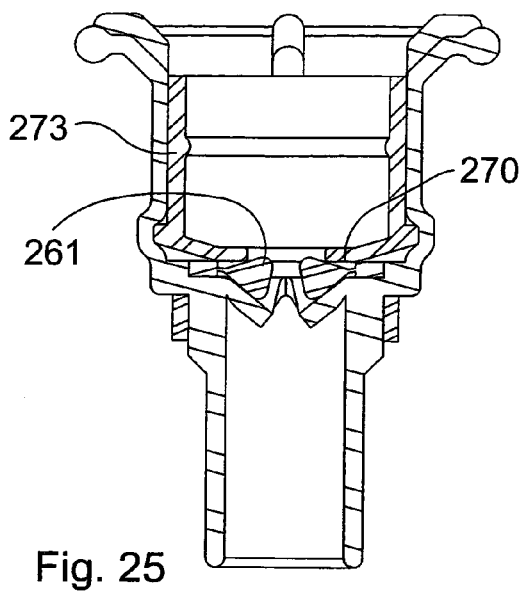
FIG. 25 is an operational view of the embodiment shown is FIG. 24A where a closure nose mates with the boot.

FIG. 25 shows face 270 of container nozzle 273 pushing hinged struts 261 which in turn push against diaphragm which opens slit thus allowing liquid flow through assembly.

FIG. 26A shows one version of tube nozzle with a relatively large diameter check valve disc 274 sitting in the void provided with sealing seat insert 275 is pressed into valve housing 276. Housing has only radial ribs 278 that stop disc 274 from plugging egress tube 280 thus acting as a porous seat. When tube nozzle is fully coupled with boot, nozzle face 271 pushed struts against diaphragm thus opening slit allowing liquid flow through the assembly.

Figure 27A:
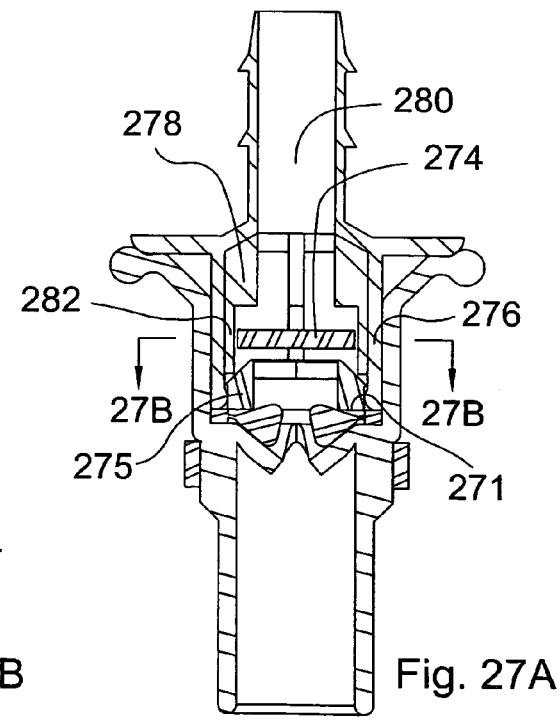
FIG. 27A is an operational view of the embodiment shown is FIG. 21A where another tube nozzle mates with the boot.

Embodiment shown in FIG. 27A is similar to that shown in FIG. 26A, and like reference numerals designate corresponding elements in the two embodiments. Embodiment shown in FIG. 27A has the modification of at least one longitudinal rib 282 that center a smaller diameter disc onto sealing seat. Sealing seats of FIGS. 26A and 27A have the same diameter. Inside surface of nozzle housing in both FIGS. 26A and 27A have the same diameter. However, disc diameter in FIG. 27A is smaller than disc diameter in FIG. 26A. With disc in housing, there exist an annular flow area 283, 285 between disc and internal wall. As shown in FIGS. 26B and 27B, since disc diameter of FIG. 27B is smaller than disc diameter in FIG. 26B, the wetted area 285 shown in FIG. 27B is greater than the wetted area 283 shown in FIG. 26B thus allowing a higher liquid flow through tube nozzle of FIGS. 27A and 27B than that through the embodiment in FIGS. 26A and 26B. With regards to coupling functions embodiment shown in FIG. 26A thru 27B operates identically to those described above.

Figure 28A:
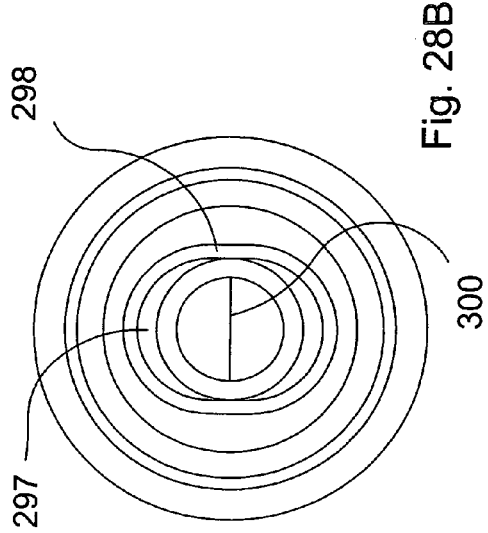
FIG. 28A is a cross-sectional view of a boot embodiment with annular ribs on the internal mating surface.
Figure 28B:
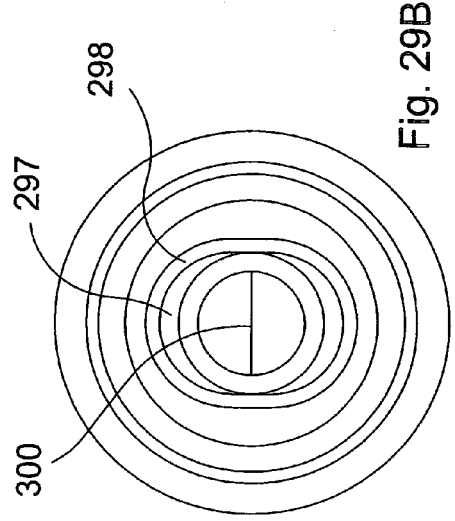
FIG. 28B is an end view of the boot shown in FIG. 28A.

Referring now to FIGS. 28A and 28B, this embodiment includes at least one integral annular rib 290 on the interior wall 292 of mating portion of boot. As compared to previous boot embodiments, rib 290 allows for a thinner wall thickness of mating portion with a leak tight coupling and requires a lower tensional force for decoupling. Boot 296 is of integral, unitary or single piece construction with at least one rib being form when boot is molded. Also, in FIG. 28B is shown an oval exterior wall section 297 where compression band 298 will fit thereon. This oval shape will focus compressive force perpendicular to slit 300. All other features of the embodiment in FIGS. 28A and 28B are similar to those previously described for other boot embodiments.

Figure 29A:
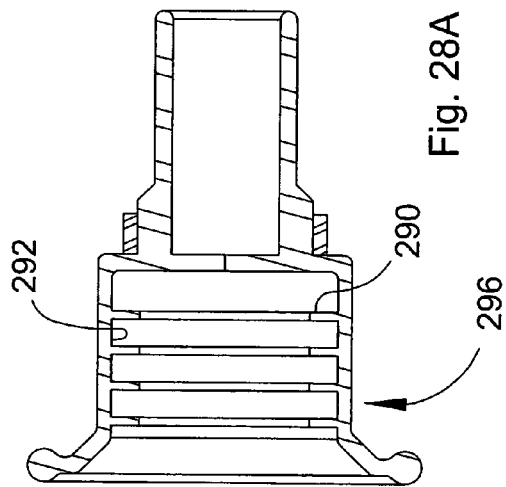
FIG. 29A is a cross-sectional view of a boot embodiment with flared ribs on the internal mating surface.
Figure 29B:
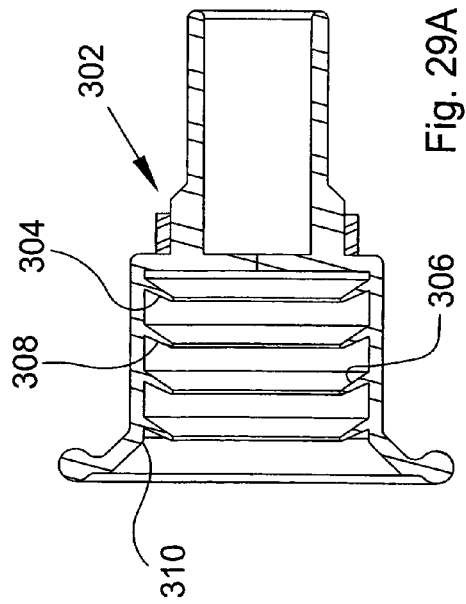
FIG. 29B is an end view of the boot shown in FIG. 29A.

FIGS. 29A and 29B show a boot 302 embodiment with at least one flared integral rib 304 on the interior wall of mating portion of boot. Flared rib 304 has an inner rib wall 306 and an outer rib wall 308, said rib walls converging in the direction of flared opening 310. That is, the inner rib wall 306 flares outwardly from the longitudinal axis of the boot at an angle greater than the angle at which outer rib wall 308 flares outwardly from the longitudinal axis of the boot 302. Boot 302 is of integral, unitary or single piece construction with at least one rib 304 being formed into molded boot. With flared shape ribs, associated boot is easily ejected from the mold during mold injection manufacturing. All other features of the embodiment in FIGS. 29A and 29B are similar to those previously described for other boot embodiments.

Other boot valve embodiments are shown in FIGS. 30A thru 30D, in which diaphragm 312 has an orifice 314 through which a blocking member 316 engages or disengages sealing seat 318 of orifice 314 thus respectively terminating or allowing liquid flow though coupling assembly. Member 316 includes a rim 320 with at least one radial resilient spoke 322 connected to a central hub 324 from which a shaft 326 axially extends to a sealing flange 328. Around the perimeter of hub 324 and projecting parallel to the central axis from both sides of hub are located at least one bump 330. Bump 330 act as stops preventing hub walls 332, 334 from contacting either nozzle face 336 or end wall 339 of boot mating portion. Blocking member 316 is of integral, unitary or single piece construction and is formed of resilient flexible material such as rubber, silicone, or resilient thermally engineered plastics (in particular, kraton or dynaflex). In this regard flange 328 is made with two walls that flair away from shaft. In this way the flange 328 and associated blocking member will easily eject from the manufacturing mold.

For a functional boot, blocking member 316 must be pressed into boot 301. When member 316 is pressed into boot, as shown in FIG. 30B, flange 328 passes through orifice 314 of resilient diaphragm 312 and sealing surface of flange 328 sits adjacent to sealing surface 318 of boot. With sealing surfaces in contact resilient spokes 322 are preloaded in tension keeping surfaces in intimate contact. To prevent resilient plug from buckling inward a stiff rim 340 is positioned inside plug rim 320. Rim 340 can be co-injected when blocking member 316 is manufactured.

Figure 30A:
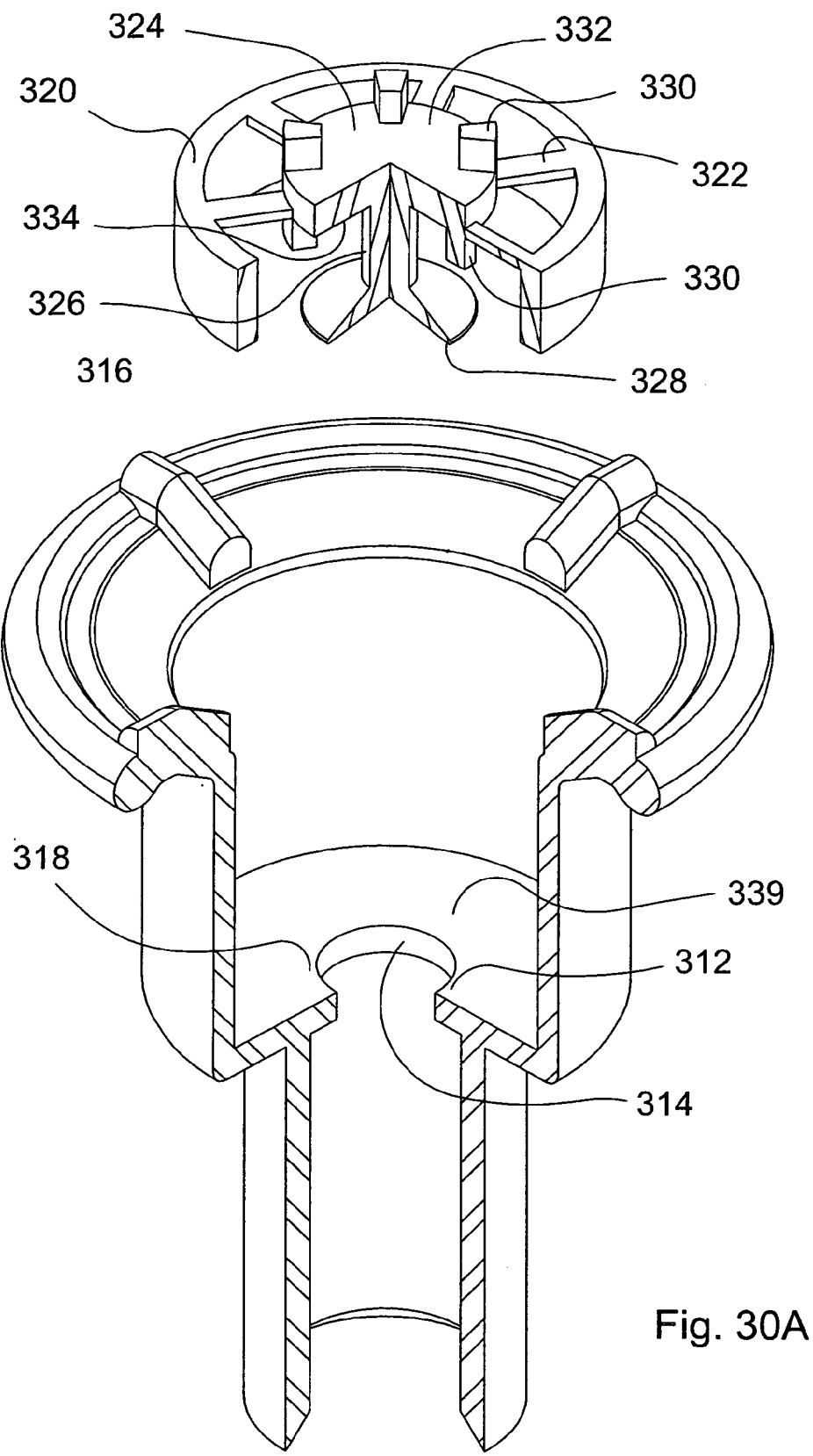
FIG. 30A is an exploded cross-sectional isometric view of the boot with an internal orifice and an associated orifice blocking member.
Figure 30B:
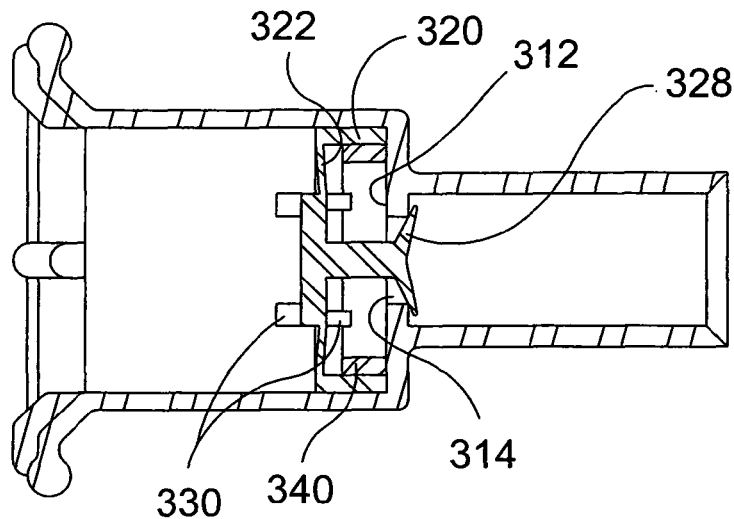
FIG. 30B is a side cross-sectional view of the boot of FIG. 30A.
Figure 30C:
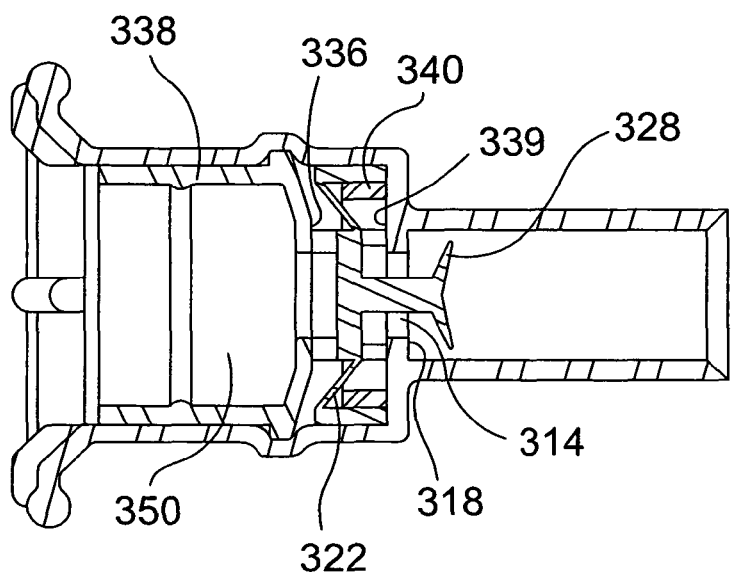
FIG. 30C is an operational view of the embodiment shown is FIG. 30A where a closure nose mates with the boot.

Operationally a closure nozzle 350 or tube nozzle (not shown) absent a penetrating tip is fully pressed into boot 301 as shown in FIG. 30C. Nozzle face 336 contact bumps 330 on hub and opposing bumps contact end wall 339 of boot. Liquid can egress from container (not shown) through nozzle orifice around bumps 330 and spokes 322 through diaphragm orifice past flange into delivery tube (not shown). Bumps 330 on hub are of a predetermined height allowing for maximum liquid flow through coupling assembly. As components are uncoupled nozzle face moves longitudinally away from diaphragm and blocking member returns to the configuration shown in FIG. 30B. In normal operation nozzle 338 is mounted on a container closure similar to that in FIGS. 10A and 10B. Resilient spokes 322 pull flange 328 into contact with orifice sealing surface thus terminating liquid flow. In other words, resilient spoke 322 urges blocking member 316 to engage the surface surrounding the orifice 314 when the face disengages bump 330. It must be noted that tube nozzle and boot coupling assembly will function in a similar fashion. Not shown is the delivery tube that will connect to the fitting portion of the boot. Also not shown is the container upon which the container closure is mounted.

Figure 30D:
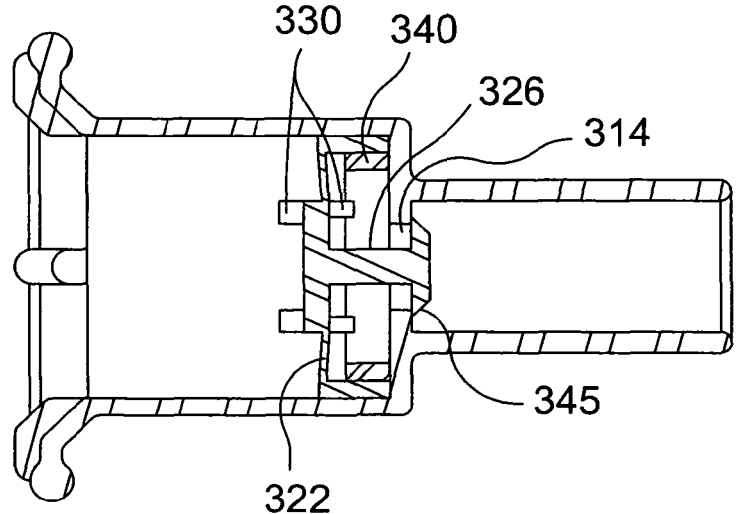
FIG. 30D is a side cross-sectional view of the boot of FIG. 30A employing another embodiment of the blocking member.
Figure 2:
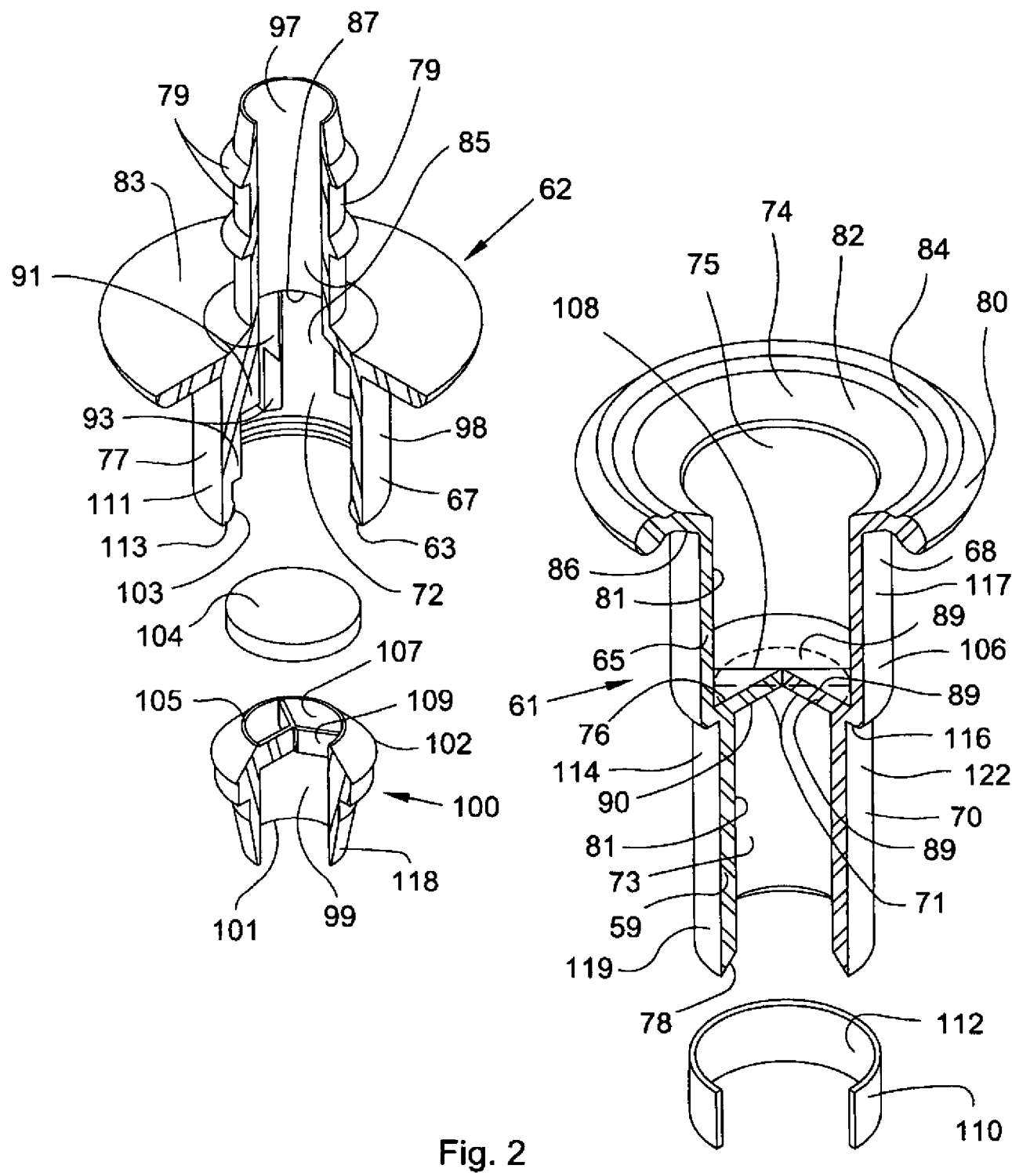
Figure 3:
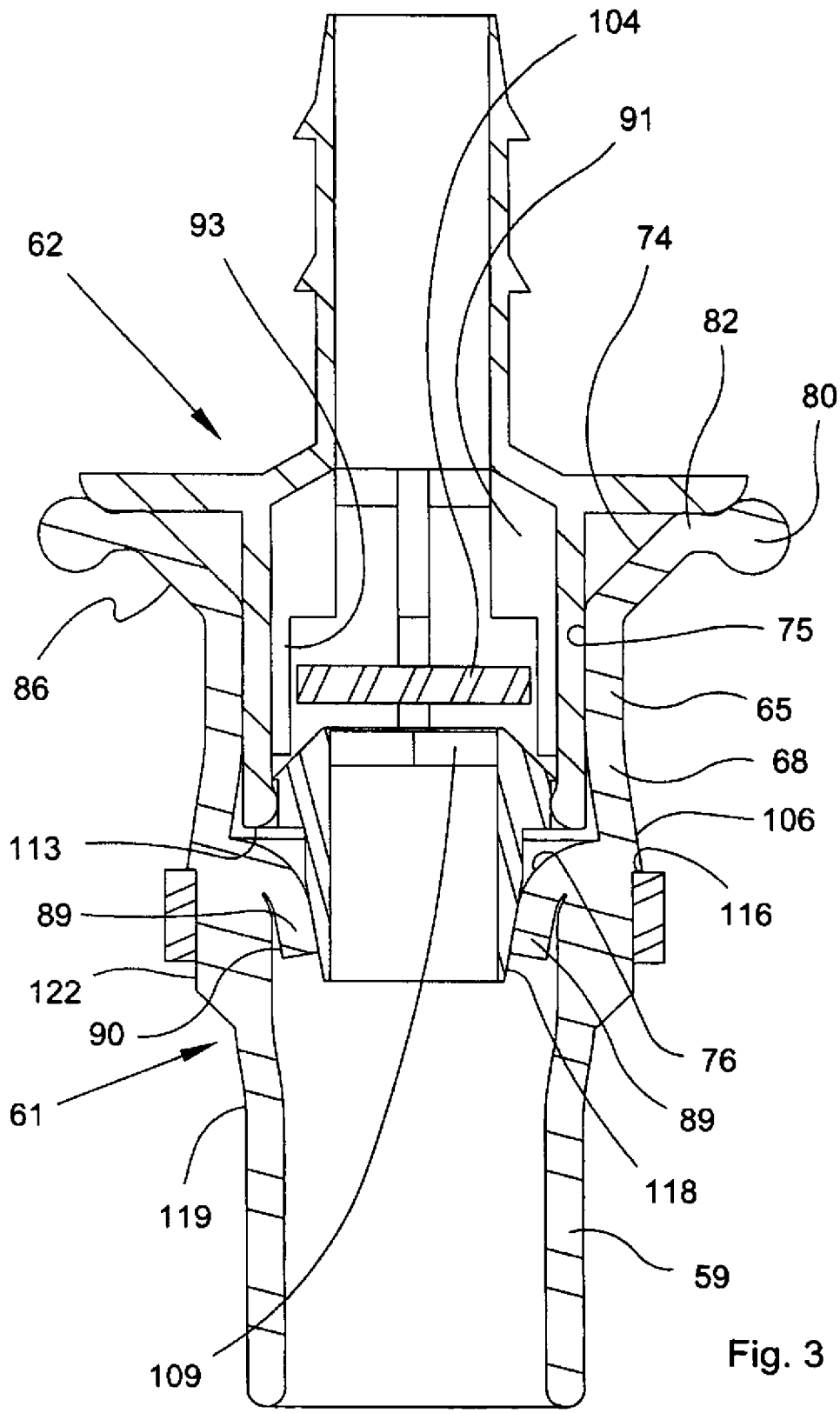
Figure 15B:
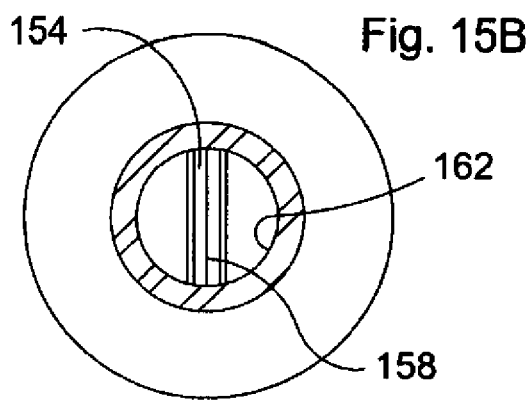
Figure 16B:
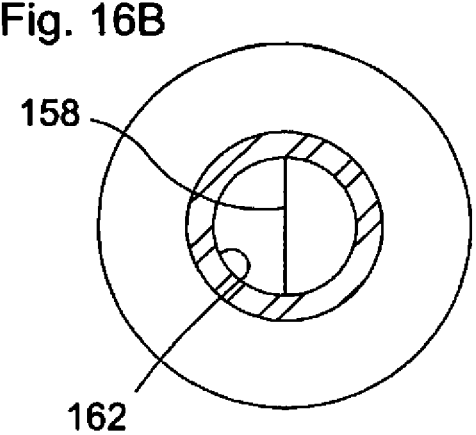
Figure 15A:
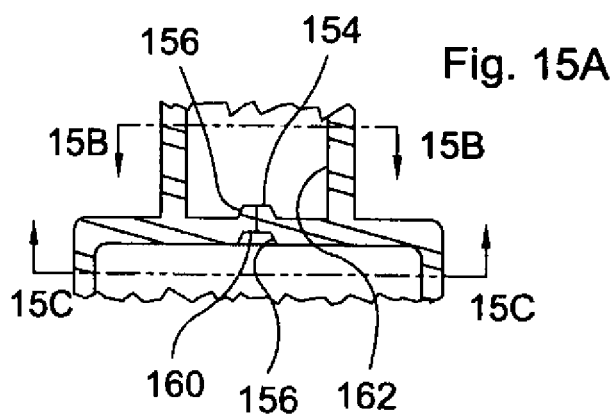
Figure 16A:
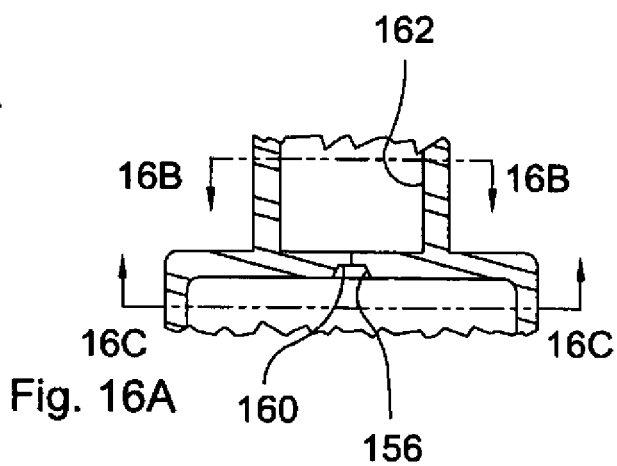
Figure 15C:
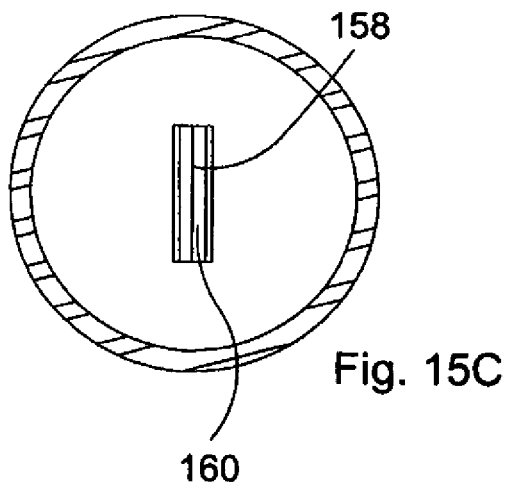
Figure 16C:
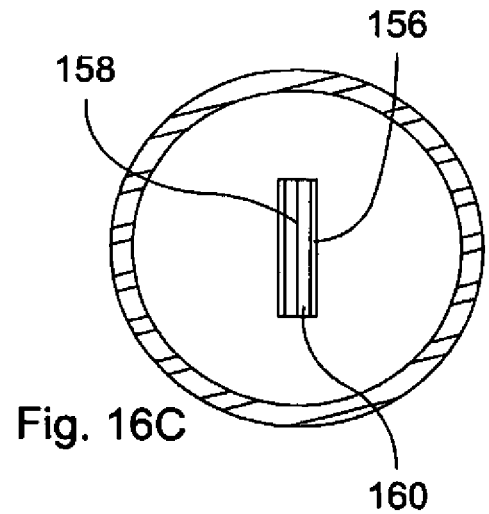
Figure 30A:
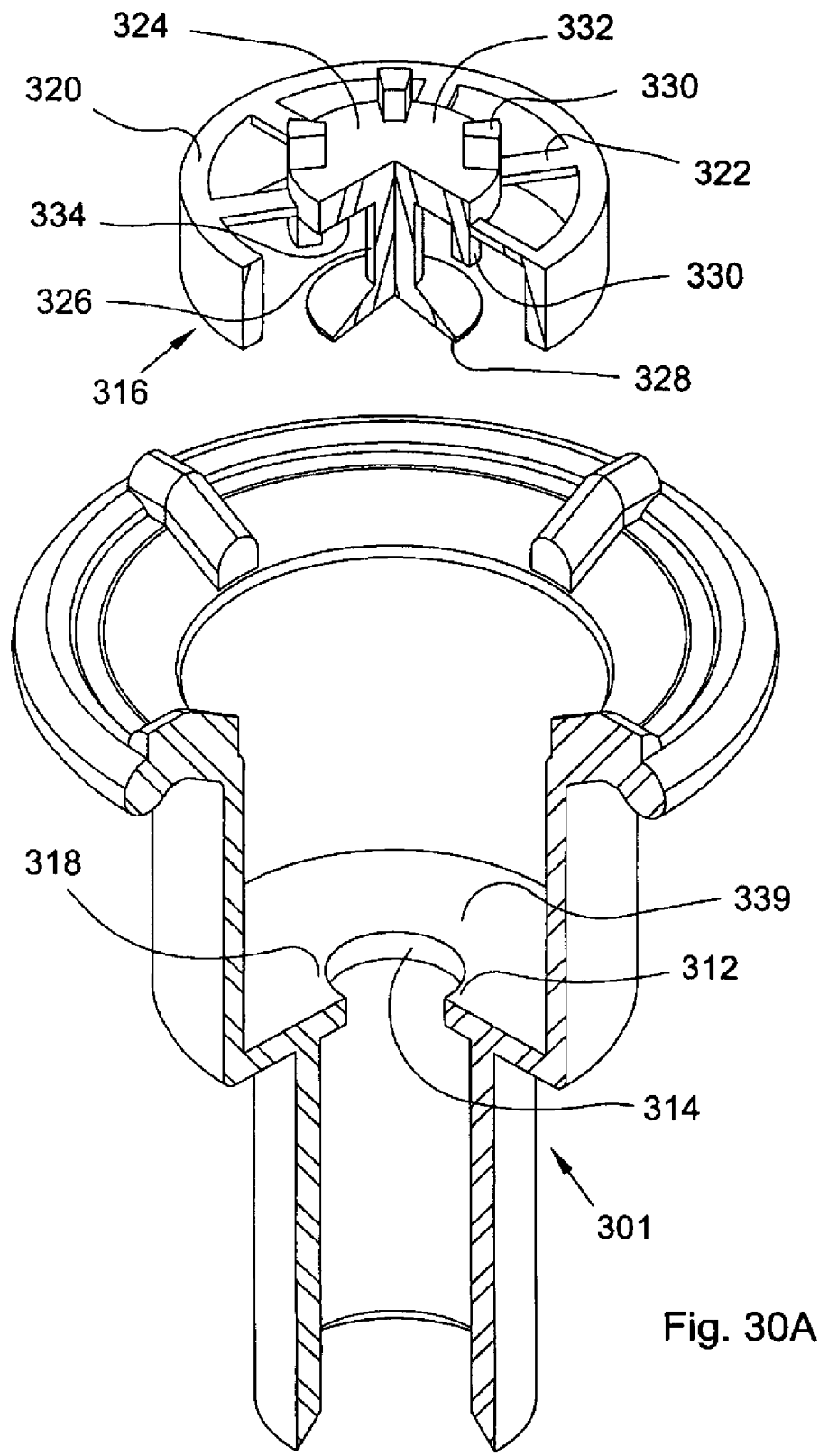
Figure 30B:
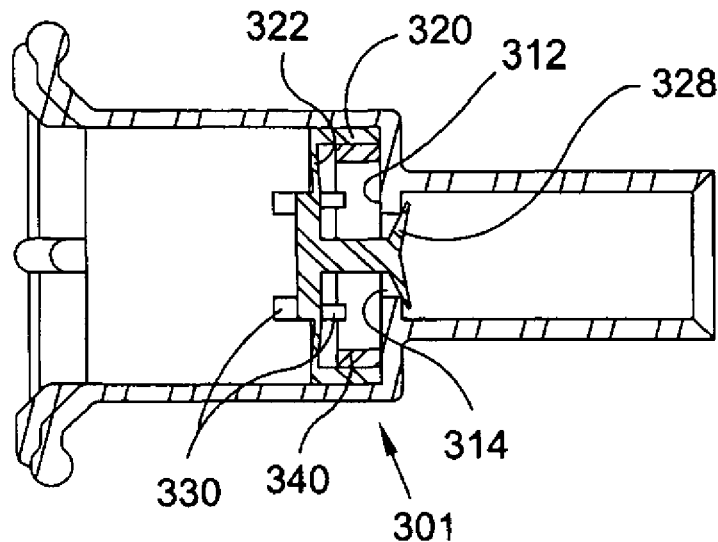
Figure 30C:
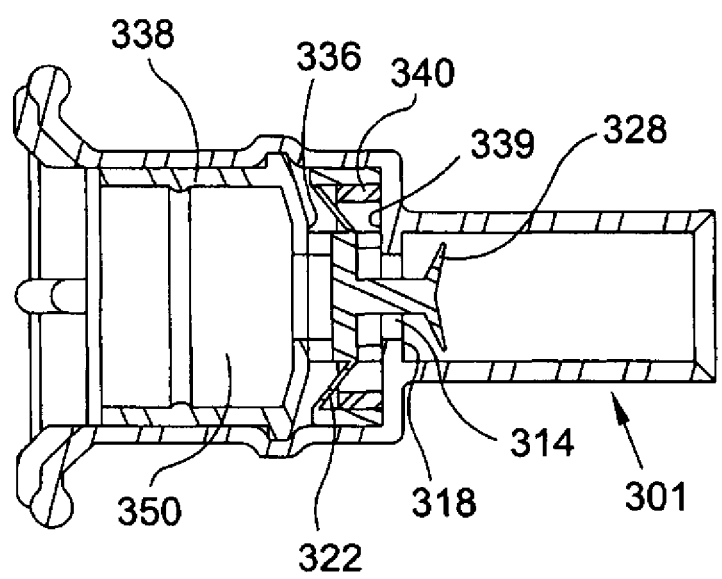
Figure 30D:
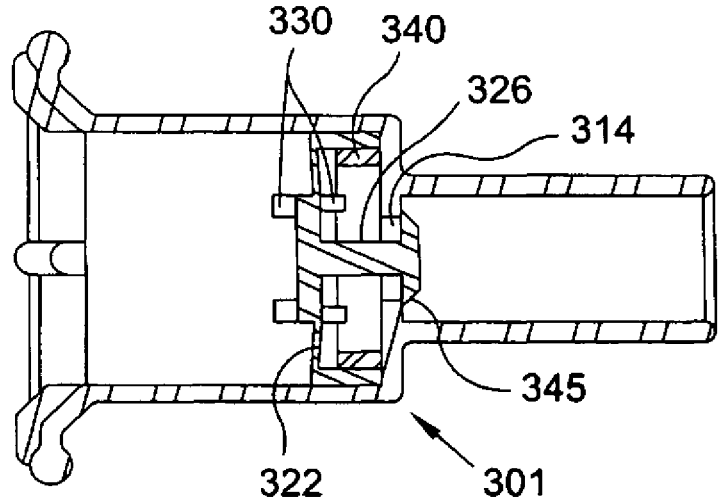

As shown in FIG. 30D resilient plug can have a flange with sloping side walls 345 and may have flange attached to shaft as a secondary operation. All other features and functions of this embodiment are similar to those elements of FIGS. 30A thru 30C with like reference numerals.

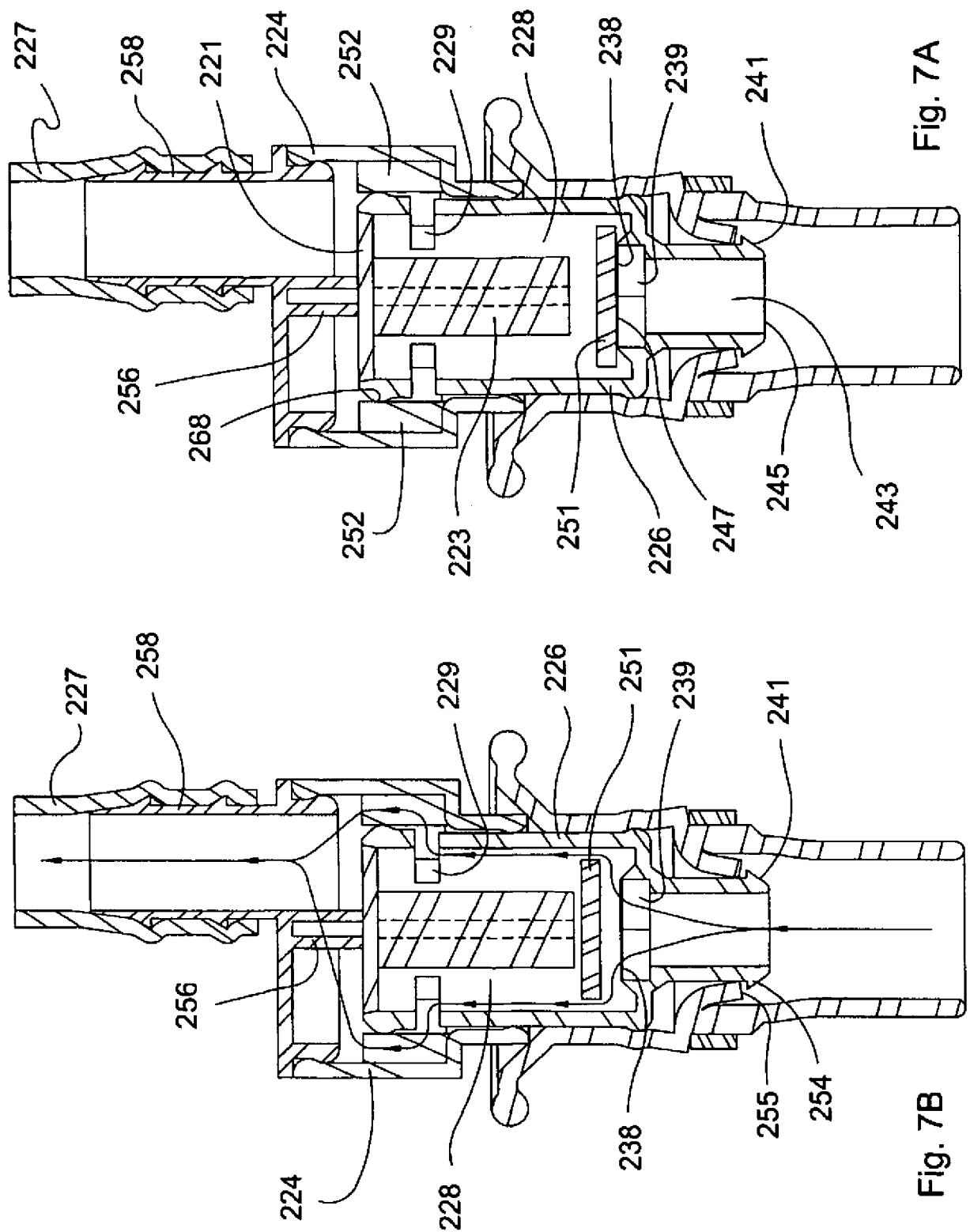

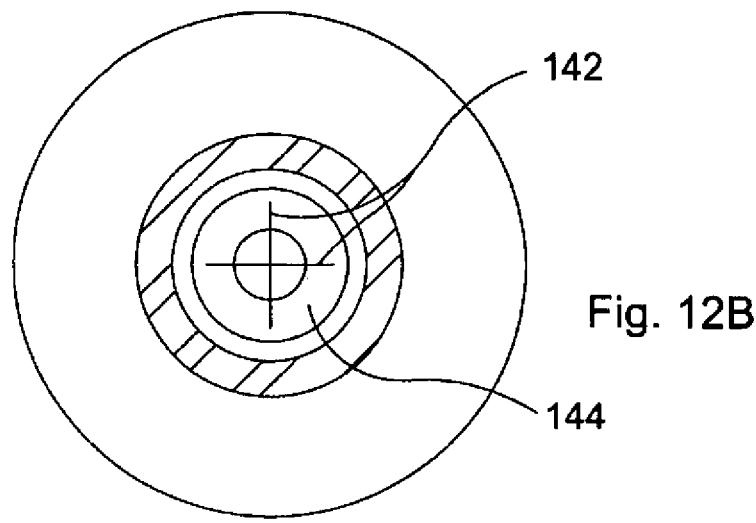
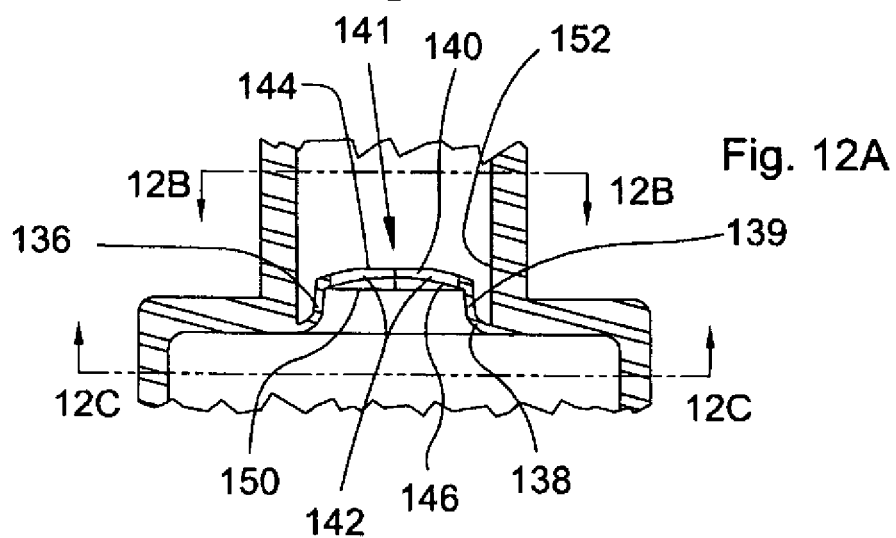
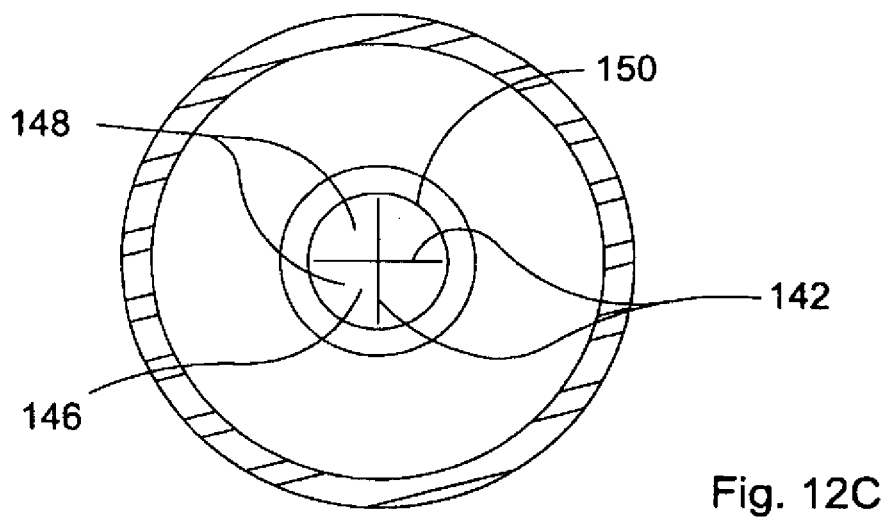

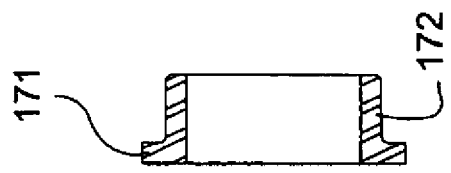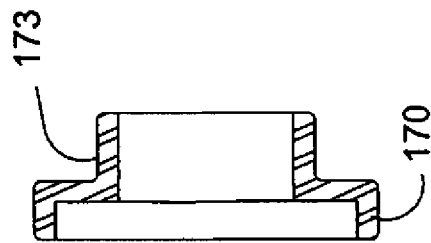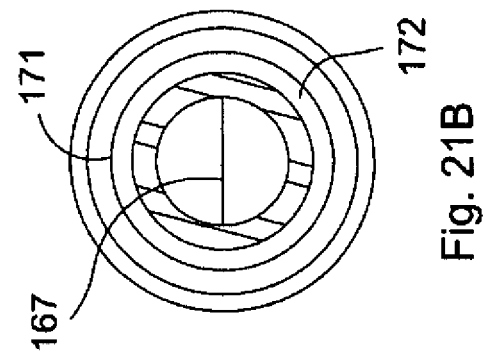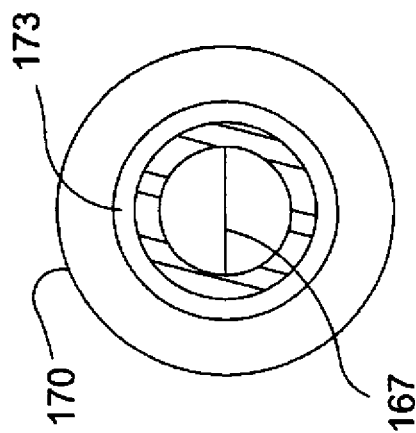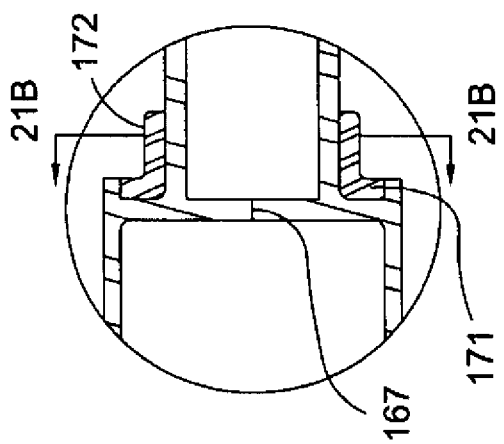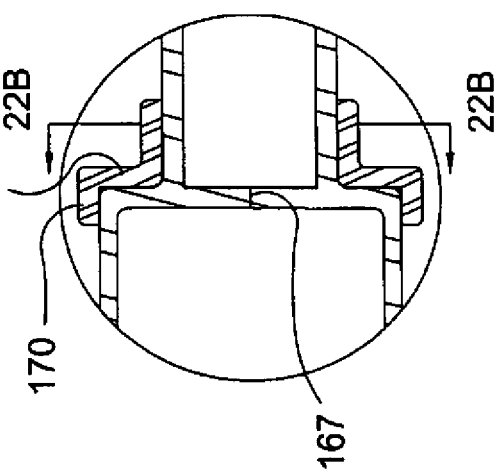

I claim:

1. A resilient boot for releasably coupling a first fluid conduit with a nozzle connected to a second fluid conduit together to establish fluid-flow communication between the two fluid conduits, said nozzle having a mating portion with an external mating surface, said boot comprising, in combination: a hollow structure with an interior including a fitting portion with a first opening that communicates with said interior for receiving said first conduit, a coupling portion with a second opening spaced from said first opening that communicates with said interior for receiving said nozzle connected to said second conduit, and said boot having an internal valve means spaced between said first opening and said second opening, said fitting portion having a first deformable wall defined by the interior boot surface and the exterior boot surface, said first wall extending the longitudinal length of said fitting portion from said first opening to said valve means, said mating portion having a second deformable wall defined by the interior boot surface and the exterior boot surface, said second wall extending the longitudinal length of said mating portion from said first opening to said valve means, said second wall deformably receiving said nozzle and having a substantially fluid-tight seal with said external mating surface of said nozzle, said valve means at least partially terminating fluid-flow when said nozzle disengages said valve means, further said valve means at least partially permitting fluid flow when said nozzle engages said valve means, said nozzle being removable from said interior of said boot mating portion to disconnect said boot and said nozzle upon application of disconnection means, wherein said valve means consisting of a deformable closure with at least one slit formed therein, said at least one slit being at least partially closed when a tip of said nozzle disengages said at least one slit terminating fluid-flow between said boot and said nozzle, said at least one slit deformed partially opened when said tip substantially penetrates said at least one slit allowing fluid-flow between said boot and said nozzle.

2. The boot according to claim 1 wherein disconnection means is a pulling force on said nozzle or said boot of sufficient magnitude to overcome the friction mating force made upon said nozzle by said deformable mating portion of said boot.

3. The boot according to claim 1 wherein said boot is of unitary, integral or single piece construction.

4. The boot according to claim 1 wherein said valve means includes compression means for urging said at least one slit substantially closed when said nozzle tip disengages said closure.

5. The boot according to claim 4 wherein said compression means including a resilient band that at least partially contacts the exterior of said boot with a compressive force applied to said exterior surface and urging said at least one slit substantially closed when said nozzle tip disengages said closure.

6. The boot of claim 4 wherein said compression means includes a rigid band that at least partially contacts the exterior surface of said boot with a compressive force applied to said exterior surface and urging said at least one slit substantially closed when said nozzle tip disengages said closure.

7. The boot according to claim 6 wherein said rigid band substantially prevents said boot wall from being deformed by an external force applied to said boot.

8. The boot according to claim 4 wherein compressive means includes band retaining flared structure placed at a predetermined location on the exterior of said boot for positioning compression means upon said exterior and urging said at least one slit substantially closed when said nozzle tip disengages said closure.

9. The boot according to claim 1 wherein said valve means includes at least partially self sealing means when said nozzle disengages said valve means.

10. The boot according to claim 1 wherein said valve means consisting of a deformable closure with at least one slit formed therein and at least one protrusion positioned adjacent to said at least one slit, said at least one slit deformed partially opened when face of said nozzle engages at least one protrusion of said valve means allowing fluid-flow between said boot and said nozzle, said at least one slit being substantially closed when said face of said nozzle disengages said at least one slit terminating fluid- flow between said boot and said nozzle.

11. The boot according to claim 10 wherein said boot and said valve means are molded together of integral, unitary or single piece construction.

12. The at least one protrusion according to claim 10 being formed in a separate protrusion housing that mates with said boot wherein said at least one protrusion is positioned adjacent to said at least one slit.

13. The boot according to claim 1 wherein deformation prevention means are provided to said boot side walls to substantially prevent said valve structure from being deformed by exterior forces applied to said boot exterior.

14. The boot according to claim 1 wherein deformation prevention means are provided comprising a rigid structure in contact with said boot exterior or inside said boot side walls.

15. The valve means according to claim 1 wherein deformable closure is made of resilient material.

16. A resilient boot for releasably coupling a first fluid conduit with a nozzle connected to a second fluid conduit together to establish fluid-flow communication between the two fluid conduits, said nozzle having a mating portion with an external mating surface, said boot comprising, in combination: a hollow structure with an interior including a fitting portion with a first opening that communicates with said interior for receiving said first conduit, a coupling portion with a second opening spaced from said opening that communicates with said interior for receiving said nozzle connected to said second conduit, and said boot having an internal valve means spaced between said first opening and said second opening, said fitting portion having a first deformable wall defined by the interior boot surface and the exterior boot surface, said first wall extending the longitudinal length of said fitting portion from said first opening to said valve means, said mating portion having a second deformable wall defined by the interior boot surface and the exterior boot surface, said second wall extending the longitudinal length of said mating portion from said first opening to said valve means, said second wall deformably receiving said nozzle and having a substantially fluid-tight seal with said external mating surface of said nozzle, said valve means at least partially terminating fluid-flow when said nozzle disengages said valve means, further said valve means at least partially permitting fluid flow when said nozzle engages said valve means, said nozzle being removable from said interior of said boot mating portion to disconnect said boot and said nozzle upon application of disconnection means, said valve means is the combination: a deformable hollow central structure with at least one side wall connected to said interior boot surface on the open end and said at least one side wall connected to a diaphragm at the closed end, said diaphragm with at least two intersecting slits formed therein.

17. The boot according to claim 16 wherein disconnection means is a pulling force on said boot or said nozzle of sufficient magnitude to overcome the friction mating force made upon said nozzle by said deformable mating portion of said boot.

18. The at least one side wall of said hollow central structure of said valve means of claim 16 wherein said at least one side wall is tubular in shape.

19. The boot according to claim 16 wherein deformation prevention means are provided to said boot side walls to substantially prevent said valve structure from being deformed by exterior forces applied to said boot exterior.

20. The boot according to claim 16 wherein deformation prevention means are provided comprising a rigid structure in contact with said boot exterior or inside said boot side walls.

21. The hollow central structure according to claim 16 wherein said at least one side wall is hingely connected to said boot interior surface.

22. The hollow central structure according to claim 16 is made of resilient material.

23. The hollow central structure according to claim 16 wherein said at least one side wall is of a predetermined length.

24. The boot according to claim 16 wherein the said boot is of unitary, integral or single piece construction.

25. Coupling assembly for releasably joining two fluid conduits together to establish fluid-flow communication between said fluid conduits, said connector apparatus comprising, in combination:
a resilient boot for releasably coupling a first fluid conduit with a male connector connected to a second fluid conduit together to establish fluid-flow communication between the two fluid conduits, said male connector having a mating portion with an external mating surface, said boot comprising, in combination: a hollow structure with an interior including a fitting portion with a first opening that communicates with said interior for receiving said first conduit, a coupling portion with a second opening spaced from said first opening that communicates with said interior for receiving said connector connected to said second conduit, and said boot having an internal valve means spaced between said first opening and said second opening, said fitting portion having a first deformable wall defined by the interior boot surface and the exterior boot surface, said first wall extending the longitudinal length of said fitting portion from said first opening to said valve means, said mating portion having a second deformable wall defined by the interior boot surface and the exterior boot surface, said second wall extending the longitudinal length of said mating portion from said first opening to said valve means, said second wall deformably receiving said nozzle and having a substantially fluid-tight seal with said external mating surface of said male connector, said valve means at least partially terminating fluid-flow when said male connector disengages said valve means, further said valve means at least partially permitting fluid flow when said male connector engages said valve means, said nozzle being removable from said interior of said boot mating portion to disconnect said boot and said male connector upon application of disconnection means, wherein said valve means consisting of a deformable closure with at least one slit formed therein, said at least one slit being at least partially closed when a tip of said male connector disengages said at least one slit terminating fluid-flow between said boot and said male connector, said at least one slit deformed partially opened when said tip substantially penetrates said at least one slit allowing fluid-flow between said boot and said male connector; and
a male connector including a male connector housing having a mating portion with a peripheral wall defining a male connector interior with a male connector exterior, a male connector inlet communicating with said male connector interior, and a male connector outlet communicating with said male connector housing interior, and spaced from said male connector inlet, and second fluid conduit fitting means connected a fitting portion for joining with a second conduit, and a valve engagement means for interacting with said valve means, said male connector being removable from said interior of said boot mating portion to disconnect said boot and said male connector upon application of disconnection means.

26. The boot according to claim 25 wherein disconnection means is a pulling force on said boot or said male connector of sufficient magnitude to overcome the friction mating force made upon said male connector by said deformable mating portion of said boot.

27. The male connector according to claim 25 wherein said fitting portion of said male connector is radially removed from said mating portions of said male connector.

28. The male connector according to claim 25 wherein positive shut off means are provided such that said valve means of said male connector is closed substantially preventing fluid flow from said male connector when said male connector and said boot disengage.

29. The male connector according to claim 28 wherein through the action of separating said male connector and said boot said positive shut off valve slidably moves to a first closed position, said positive shut off valve slidably moves to a second open position when said male connector engages said boot to a predetermined position.

30. The male connector according to claim 28 wherein said male connector includes a barbed tip.

31. The male connector according to claim 28 wherein said male connector includes a gravity check valve.

32. The male connector according to claim 28 wherein said positive shut off valve slidably moves to a first open position when said male connector substantially engages said boot, through the action of separating said male connector and said boot said positive shut off valve slidably moves to a first closed position.

33. The male connector according to claim 32 wherein said male connector includes a gravity check valve.

34. The male connector according to claim 25 wherein said male connector includes a "Y" union with at least two conduit fitting portions and a mating portion.

35. The male connector according to claim 25 wherein said male connector includes a snap-on tip, said valve means of said boot consisting of a deformable closure with at least one slit formed therein, said at least one slit being substantially closed when said tip on said male connector disengages said at least one slit terminating fluid-flow between said boot and said male connector, said at least one slit deformed partially opened when said tip substantially penetrates said at least one slit allowing fluid-flow between said boot and said male connector.

36. The boot according to claim 25 wherein said boot is of unitary, integral or single piece construction.

37. The boot according to claim 25 wherein said deformable closure is the combination: a hollow central structure with at least one side wall connected to said boot interior surface on the open end and said at least one side wall connected to a diaphragm at the closed end, said diaphragm with at least two intersecting slits formed therein, said at least two intersecting slits being substantially closed when a tip on said male connector disengages said at least two intersecting slits terminating fluid-flow between said boot and said male connector, said at least two intersecting slits deformed partially opened when said tip substantially penetrates said at least two intersecting slits allowing fluid-flow between said boot and said male connector.

38. The at least one side wall of said hollow central structure of said valve means of claim 37 wherein said at least one side wall is tubular in shape.

39. The hollow central structure according to claim 37 wherein said at least one side wall is hingely connected to said boot interior surface.

40. The hollow central structure according to claim 37 is made of resilient material.

41. The hollow central structure according to claim 37 wherein said at least one side wall is of a predetermined length.

42. The boot according to claim 37 wherein deformation prevention means are provided to said boot side walls to substantially prevent said valve structure from being deformed by exterior forces applied to said exterior boot.

43. The boot according to claim 37 wherein deformation prevention means are provided comprising a rigid structure in contact with said boot exterior or inside said boot side walls.

44. The boot according to claim 37 wherein the said boot is of unitary, integral or single piece construction.

45. The boot according to claim 25 wherein said valve means includes compression means for urging said at least one slit substantially closed when said male connector tip disengages said at least one slit.

46. The boot according to claim 25 wherein deformation prevention means are provided to said boot side walls to substantially prevent said valve structure from being deformed by exterior forces applied to said boot exterior.

47. The boot according to claim 25 wherein deformation prevention means are provided comprising a rigid structure in contact with said boot exterior or inside said boot side walls.

48. The valve means according to claim 25 wherein deformable closure is made of resilient material.

49. A resilient boot for releasably coupling a first fluid conduit with a nozzle connected to a second fluid conduit together to establish fluid-flow communication between the two fluid conduits, said nozzle having a mating portion with an external mating surface, said boot comprising, in combination: a hollow structure with an interior including a fitting portion with a first opening that communicates with said interior for receiving said first conduit, a coupling portion with a second opening spaced from said opening that communicates with said interior for receiving said nozzle connected to said second conduit, and said boot having an internal valve means spaced between said first opening and said second opening, said fitting portion having a first deformable wall defined by the interior boot surface and the exterior boot surface, said first wall extending the longitudinal length of said fitting portion from said first opening to said valve means, said mating portion having a second deformable wall defined by the interior boot surface and the exterior boot surface, said second wall extending the longitudinal length of said mating portion from said first opening to said valve means, said second wall deformably receiving said nozzle and having a substantially fluid-tight seal with said external mating surface of said nozzle, said valve means at least partially terminating fluid-flow when said nozzle disengages said valve means, further said valve means at least partially permitting fluid flow when said nozzle engages said valve means, said nozzle being removable from said interior of said boot mating portion to disconnect said boot and said nozzle upon application disconnection means, said valve means consisting of a deformable closure with at least one slit formed therein, said at least one slit being at least partially closed when a tip of said nozzle disengages said at least one slit at least partially terminating fluid-flow between said boot and said nozzle, said at least one slit deformed partially opened when said tip substantially penetrates said at least one slit at least partially allowing fluid-flow between said boot and said nozzle, said at least one slit includes at least one self sealing structure adjacent to said at least one slit.

50. The boot according to claim 49 wherein disconnection means is a pulling force to said boot or said nozzle of sufficient magnitude to overcome the friction mating force made upon said nozzle by said deformable mating portion of said boot.

51. The boot according to claim 49 wherein said at least one self sealing structure includes at least one trench, said at least one trench with a side wall of a predetermined shape on at least one surface of said closure.

52. The boot according to claim 49 wherein said at least one self sealing structure includes at least one lip, said at least one lip with a side wall of a predetermined shape on at least one surface of said closure.

53. The closure according to claim 52 wherein said at least one lip is curved.

54. The boot according to claim 49 wherein at least one self sealing structure includes at least one lip with a side wall of a predetermined shape on a first surface of said closure, said at least one sealing structure includes at least one trench with a side wall of a predetermined shape on a second surface of said closure.

55. The boot according to claim 49 wherein deformation prevention means are provided to said boot side walls to substantially prevent said valve structure from being deformed by exterior forces applied to said exterior boot.

56. The boot according to claim 49 wherein deformation prevention means are provided comprising a rigid structure in contact with said boot exterior or inside said boot side walls.

57. The valve means according to claim 49 wherein deformable closure is made of resilient material.

58. The boot according to claim 49 wherein the said boot is of unitary, integral or single piece construction.

59. A resilient boot for releasably coupling a first fluid conduit with a nozzle connected to a second fluid conduit together to establish fluid-flow communication between the two fluid conduits, said nozzle having a mating portion with an external mating surface, said boot comprising, in combination: a hollow structure with an interior including a fitting portion with a first opening that communicates with said interior for receiving said first conduit, a coupling portion with a second opening spaced from said opening that communicates with said interior for receiving said nozzle connected to said second conduit, and said boot having an internal valve means spaced between said first opening and said second opening, said fitting portion having a first deformable wall defined by the interior boot surface and the exterior boot surface, said first wall extending the longitudinal length of said fitting portion from said first opening to said valve means, said mating portion having a second deformable wall defined by the interior boot surface and the exterior boot surface, said second wall extending the longitudinal length of said mating portion from said first opening to said valve means, said second wall deformably receiving said nozzle and having a substantially fluid-tight seal with said external mating surface of said nozzle, said valve means at least partially terminating fluid-flow when said nozzle disengages said valve means, further said valve means at least partially controlling fluid flow between said first conduit and said second conduit when said nozzle engages said valve means, said nozzle being removable from said interior of said boot mating portion to disconnect said boot and said nozzle upon application of disconnection means, said valve means is the combination: a deformable hollow central structure with at least one side wall connected to said interior boot surface on the open end and said at least one side wall connected to a diaphragm at the closed end, said diaphragm with at least two intersecting slits formed therein.

60. The boot according to claim 59 wherein disconnection means is a pulling force on said boot or said nozzle of sufficient magnitude to overcome the friction mating force made upon said nozzle by said deformable mating portion of said boot.

61. The at least one side wall of said hollow central structure of said valve means of claim 59 wherein said at least one side wall is tubular in shape.

62. The boot according to claim 59 wherein deformation prevention means are provided to said boot side walls to substantially prevent said valve structure from being deformed by exterior forces applied to said boot exterior.

63. The boot according to claim 59 wherein deformation prevention means are provided comprising a rigid structure in contact with said boot exterior or inside said boot side walls.

64. The hollow central structure according to claim 59 wherein said at least one side wall is hingely connected to said boot interior surface.

65. The hollow central structure according to claim 59 is made of resilient material.

66. The hollow central structure according to claim 59 wherein said at least one side wall is of a predetermined length.

67. The boot according to claim 59 wherein the said boot is of unitary, integral or single piece construction.

* * * * *

UNITED STATES PATENT AND TRADEMARK OFFICE
CERTIFICATE OF CORRECTION

| | | |
|---|---|---|
| PATENT NO. | : 7,931,253 B1 | Page 1 of 12 |
| APPLICATION NO. | : 11/528954 | |
| DATED | : April 26, 2011 | |
| INVENTOR(S) | : Joseph Robert Paczonay | |

It is certified that error appears in the above-identified patent and that said Letters Patent is hereby corrected as shown below:

Correct clean versions of attached Drawing Sheets to be substituted:
2 of 29, 3 of 29, 4 of 29, 10 of 29, 18 of 29, 20 of 29, 23 of 29, 28 of 29, & 29 of 29.

On column 1, line 30 change 'relative the pull' to -- relative to the pull --.

On column 1, line 55 change 'manufactured in an injection mold of' to -- manufactured, in an injection mold, of --.

On column 2, line 34 change 'shown is' to -- shown in --.

On column 2, line 39 change 'of second bottle' to -- of a second bottle --.

On column 3, line 51 change 'embodiment shown' to -- boot embodiment shown --.

On column 3, line 62 change 'shown is' to -- shown in --.

On column 3, line 65 change 'is FIG. 21A' to -- in FIG. 24A --.

On column 4, line 2 change 'is FIG. 21A' to -- in FIG. 24A --.

On column 4, line 17 change 'is FIG. 30A' to -- in FIG. 30A --.

On column 5, line 18 change 'resilient the' to -- resilient, the --.

On column 5, line 46 change 'vane 91 act' to -- vane 91 acting --.

On column 6, line 8 change 'presses any further.' to -- pressed any further. --.

On column 6, line 42 change 'rib 94 that act to' to -- rib 94 that acts to --.

On column 7, line 7 change 'there in where slit' to -- therein where slit --.

On column 7, line 31 change 'a band, however, band' to -- a band. However, band --.

Signed and Sealed this
Twenty-third Day of August, 2011

David J. Kappos
*Director of the United States Patent and Trademark Office*

CERTIFICATE OF CORRECTION (continued)
U.S. Pat. No. 7,931,253 B1

On column 7, line 32 change 'With that said all' to -- With that said, all --.

On column 8, line 41 change 'leakage there from' to -- leakage therefrom --.

On column 8, line 45 change 'transition with' to -- transitions with --.

On column 9, line 6 change 'slit 222 there is' to -- slit 222, there is --.

On column 9, line 33 change 'element 251 in the form of a disc sits' to -- element 251, in the form of a disc, sits --.

On column 9, line 52 change 'In turn valve' to -- In turn, valve --.

On column 10, line 18 change 'FIG. 8D' to -- FIG. 8C --.

On column 10, line 21 change 'FIG. 8C' to -- FIG. 8D --.

On column 10, line 40 change 'boot valve housing' to -- boot, valve housing --.

On column 10, line 43 change 'employed them' to -- employed, then --.

On column 10, line 49 change 'tube, housing' to -- tube housing --.

On column 10, line 55 change 'fitting that is shown in FIGS. 6A thru 8D "Y" fitting' to -- barbed fitting that is shown in FIGS. 6A thru 8D. "Y" fitting --.

On column 11, line 60 change 'and 10B only' to -- and 10B, only --.

On column 13, line 24 change 'liquid form' to -- liquid from --.

On column 13, line 41 change 'place in an' to -- placed in an --.

On column 13, line 49 change 'snuggly' to -- snugly --.

On column 14, line 24 change '140, the slits' to -- 140; the slits --.

On column 14, line 29 change 'embodiment said' to -- embodiment, said --.

On column 14, line 33 change 'With an opening fluid' to -- With an opening, fluid --.

On column 14, line 45 change 'FIGS. 13 thru 17' to -- FIGS. 13A thru 17C --.

On column 14, line 56 change 'embodiments the' to -- embodiments, the --.

On column 15, line 22 change 'other version of rigid' to -- other versions of rigid --.

On column 16, line 10 change '271 pushed struts' to -- 271 pushes struts --.

On column 16, line 37 change 'form when boot' to -- formed when boot --.

On column 17, line 14 change 'in contact resilient' to -- in contact, resilient --.

On column 17, line 16 change 'buckling inward a' to -- buckling inward, a --.

On column 17, line 28 change 'uncoupling nozzle face' to -- uncoupling, nozzle face --.

On column 17, line 37 change 'function in a similar fashion.' to -- function in a similar fashion as those described in previous embodiments. --.

In Claim 16 on column 19, line 17 change 'said opening' to -- said first opening --.

In Claim 25 on column 20, line 15 change 'connector' to -- male connector --.

In Claim 25 on column 20, line 27 change 'nozzle' to -- male connector --.

In Claim 25 on column 20, line 34 change 'nozzle' to -- male connector --.

In Claim 49 on column 22, line 28 change 'said opening' to -- said first opening --.

In Claim 59 on column 23, line 32 change 'said opening' to -- said first opening --.

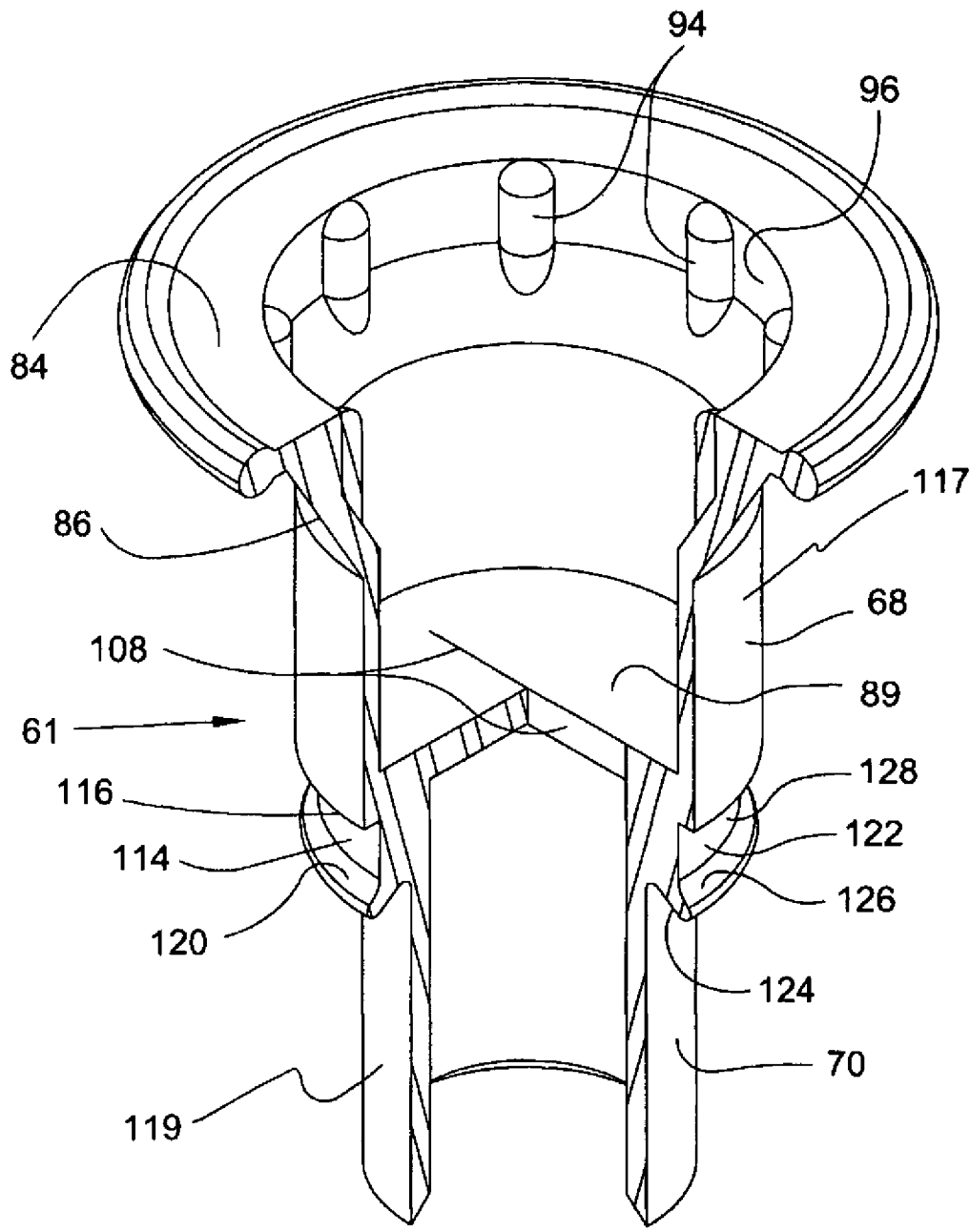
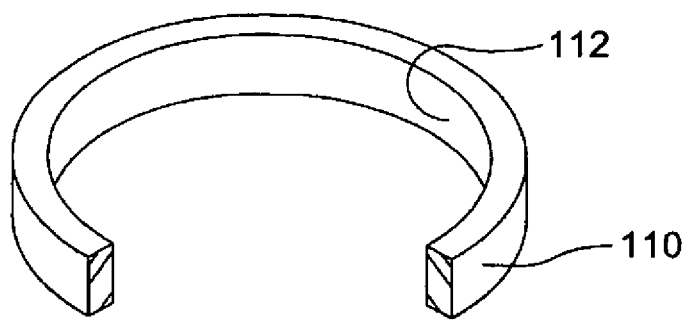
Fig. 4A